US011917474B2

(12) United States Patent
Damnjanovic et al.

(10) Patent No.: US 11,917,474 B2
(45) Date of Patent: Feb. 27, 2024

(54) MOBILITY ENHANCEMENTS FOR CONDITIONAL HANDOVERS

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/445,885

(22) Filed: Aug. 25, 2021

(65) Prior Publication Data

US 2023/0063931 A1  Mar. 2, 2023

(51) Int. Cl.
*H04W 36/08* (2009.01)
*H04W 36/00* (2009.01)
*H04W 36/36* (2009.01)

(52) U.S. Cl.
CPC ....... *H04W 36/08* (2013.01); *H04W 36/0058* (2018.08); *H04W 36/0061* (2013.01); *H04W 36/362* (2023.05)

(58) Field of Classification Search
CPC ............. H04W 36/08; H04W 36/0058; H04W 36/0061; H04W 36/36; H04W 36/0069; H04W 36/362
See application file for complete search history.

(56) References Cited

U.S. PATENT DOCUMENTS

2020/0396661 A1* 12/2020 Wu .................. H04W 36/0058
2022/0046747 A1*  2/2022 Da Silva ............... H04W 76/34
2022/0217597 A1*  7/2022 Ishii .................. H04W 36/0058
(Continued)

FOREIGN PATENT DOCUMENTS

WO   WO-2021066723 A1   4/2021
WO   WO-2021067236 A1   4/2021

OTHER PUBLICATIONS

International Search Report and Written Opinion—PCT/US2022/073313—ISA/EPO—dated Oct. 4, 2022.
(Continued)

*Primary Examiner* — Ricky Q Ngo
*Assistant Examiner* — Kabir U Jahangir
(74) *Attorney, Agent, or Firm* — Arun Swain

(57) ABSTRACT

Various aspects of the present disclosure generally relate to wireless communication. In some aspects, a user equipment (UE) may receive, from a source base station, configuration information for a conditional handover indicating an execution condition and one or more secondary cell group (SCG) configurations associated with one or more candidate base stations. The UE may transmit, to the source base station, a measurement report indicating one or more measurements associated with at least one of the source base station or the one or more candidate base stations. The UE may perform the conditional handover with a candidate base station, of the one or more candidate base stations, using an updated SCG configuration associated with the candidate base station, wherein the updated SCG configuration is based on an SCG configuration, of the one or more SCG configurations, and the one or more measurements. Numerous other aspects are provided.

28 Claims, 17 Drawing Sheets

(56) References Cited

U.S. PATENT DOCUMENTS

| | | | |
|---|---|---|---|
| 2022/0256426 A1* | 8/2022 | Kim | H04W 36/36 |
| 2022/0361060 A1* | 11/2022 | Wallentin | H04W 36/00837 |
| 2022/0361065 A1* | 11/2022 | Kumar | H04W 36/0079 |
| 2023/0025432 A1* | 1/2023 | Da Silva | H04W 36/36 |
| 2023/0097891 A1* | 3/2023 | Zhang | H04W 36/0061 370/331 |
| 2023/0171652 A1* | 6/2023 | Zhang | H04W 36/0061 370/331 |

OTHER PUBLICATIONS

Nokia et al., "On Rel-17 Conditional PSCell Addition and Change (CPAC)", 3GPP TSG-RAN WG2 Meeting #112, R2-2009771, 3rd Generation Partnership Project (3GPP), Mobile Competence Centre, 650, Route Des Lucioles, F-06921 Sophia-Antipolis Cedex, vol. RAN WG2, No. Electronic, Nov. 13, 2020-Mov. 13, 2020, Oct. 22, 2020, XP051941411, 6 Pages, pp. 2-4.

* cited by examiner

MOBILITY ENHANCEMENTS FOR CONDITIONAL HANDOVERS

FIELD OF THE DISCLOSURE

Aspects of the present disclosure generally relate to wireless communication and specifically, to techniques and apparatuses for mobility enhancements for conditional handovers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, a base station (for example, a source base station) may transmit, to a user equipment (UE), a conditional handover configuration. The conditional handover configuration may indicate cell configurations for one or more candidate base stations and one or more execution conditions indicating conditions or criteria for triggering the handover procedure with a candidate base station. Therefore, the UE is enabled to trigger the handover procedure when an execution condition is satisfied without any additional signaling from the source base station. Additionally, in some cases, a UE may be capable of communicating in a dual connectivity mode. For example, the UE may communicate on a master cell group (MCG) (for example, using a first radio access technology (RAT)) and may communicate on a secondary cell group (SCG) (for example, using a second RAT). The dual connectivity mode may improve communication performance or throughput for the UE.

In some cases, as part of the source base station configuring a conditional handover, a candidate base station may indicate cell configurations, such as an MCG configuration or an SCG configuration, associated with the candidate base station to the source base station. The source base station may then provide the cell configurations to the UE (for example, to be applied by the UE if the conditional handover is triggered). However, some duration of time may pass between a time when the conditional handover is configured and a time when the conditional handover is triggered and channel conditions may change within the duration. As such, the candidate base station may configure an SCG configuration associated with the conditional handover procedure using measurements that are outdated by the time the conditional handover is triggered. Moreover, execution conditions for the conditional handover may be based only on PCell measurements (performed by the UE) of the candidate base station. For example, the UE may not take into account measurements of a cell included in an SCG of the candidate base station when determining whether the conditional handover has been triggered. Therefore, the UE may trigger the conditional handover procedure with the candidate cell when channel conditions associated with an SCG of the candidate base station are poor. As a result, the UE may experience an SCG failure associated with attempting to add the SCG of the candidate base station as part of the conditional handover procedure.

Additionally, the UE may rely on cell-based measurements (rather than beam-based measurements) for determining whether an execution condition (for triggering the conditional handover procedure) has been satisfied. However, some wireless networks use beams to communicate messages. Therefore, using a cell-based measurement to determine whether an execution condition (for triggering the conditional handover procedure) has been satisfied may result in a conditional handover procedure being triggered with a candidate base station that uses a beam that is associated with a poor signal quality or a poor signal strength.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive, from a source base station, configuration information for a conditional handover, wherein the configuration information indicates an execution condition and one or more secondary cell group (SCG) configurations associated with one or more candidate base stations. The processor-readable code, when executed by the at least one processor, may be configured to cause the user equipment to transmit, to the source base station, a measurement report indicating one or more measurements associated with at least one of the source base station or the one or more candidate base stations. The processor-readable code, when executed by the at least one processor, may be configured to cause the user equipment to perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit, to a UE, configuration information for a conditional handover, wherein the configuration information indicates one or more execution conditions and one or more SCG configurations associated with one or more candidate base stations. The processor-readable code, when executed by the at least one processor, may be configured to cause the base station to receive, from the UE, a measurement report indicating one or more measurements. The processor-readable code, when executed by the at least one processor, may be configured to cause the base station to transmit, to the UE, an indication of an updated SCG configuration for an SCG configuration, of the one or more SCG configurations, associated with a candidate base station of the one or more candidate base stations, wherein the updated SCG configuration is based at least in part on the one or more measurements.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit, to a source base station, an indication of a SCG configuration for a conditional handover associated with the base station. The processor-readable code, when executed by the at least one processor, may be configured to cause the base station to perform, with a UE, the conditional handover using an updated SCG configuration associated with the SCG configuration, wherein the updated SCG configuration is based at least in part on one or more measurements performed by the UE.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive, from a source base station, configuration information for a conditional handover, wherein the configuration information indicates an execution condition that is associated with primary cells (PCells) of one or more candidate base stations and at least one of SCGs of the one or more candidate base stations or primary secondary cell (PSCells) of the one or more candidate base stations. The processor-readable code, when executed by the at least one processor, may be configured to cause the UE to transmit, to a candidate base station of the one or more candidate base stations, a message to initiate the conditional handover based at least in part on detecting that the execution condition has been satisfied.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to receive, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The processor-readable code, when executed by the at least one processor, may be configured to cause the base station to receive, from the UE, a message to initiate the conditional handover based at least in part on an execution condition being satisfied.

Some aspects described herein relate to a method of wireless communication performed by a UE. The method may include receiving, from a source base station, configuration information for a conditional handover, wherein the configuration information indicates an execution condition and one or more SCG configurations associated with one or more candidate base stations. The method may include transmitting, to the source base station, a measurement report indicating one or more measurements associated with at least one of the source base station or the one or more candidate base stations. The method may include performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

Some aspects described herein relate to a method of wireless communication performed by a base station. The method may include transmitting, to a UE, configuration information for a conditional handover, wherein the configuration information indicates one or more execution conditions and one or more SCG configurations associated with one or more candidate base stations. The method may include receiving, from the UE, a measurement report indicating one or more measurements. The method may include transmitting, to the UE, an indication of an updated SCG configuration for an SCG configuration, of the one or more SCG configurations, associated with a candidate base station of the one or more candidate base stations, wherein the updated SCG configuration is based at least in part on the one or more measurements.

Some aspects described herein relate to a method of wireless communication performed by a base station. The method may include transmitting, to a source base station, an indication of a SCG configuration for a conditional handover associated with the base station. The method may include performing, with a UE, the conditional handover using an updated SCG configuration associated with the SCG configuration, wherein the updated SCG configuration is based at least in part on one or more measurements performed by the UE.

Some aspects described herein relate to a method of wireless communication performed by a UE. The method may include receiving, from a source base station, configuration information for a conditional handover, wherein the configuration information indicates an execution condition that is associated with PCells of one or more candidate base stations and at least one of SCGs of the one or more candidate base stations or PSCells of the one or more candidate base stations. The method may include transmitting, to a candidate base station of the one or more candidate base stations, a message to initiate the conditional handover based at least in part on detecting that the execution condition has been satisfied.

Some aspects described herein relate to a method of wireless communication performed by a base station. The method may include receiving, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The method may include receiving, from the UE, a message to initiate the conditional handover based at least in part on an execution condition being satisfied.

Some aspects described herein relate to a non-transitory computer-readable medium that stores a set of instructions for wireless communication by a UE. The set of instructions, when executed by one or more processors of the UE, may cause the UE to receive, from a source base station, configuration information for a conditional handover, wherein the configuration information indicates an execution condition and one or more SCG configurations associated with one or more candidate base stations. The set of instructions, when executed by one or more processors of the UE, may cause the UE to transmit, to the source base station, a measurement report indicating one or more measurements associated with at least one of the source base station or the one or more candidate base stations. The set of instructions, when executed by one or more processors of the UE, may cause the UE to perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

Some aspects described herein relate to a non-transitory computer-readable medium that stores a set of instructions for wireless communication by a base station. The set of instructions, when executed by one or more processors of the base station, may cause the base station to transmit, to a UE, configuration information for a conditional handover, wherein the configuration information indicates one or more execution conditions and one or more SCG configurations associated with one or more candidate base stations. The set of instructions, when executed by one or more processors of the base station, may cause the base station to receive, from the UE, a measurement report indicating one or more measurements. The set of instructions, when executed by one or more processors of the base station, may cause the base station to transmit, to the UE, an indication of an updated SCG configuration for an SCG configuration, of the one or more SCG configurations, associated with a candidate base station of the one or more candidate base stations, wherein the updated SCG configuration is based at least in part on the one or more measurements.

Some aspects described herein relate to a non-transitory computer-readable medium that stores a set of instructions for wireless communication by a base station. The set of instructions, when executed by one or more processors of the base station, may cause the base station to transmit, to a source base station, an indication of a SCG configuration for a conditional handover associated with the base station. The set of instructions, when executed by one or more processors of the base station, may cause the base station to perform, with a UE, the conditional handover using an updated SCG configuration associated with the SCG configuration, wherein the updated SCG configuration is based at least in part on one or more measurements performed by the UE.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of an UE, may cause the one or more instructions that, when executed by one or more processors of an UE to receive, from a source base station, configuration information for a conditional handover, wherein the configuration information indicates an execution condition that is associated with PCells of one or more candidate base stations and at least one of SCGs of the one or more candidate base stations or PSCells of the one or more candidate base stations. The set of instructions, when executed by one or more processors of the one or more instructions that, when executed by one or more processors of a UE, may cause the one or more instructions that, when executed by one or more processors of a UE to transmit, to a candidate base station of the one or more candidate base stations, a message to initiate the conditional handover based at least in part on detecting that the execution condition has been satisfied.

Some aspects described herein relate to a non-transitory computer-readable medium that stores a set of instructions for wireless communication by a base station. The set of instructions, when executed by one or more processors of the base station, may cause the base station to receive, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The set of instructions, when executed by one or more processors of the base station, may cause the base station to receive, from the UE, a message to initiate the conditional handover based at least in part on an execution condition being satisfied.

Some aspects described herein relate to an apparatus for wireless communication. The apparatus may include means for receiving, from a source base station, configuration information for a conditional handover, wherein the configuration information indicates an execution condition and one or more SCG configurations associated with one or more candidate base stations. The apparatus may include means for transmitting, to the source base station, a measurement report indicating one or more measurements associated with at least one of the source base station or the one or more candidate base stations. The apparatus may include means for performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

Some aspects described herein relate to an apparatus for wireless communication. The apparatus may include means for transmitting, to a UE, configuration information for a conditional handover, wherein the configuration information indicates one or more execution conditions and one or more SCG configurations associated with one or more candidate base stations. The apparatus may include means for receiving, from the UE, a measurement report indicating one or more measurements. The apparatus may include means for transmitting, to the UE, an indication of an updated SCG configuration for an SCG configuration, of the one or more SCG configurations, associated with a candidate base station of the one or more candidate base stations, wherein the updated SCG configuration is based at least in part on the one or more measurements.

Some aspects described herein relate to an apparatus for wireless communication. The apparatus may include means for transmitting, to a source base station, an indication of a SCG configuration for a conditional handover associated with the base station. The apparatus may include means for performing, with a UE, the conditional handover using an updated SCG configuration associated with the SCG configuration, wherein the updated SCG configuration is based at least in part on one or more measurements performed by the UE.

Some aspects described herein relate to an apparatus for wireless communication. The apparatus may include means for receiving, from a source base station, configuration information for a conditional handover, wherein the configuration information indicates an execution condition that is associated with PCells of one or more candidate base stations and at least one of SCGs of the one or more candidate base stations or PSCells of the one or more candidate base stations. The apparatus may include means for transmitting, to a candidate base station of the one or more candidate base stations, a message to initiate the conditional handover based at least in part on detecting that the execution condition has been satisfied.

Some aspects described herein relate to an apparatus for wireless communication. The apparatus may include means for receiving, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The apparatus may include means for receiving, from the UE, a message to initiate the conditional handover based at least in part on an execution condition being satisfied.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
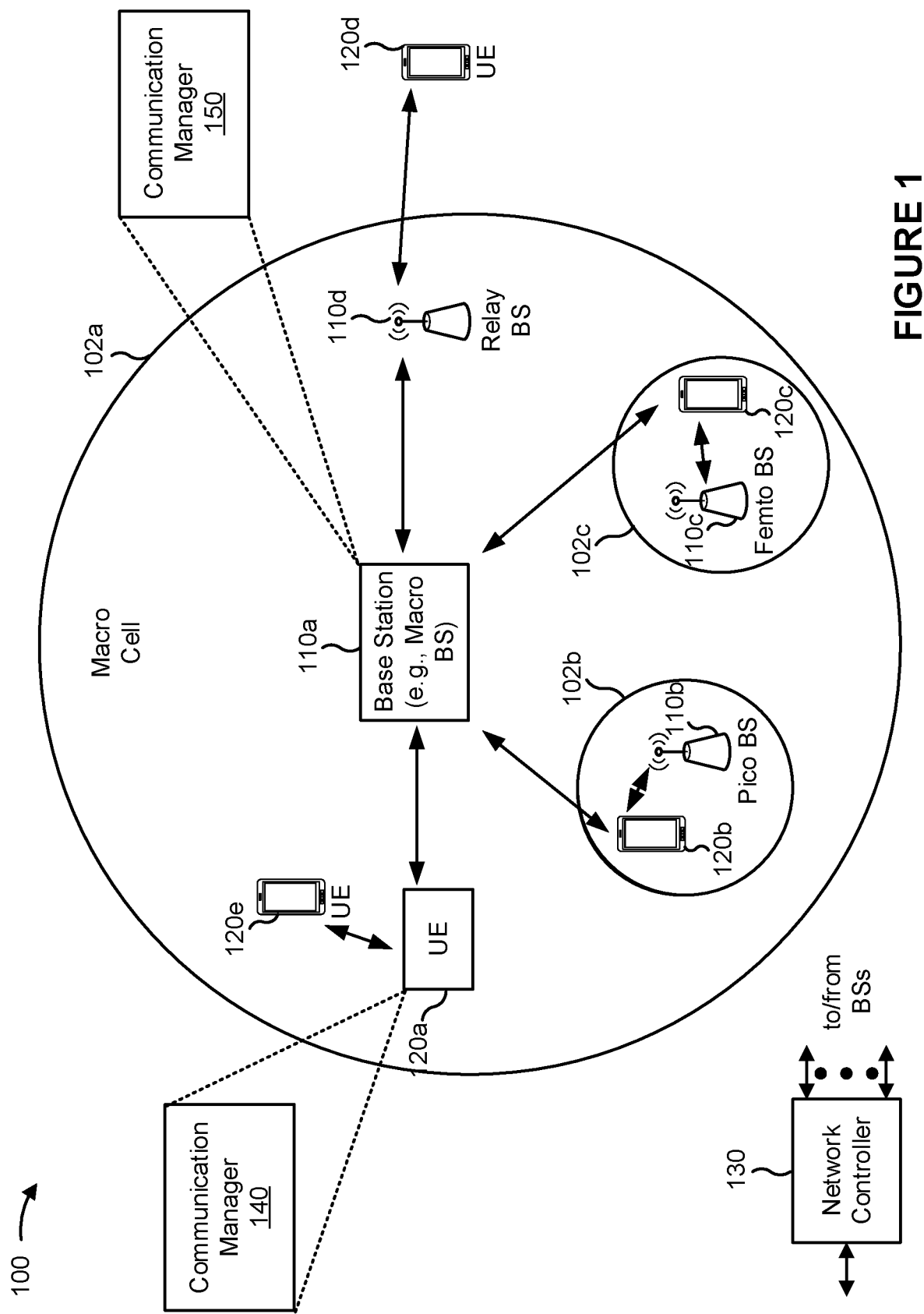
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to mobility enhancements for conditional handover procedures. Some aspects more specifically relate to enabling secondary cell group (SCG) configurations for candidate base stations associated with a conditional handover procedure to be updated based at least in part on measurements performed by a user equipment (UE). For example, the UE may perform measurements of a source base station and one or more candidate base stations associated with the conditional handover procedure (for example, after the conditional handover procedure is initially configured). In some aspects, a candidate base station may receive an indication of the measurements performed by the UE (for example, via the source base station) and may update an SCG configuration for the candidate base station (associated with the conditional handover procedure) based at least in part on the measurements performed by the UE. In some other aspects, the source base station may update the SCG configuration for a candidate base station based at least in part on the measurements performed by the UE. The source base station may transmit, to the UE or the candidate base station, an indication of the updated SCG configuration. In some other aspects, the UE may update the SCG configuration for a candidate base station based at least in part on the measurements performed by the UE. For example, the SCG configuration may indicate one or more candidate cells or candidate cell pairs. The UE may select one or more cells to be included in the SCG for the candidate base station based at least in part on the measurements performed by the UE.

Some aspects more specifically relate to providing execution conditions for a conditional handover procedure that are associated with an SCG or a PSCell of a candidate base station. For example, the UE may consider measurements or information associated with a primary cell (PCell) and a primary secondary cell (PSCell) (or a PCell and an SCG) of a candidate base station when determining whether an execution condition (for triggering the conditional handover procedure) has been satisfied. The UE may determine whether a PSCell or an SCG of the candidate base station should be added as part of the triggered conditional handover procedure. Some aspects more specifically relate to providing execution conditions for a conditional handover procedure that are based at least in part on beam-based measurements or beam-level measurements (for example, rather than only cell-based measurements). "Beam-based measurement" may refer to a measurement of a signal that is performed using a given beam (for example, defined or indicated by a transmission configuration indicator (TCI) state). For example, an execution condition associated with the conditional handover procedure may be based at least in part on Layer 1 beam-based measurements (for example, where Layer 1 filtering is applied to the measurement) or Layer 3 beam-based measurements (for example, where Layer 3 filtering is applied to the measurement).

Particular aspects of the subject matter described in this disclosure can be implemented to realize one or more of the following potential advantages. In some examples, the described techniques can be used to improve mobility for a UE. In some aspects, the described techniques can be used to improve a likelihood that a connection with an SCG of a candidate base station can be established as part of a conditional handover procedure. Establishing a connection with an SCG may enable the UE to operate in a dual connectivity mode, thereby improving communication performance, efficiency, or throughput, among other examples. In some aspects, the described techniques can be used to enhance execution conditions of a conditional handover procedure by using beam-based measurements (rather than cell-based measurements). Using beam-based measurements provides a more precise measurement of candidate base stations, thereby improving a likelihood that a triggered conditional handover procedure is successful.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a source base station (e.g., a base station 110), configuration information for a conditional handover, wherein the configuration information indicates an execution condition and one or more SCG configurations associated with one or more candidate base stations; transmit, to the source base station, a measurement report indicating one or more measurements associated with at least one of the source base station or the one or more candidate base stations; and perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements. As described in more detail elsewhere herein, the communication manager 140 may receive, from a source base station, configuration information for a conditional handover, wherein the configuration information indicates an execution condition that is associated with PCells of one or more candidate base stations and at least one of SCGs of the one or more candidate base stations or PSCells of the one or more candidate base stations; and transmit, to a candidate base station of the one or more candidate base stations, a message to initiate the conditional handover based at least in part on detecting that the execution condition has been satisfied. Additionally or alternatively, the communication manager 140 may perform one or more other operations described herein.

In some aspects, the base station 110 may include a communication manager 150. As described in more detail elsewhere herein, the communication manager 150 may transmit, to a UE 120, configuration information for a conditional handover, wherein the configuration information indicates one or more execution conditions and one or more SCG configurations associated with one or more candidate base stations; receive, from the UE 120, a measurement report indicating one or more measurements; and transmit, to the UE 120, an indication of an updated SCG configuration for an SCG configuration, of the one or more SCG configurations, associated with a candidate base station of the one or more candidate base stations, wherein the updated SCG configuration is based at least in part on the one or more measurements. As described in more detail elsewhere herein, the communication manager 150 may transmit, to a source base station, an indication of an SCG configuration for a conditional handover associated with the base station; and perform, with a UE 120, the conditional handover using an updated SCG configuration associated with the SCG configuration, wherein the updated SCG configuration is based at least in part on one or more measurements performed by the UE 120. As described in more detail elsewhere herein, the communication manager 150 may receive, from a source base station, configuration information for a conditional handover associated with a UE 120, wherein the configuration information indicates an execution condition that is associated with PCells of one or more candidate base stations, including the base station, and at least one of SCGs of the one or more candidate base stations or PSCells of the one or more candidate base stations; and receive, from the UE 120, a message to initiate the conditional handover based at least in part on an execution condition being satisfied. Additionally or alternatively, the communication manager 150 may perform one or more other operations described herein.

Figure 2:
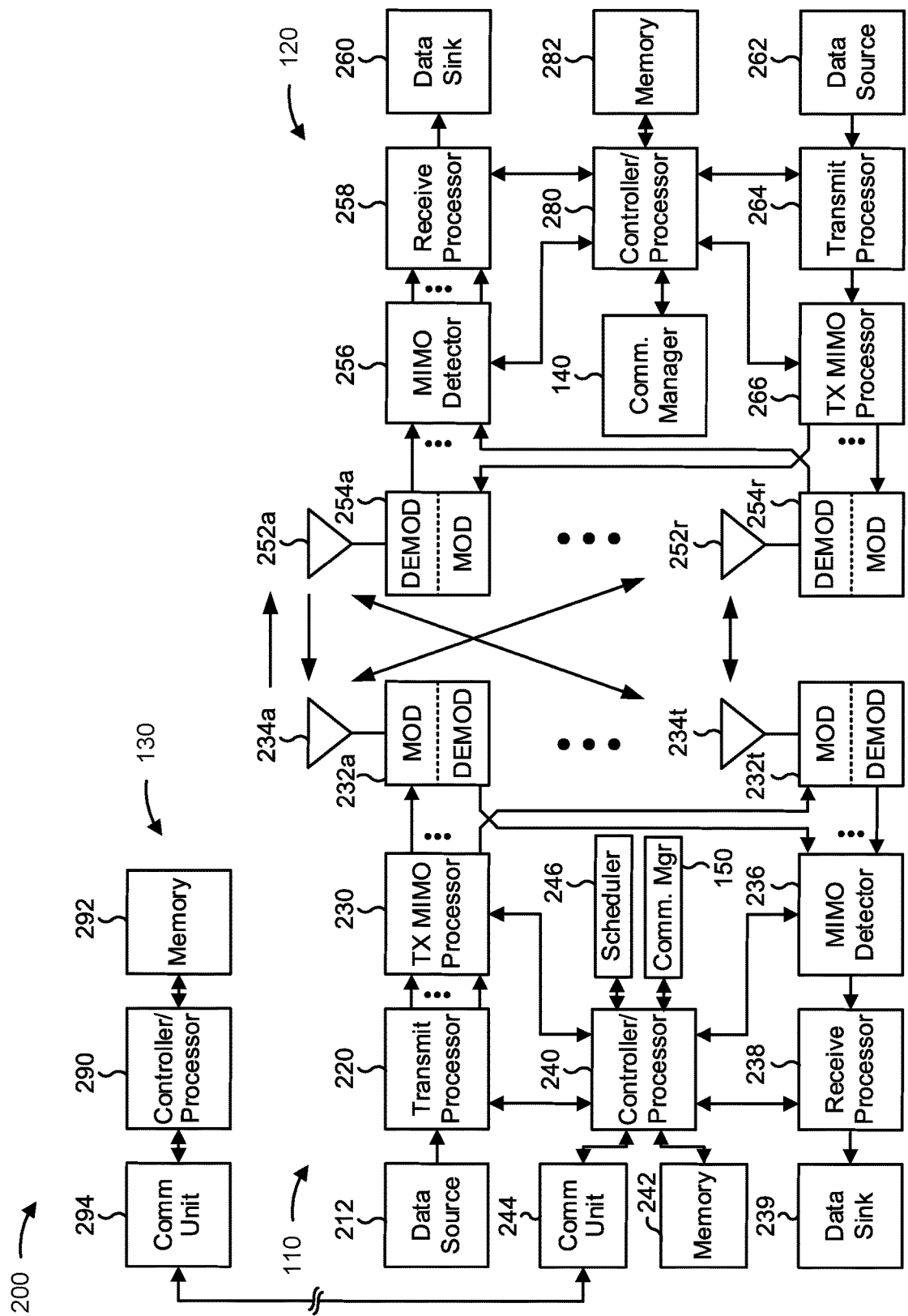
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with mobility enhancements for conditional handovers, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, process 900 of FIG. 9, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, the UE includes means for receiving, from a source base station, configuration information for a conditional handover, wherein the configuration information indicates an execution condition and one or more SCG configurations associated with one or more candidate base stations; means for transmitting, to the source base station, a measurement report indicating one or more measurements associated with at least one of the source base station or the one or more candidate base stations; or means for performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements. In some aspects, the UE includes means for receiving, from a source base station, configuration information for a conditional handover, wherein the configuration information indicates an execution condition that is associated with PCells of one or more candidate base stations and at least one of SCGs of the one or more candidate base stations or PSCells of the one or more candidate base stations; or means for transmitting, to a candidate base station of the one or more candidate base stations, a message to initiate the conditional handover based at least in part on detecting that the execution condition has been satisfied. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, configuration information for a conditional handover, wherein the configuration information indicates one or more execution conditions and one or more SCG configurations associated with one or more candidate base stations; means for receiving, from the UE, a measurement report indicating one or more measurements; or means for transmitting, to the UE, an indication of an updated SCG configuration for an SCG configuration, of the one or more SCG configurations, associated with a candidate base station of the one or more candidate base stations, wherein the updated SCG configuration is based at least in part on the one or more measurements. In some aspects, the base station includes means for transmitting, to a source base station, an indication of a SCG configuration for a conditional handover associated with the base station; or means for performing, with a UE, the conditional handover using an updated SCG configuration associated with the SCG configuration, wherein the updated SCG configuration is based at least in part on one or more measurements performed by the UE. In some aspects, the base station includes means for receiving, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations; or means for receiving, from the UE, a message to initiate the conditional handover based at least in part on an execution condition being satisfied. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
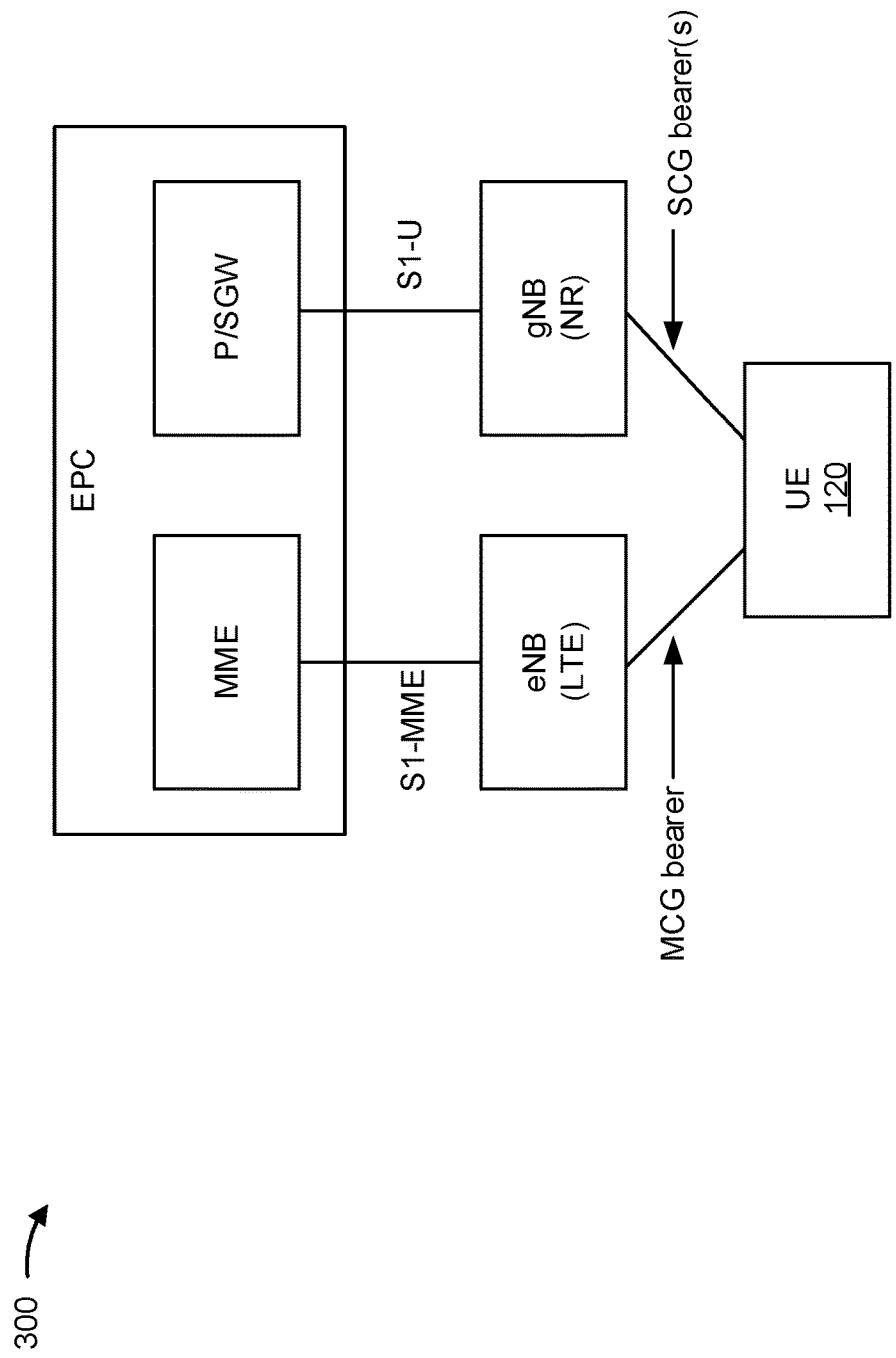
FIG. 3 is a diagram illustrating an example of dual connectivity, in accordance with the present disclosure.

FIG. 3 is a diagram illustrating an example of dual connectivity 300, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, examples described herein may apply to an ENDC mode (for example, where the MCG is associated with an LTE RAT and the SCG is associated with an NR RAT), an NR-E-UTRA dual connectivity (NEDC) mode (for example, where the MCG is associated with an NR RAT and the SCG is associated with an LTE RAT), an NR dual connectivity (NRDC) mode (for example, where the MCG is associated with an NR RAT and the SCG is also associated with the NR RAT), or another dual connectivity mode (for example, where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, or another type of dual connectivity mode.

As shown in FIG. 3, a UE 120 may communicate with both an eNB (for example, a 4G base station 110) and a gNB (for example, a 5G base station 110), and the eNB and the gNB may communicate (for example, directly or indirectly) with a 4G/LTE core network, shown as an evolved packet core (EPC) that includes a mobility management entity (MME), a packet data network gateway (PGW), a serving gateway (SGW), or other devices. In FIG. 3, the PGW and the SGW are shown collectively as P/SGW. In some examples, the eNB and the gNB may be co-located at the same base station 110. In some other examples, the eNB and the gNB may be included in different base stations 110 (for example, may not be co-located).

As further shown in FIG. 3, in some examples, a wireless network that enables operation in a 5G NSA mode may enable such operations using an MCG for a first RAT (for example, an LTE RAT or a 4G RAT) and an SCG for a second RAT (for example, an NR RAT or a 5G RAT). In such examples, the UE 120 may communicate with the eNB via the MCG, and may communicate with the gNB via the SCG. In some examples, the MCG may anchor a network connection between the UE 120 and the 4G/LTE core network (for example, for mobility, coverage, or control plane information), and the SCG may be added as additional carriers to increase throughput (for example, for data traffic or user plane information). In some examples, the gNB and the eNB may not transfer user plane information between one another. In some examples, a UE 120 operating in a dual connectivity mode may be concurrently connected with an LTE base station 110 (such as an eNB) and an NR base station 110 (such as a gNB) (for example, in the case of ENDC or NEDC), or may be concurrently connected with one or more base stations 110 that use the same RAT (for example, in the case of NRDC). In some examples, the MCG may be associated with a first frequency band (for example, a sub-6 GHz band or an FR1 band) and the SCG may be associated with a second frequency band (for example, a millimeter wave band or an FR2 band).

The UE 120 may communicate via the MCG and the SCG using one or more radio bearers (for example, data radio bearers (DRBs) or signaling radio bearers (SRBs)). For example, the UE 120 may transmit or receive data via the MCG or the SCG using one or more DRBs. Similarly, the UE 120 may transmit or receive control information (for example, radio resource control (RRC) information or measurement reports) using one or more SRBs. In some examples, a radio bearer may be dedicated to a specific cell group (for example, a radio bearer may be an MCG bearer or an SCG bearer). In some examples, a radio bearer may be a split radio bearer. A split radio bearer may be split in the uplink or in the downlink. For example, a DRB may be split on the downlink (the UE 120 may receive downlink information for the MCG or the SCG in the DRB) but not on the uplink (the uplink may be non-split with a primary path to the MCG or the SCG, such that the UE 120 transmits in the uplink only on the primary path). In some examples, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

In some cases, the UE 120 may be configured with a primary carrier or a PCell and one or more secondary carriers or one or more secondary cells (SCells), such as when carrier aggregation is configured for the UE 120. In some examples, the primary carrier or the PCell may carry control information (for example, downlink control information or scheduling information) for scheduling data communications on one or more secondary carriers, which may be referred to as cross-carrier scheduling. In some examples, a carrier (for example, a primary carrier or a secondary carrier) may carry control information for scheduling data communications on the carrier, which may be referred to as self-carrier scheduling or carrier self-scheduling. For example, the MCG may be associated with a PCell and the SCG may be associated with one or more SCells. In some examples, the SCG may be associated with a PSCell. The PSCell may be an SCell of the SCG that the UE 120 uses for initial access with the SCG. In some examples, the PSCell may be an SCell of the SCG that is configured with a control channel for the UE 120 (for example, a physical uplink control channel (PUCCH)) or an SCell of the SCG with which the UE 120 has performed a random access channel (RACH) procedure to establish a connection with the SCG. In some examples, feedback for a downlink channel of the SCG may be transmitted by the UE 120 to the PSCell (for example, rather than other SCells of the SCG).

Figure 4:
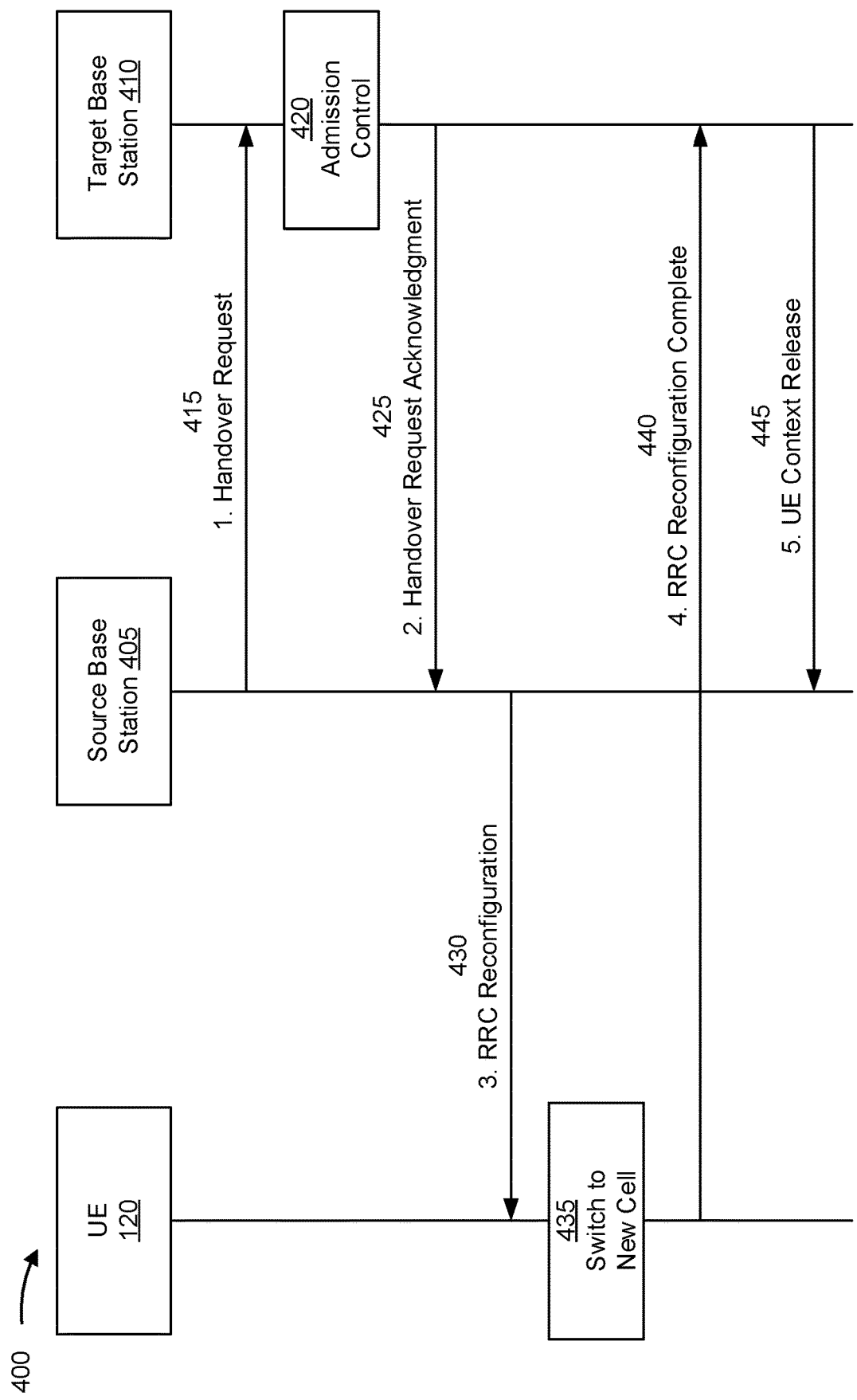
FIG. 4 is a diagram illustrating an example of a handover procedure, in accordance with the present disclosure.

FIG. 4 is a diagram illustrating an example of a handover procedure 400, in accordance with the present disclosure. The handover procedure may be performed by a UE 120, a source base station 405 (for example, a base station 110), and a target base station 410 (for example, another base station 110). As used herein, "source base station" may refer to a serving base station or a base station with which the UE 120 currently has an active or established connection. "Target base station" may refer to a base station that is identified as a base station to replace a serving base station for a UE 120 (for example, as part on a handover procedure). In some examples, the source base station 405 may be associated with a PCell and the target base station 410 may be associated with a target cell to replace the source base station 405 as the PCell for an MCG. In some other examples, the source base station 405 may be associated with a PSCell and the target base station 410 may be a target cell to replace the source base station 405 as the PSCell for an SCG.

As shown in FIG. 4, in a first operation 415, the source base station 405 may initiate handover of the UE 120 to the target base station 410 by transmitting a handover request message to the target base station 410. The source base station 405 may transmit the handover request message to the target base station 410 over an Xn, X2, or a next generation application protocol (NGAP) interface, among other examples. In a second operation 420, the target base station 410 may perform admission control procedures associated with the handover based at least in part on receiving the handover request message. In a third operation 425, the target base station 410 may transmit a handover request acknowledgment message to the source base station 405 (for example, if the admission control procedures indicate that the target base station 110-2 can accept the handover of the UE 120). The handover request acknowledgment message may include an RRC configuration for connection to the target base station 410.

In a fourth 430, the source base station 405 may transmit the RRC configuration to the UE 120 by forwarding the RRC configuration of the handover request acknowledgment message to the UE 120. In a fifth operation 435, the UE 120 may change an RRC connection from the source base station 405 to the target base station 410 based at least in part on the RRC configuration. In a sixth operation 440, the UE 120 may transmit an RRC reconfiguration complete message to the target base station 410. The RRC reconfiguration complete message may indicate that the UE 120 has changed the RRC connection from the source base station 405 to the target base station 410. In a seventh operation 445, the target base station 410 may transmit a UE context release message to the source base station 405. The UE context release message may indicate that the handover of the UE 120 to the target base station 410 was successful.

In some examples, the UE 120 may be unable to successfully connect with the target base station 410. For example, the UE 120 may attempt to connect with the target base station 410 (for example, by performing a RACH procedure with the target base station 410), but the attempt to connect with the target base station 410 may fail. If the UE 120 is unable to successfully connect with the target base station 410, then the UE 120 may perform a connection re-establishment procedure to re-establish a connection with the source base station 405 or another base station 110. For example, the UE 120 may transmit an RRC re-establishment request message to the network (for example, to the source base station 405 or another base station 110). Additionally, the UE 120 may reset a medium access control (MAC) entity of the UE 120, release the RRC configuration for the handover procedure, suspend all radio bearers (except SRBO in some examples), release a connection with any configured SCells, or release all other configurations stored by the UE 120, among other examples. Therefore, the UE 120 may re-establish an RRC connection (for example, with the source base station 405 or another base station 110) in the event that the handover procedure with the target base station 410 fails.

Figure 5:
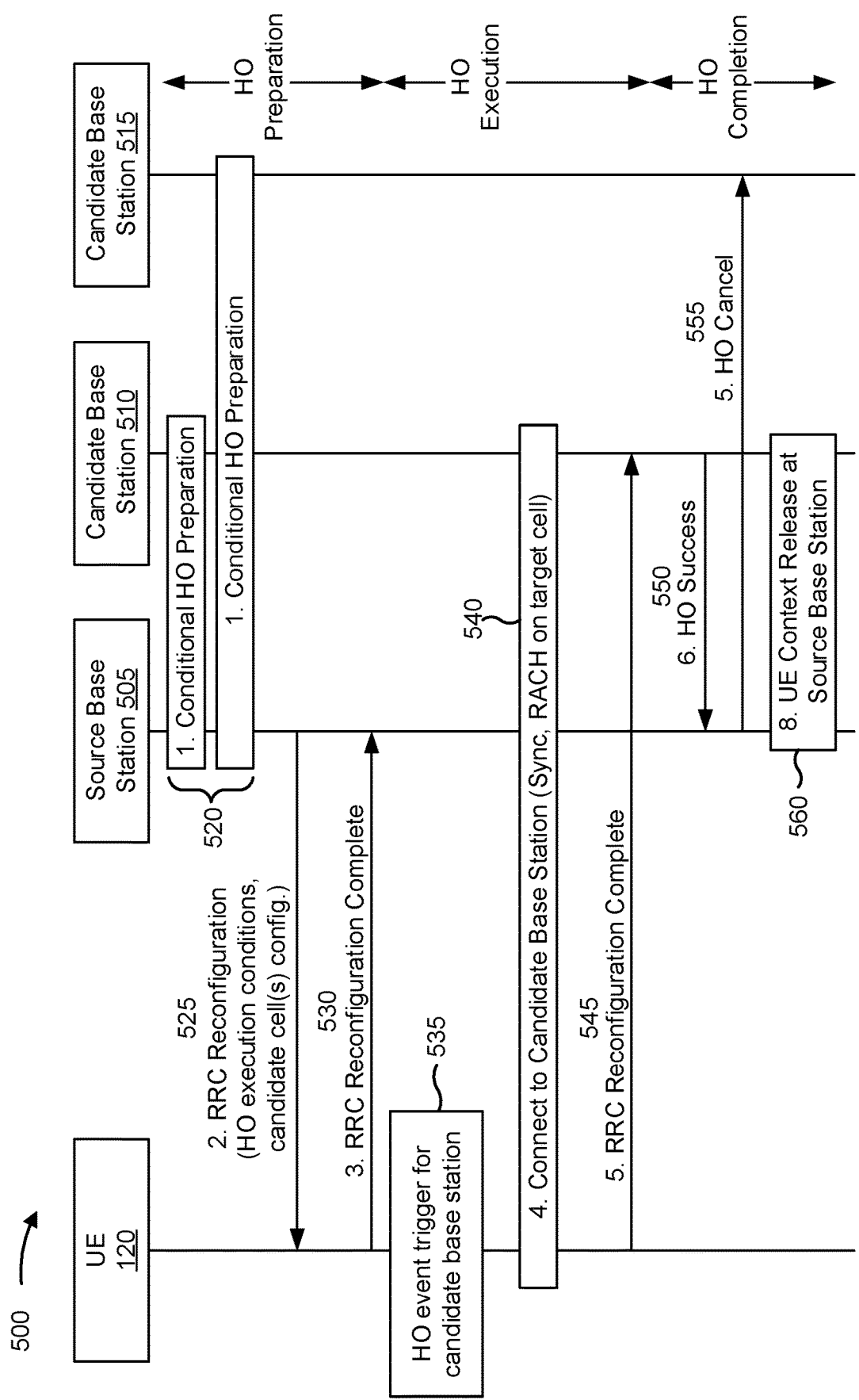
FIG. 5 is a diagram illustrating an example of a conditional handover procedure, in accordance with the present disclosure.

FIG. 5 is a diagram illustrating an example of a conditional handover procedure 500, in accordance with the present disclosure. The conditional handover procedure 500 may be performed by a UE 120, a source base station 505 (for example, a base station 110 or the source base station 405), and one or more candidate base stations 510, and 515. As used herein, "candidate base station" may refer to a base station that is a candidate to serve as a target base station for the UE as part of a handover procedure. In some examples, the source base station 505 may be associated with a PCell and the candidate base stations 510, and 515 may be associated with a target cell to replace the source base station 505 as a PCell for an MCG (or as a PSCell for an SCG).

As shown in FIG. 5, in a first operation 520, the source base station 505 may communicate with a first candidate base station 510 and a second candidate base station 515 to prepare the first and second candidate base stations 510, 515 for a conditional handover of the UE 120. For example, the source base station 505 may transmit a handover request message to the first candidate base station 510 or the second candidate base station 515. The first candidate base station 510 or the second candidate base station 515 may transmit a handover request acknowledgment message to the source base station 505, as described above in connection with FIG. 4. In a second operation 525, the source base station 505 may transmit an RRC reconfiguration message to the UE 120. The RRC reconfiguration message may include a conditional handover configuration that indicates configurations for the candidate base stations 510, 515, indicates one or more criteria or execution conditions (for example, conditional thresholds) that trigger handover, among other examples. In a third operation 530, the UE 120 may transmit an RRC reconfiguration complete message to the source base station 505, which may indicate that the UE 120 has applied the RRC reconfiguration (for example, the conditional handover configuration).

In a fourth operation 535, the UE 120 may detect a conditional handover event for the first candidate base station 510. For example, the UE 120 may determine that the one or more criteria or execution conditions for triggering handover to the first candidate base station 510 are satisfied (for example, a measurement associated with a signal transmitted by the second candidate base station 515 may satisfy a threshold or may be greater than (by a threshold amount) a measurement associated with a signal transmitted by the source base station 505). In a fifth operation 540, the UE 120 may change an RRC connection from the source base station 505 to the first candidate base station 510, as described above in connection with FIG. 4, based at least in part on detecting the conditional handover event or execution condition for the first candidate base station 510. That is, the UE 120 may execute the handover upon detecting the conditional handover event, and not wait for an RRC reconfiguration message from the source base station 505. This may reduce handover latency.

In a sixth operation 545, the UE 120 may transmit an RRC reconfiguration complete message to the first candidate base station 510. The RRC reconfiguration complete message may indicate that the UE 120 has changed an RRC connection from the source base station 505 to the first candidate base station 510, as described above in connection with FIG. 4. In a seventh operation 550, the first candidate base station 510 may transmit a handover success message (for example, indicating successful handover of the UE 120) to the source base station 505. In an eight operation 555, the source base station 505 may transmit a handover cancel message to the second candidate base station 515. The handover cancel message may indicate that the second candidate base station 515 is to discard the handover request message (for example, transmitted in connection with the first operation 520). In a ninth operation 560, the source base station 505 and the first candidate base station 510 may perform a UE context release procedure to release the UE 120 context at the source base station 505.

In a similar manner as described above, in connection with FIG. 4, the UE 120 may be unable to establish a connection with the first candidate base station 510. For example, the handover procedure with the first candidate base station 510 may fail. In some examples, the UE 120 may attempt to perform a RACH procedure with the first candidate base station 510, but the RACH procedure may be unsuccessful. In some examples, rather than releasing one or more (or all) RRC configurations at the UE 120 when the handover procedure with the first candidate base station 510 fails, the UE 120 may maintain the conditional handover configuration. This may enable the UE 120 to continue to search for or measure candidate base stations indicated by the conditional handover configuration. For example, the UE 120 may detect a conditional handover event for the second candidate base station 515. For example, the UE 120 may determine that the one or more criteria or execution condition(s) for triggering handover to the second candidate base station 515 are satisfied (for example, after the handover attempt with the first candidate base station 510 fails). As the UE 120 has not released the conditional handover configuration, the UE 120 may change an RRC connection from the source base station 505 to the second candidate base station 515, as described above in connection with FIG. 4, based at least in part on detecting the conditional handover event for the second candidate base station 515. That is, the UE 120 may execute the handover upon detecting the conditional handover event, and not wait for an RRC reconfiguration message from the source base station 505. Moreover, the UE 120 may not wait for an additional conditional handover reconfiguration after the handover attempt with the first candidate base station 510 fails. This may reduce handover latency associated with conditional handovers.

In some cases, a candidate base station (such as the first candidate base station 510 or the second candidate base station 515) may transmit, to a source base station, an SCG configuration associated with the candidate base station. For example, the candidate base station may transmit the SCG configuration as part of a conditional handover procedure preparation (such as part of the first operation 520). The candidate base station may transmit the SCG configuration to the source base station in a handover request acknowledgment message. The SCG configuration may indicate information for PSC ells or one or more SCells associated with the SCG configuration. The candidate base station may determine the SCG configuration based at least in part on one or more measurements indicated to the candidate base station by the source base station (for example, in a handover request message transmitted as part of the first operation 520). For example, the UE 120 may perform one or more measurements (such as of signals transmitted by the source base station or one or more candidate base stations). The UE 120 may transmit, to the source base station, an indication of the one or more measurements in a measurement report. The source base station may provide an indication of the measurements (performed by the UE 120) to the candidate base station to enable the candidate base station to make decisions regarding configurations (such as an SCG configuration) for the conditional handover procedure.

However, as described above, some time may pass between a time when the conditional handover is configured (for example, in the first operation 520, the second operation 525, or the third operation 530) and a time when the conditional handover is triggered (for example, in the fourth operation 535). Channel conditions may change between the time when the conditional handover is configured and the time when the conditional handover is triggered. For example, cells (a PSCell or an SCell) originally configured in the SCG by the candidate base station may be experiencing poor channel conditions (for example, a low signal quality or a low signal strength) for the UE 120 at the time that the conditional handover is triggered. In other words, the candidate base station may determine the SCG configuration associated with the conditional handover procedure using measurements that are outdated by the time when the conditional handover is triggered. Moreover, execution conditions for the conditional handover may be based at least in part on PCell measurements (by the UE 120) of the candidate base station. For example, the UE 120 may not take measurements of a cell included in the SCG of the candidate base station when determining whether the conditional handover has been triggered. Therefore, the UE 120 may trigger the conditional handover procedure with the candidate cell when channel conditions associated with an SCG of the candidate base station are poor. As a result, the UE 120 may experience an SCG failure associated with attempting to add the SCG of the candidate base station as part of the conditional handover procedure.

Additionally, the UE 120 may rely on cell-based measurements for determining whether an execution condition (for example, for triggering the conditional handover procedure) has been satisfied. For example, the measurements used by the UE 120 for determining whether an execution condition (for example, for triggering the conditional handover procedure) has been satisfied may be based on a filtered measurement corresponding to a cell. However, some wireless networks, such as 5G wireless networks or millimeter wave wireless networks, use beams to communicate messages. For example, a UE and a base station may use a beam (for example, associated with a given spatial direction) to communicate. Therefore, using a cell-based measurement to determine whether an execution condition (for example, for triggering the conditional handover procedure) has been satisfied may result in a conditional handover procedure being triggered with a candidate base station that uses a beam to communicate with the UE that is associated with a poor signal quality or a poor signal strength. For example, because measurements of different beams are not considered by the UE when determining whether an execution condition (for example, for triggering the conditional handover procedure) has been satisfied, the UE may experience poor channel conditions using a given beam associated with the candidate base station.

Various aspects relate generally to mobility enhancements for conditional handover procedures. Some aspects more specifically relate to enabling SCG configurations for candidate base stations associated with a conditional handover procedure to be updated based at least in part on measurements performed by a UE. For example, the UE may perform measurements of a source base station and one or more candidate base stations associated with the conditional handover procedure (for example, after the conditional handover procedure is initially configured). In some aspects, a candidate base station may receive an indication of the measurements performed by the UE (for example, via the source base station) and may update an SCG configuration for the candidate base station (for example, associated with the conditional handover procedure) based at least in part on the measurements performed by the UE. In some other aspects, the source base station may update the SCG configuration for a candidate base station based at least in part on the measurements performed by the UE. The source base station may transmit, to the UE or the candidate base station, an indication of the updated SCG configuration. In some other aspects, the UE may update the SCG configuration for a candidate base station based at least in part on the measurements performed by the UE. For example, the SCG configuration may indicate one or more candidate cells or candidate cell pairs. The UE may select one or more cells to be included in the SCG for the candidate base station based at least in part on the measurements performed by the UE.

Some aspects more specifically relate to providing execution conditions for a conditional handover procedure that are associated with an SCG or a PSCell of a candidate base station. For example, the UE may consider measurements or information associated with a PCell and a PSCell (or a PCell and an SCG) of a candidate base station when determining whether an execution condition (for example, for triggering the conditional handover procedure) has been satisfied. The UE may determine whether a PSCell or an SCG of the candidate base station should be added as part of the triggered conditional handover procedure. Some aspects more specifically relate to providing execution conditions for a conditional handover procedure that are based at least in part on beam-based measurements or beam level measurements (for example, rather than only cell-based measurements). For example, an execution condition associated with the conditional handover procedure may be based at least in part on Layer 1 beam-based measurements (for example, where Layer 1 filtering is applied to the measurement) or Layer 3 beam-based measurements (for example, where Layer 3 filtering is applied to the measurement).

Particular aspects of the subject matter described in this disclosure can be implemented to realize one or more of the following potential advantages. In some examples, the described techniques can be used to improve mobility for a UE. In some aspects, the described techniques can be used to improve a likelihood that a connection with an SCG of a candidate base station can be established as part of a conditional handover procedure. Establishing a connection with an SCG may enable the UE to operate in a dual connectivity mode, thereby improving communication performance, efficiency, or throughput, among other examples. In some aspects, the described techniques can be used to enhance execution conditions of a conditional handover procedure by using beam-based measurements (rather than cell-based measurements). Using beam-based measurements provides a more precise measurement of candidate base stations, thereby improving a likelihood that a triggered conditional handover procedure is successful.

Figure 6A:
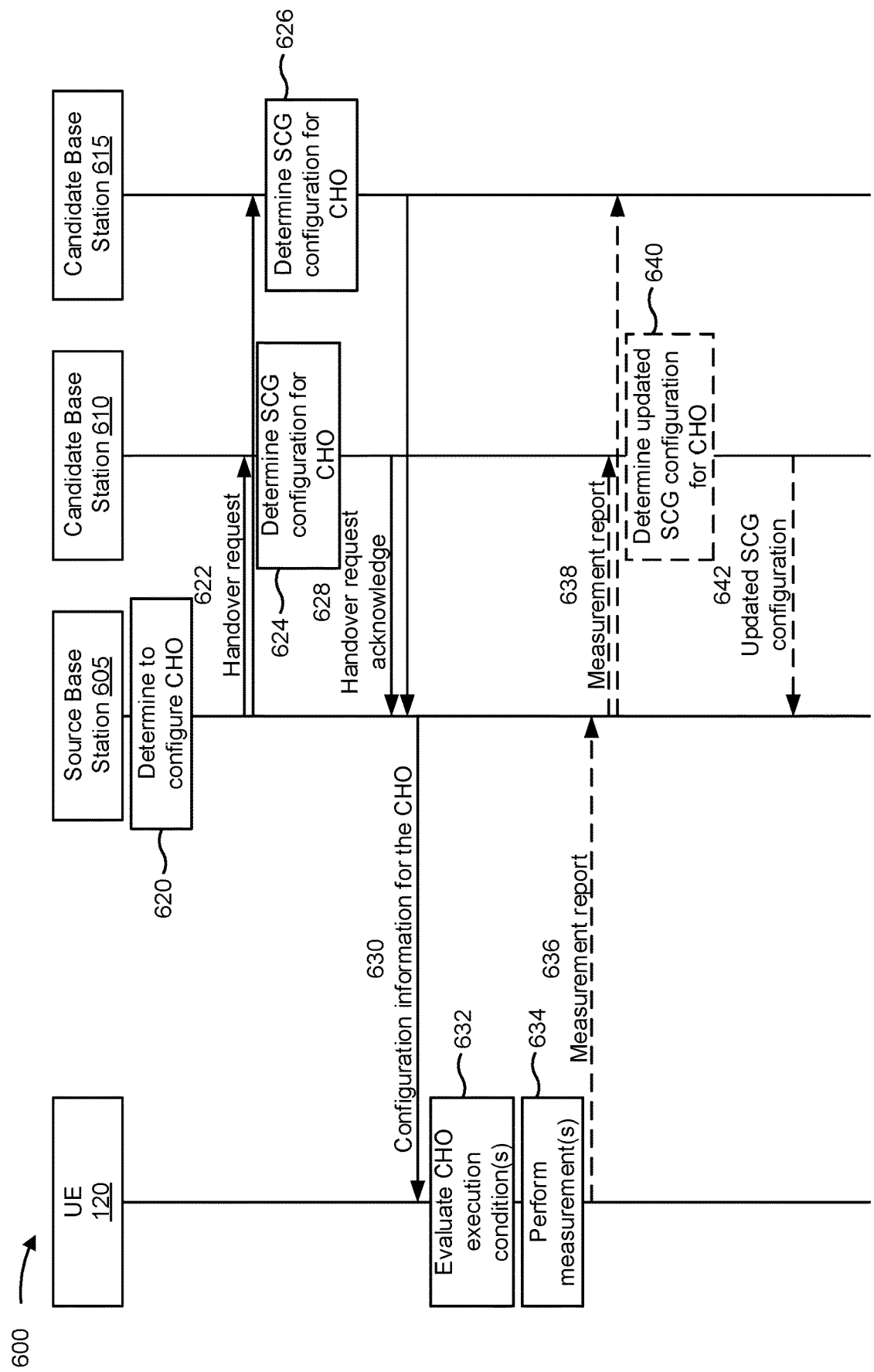
FIGS. 6A and 6B are diagrams illustrating examples associated with mobility enhancements for a conditional handover, in accordance with the present disclosure.
Figure 6B:
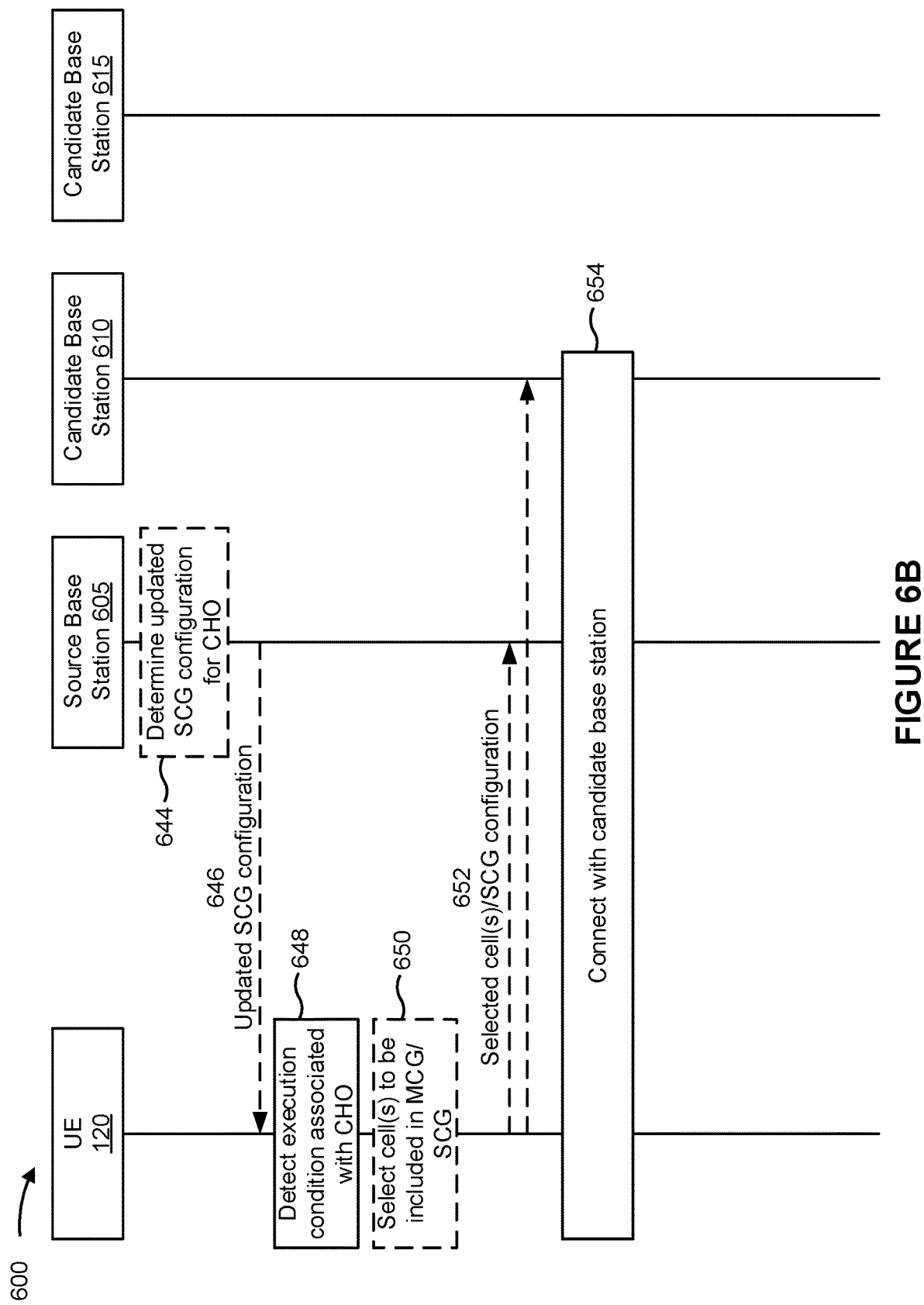

FIGS. 6A and 6B are diagrams illustrating an example of mobility enhancements for a conditional handover 600, in accordance with the present disclosure. As shown in FIGS. 6A and 6B, the UE 120 may communicate (for example, transmit an uplink transmission or receive a downlink transmission) with a source base station 605 (for example, a base station 110), a first candidate base station 610 (for example, a base station 110), or a second candidate base station 615 (for example, a base station 110). The UE 120, the source base station 605, the first candidate base station 610, or the second candidate base station 615 may be part of a wireless network (such as the wireless network 100). The source base station 605 may be a serving base station for the UE 120. For example, the UE 120 may have an established connection (such as an RRC connection in an active or connected state) with the source base station 605. The first candidate base station 610 and the second candidate base station 615 may be candidate base stations for a handover procedure (such as a conditional handover procedure). For example, the first candidate base station 610 and the second candidate base station 615 may be associated with neighboring cell(s) to the source base station 605 (for example, the first candidate base station 610 and the second candidate base station 615 may be geographically positioned proximate to the source base station 605). As used herein, "candidate base station" may refer to the first candidate base station 610, the second candidate base station 615, or any other candidate base station associated with a conditional handover procedure.

As shown in FIG. 6A, in a first operation 620, the source base station 605 may determine to configure a conditional handover (CHO) for the UE 120. For example, the source base station 605 may determine that one or more candidate base stations (or candidate cells), such as the first candidate base station 610 or the second candidate base station 615, should be configured for a conditional handover at the UE 120 (for example, in a similar manner as described in connection with FIG. 5).

In some aspects, the source base station 605 may determine that the conditional handover should be configured at the UE 120 based at least in part on one or more measurements performed by the UE 120. For example, the source base station 605 may configure (for example, as part of an RRC configuration) the UE 120 to perform one or more measurements of the source base station 605 or of neighboring base stations or cells (such as the first candidate base station 610 and the second candidate base station 615). For example, the source base station 605 may configure one or measurement objects for the UE 120 (for example, indicating what is to be measured by the UE 120) as part of a measurement and reporting configuration. The UE 120 may transmit, to the source base station 605, one or more measurement reports (for example, in accordance with a reporting configuration) that indicate measurement values of measurements performed by the UE 120. The UE 120 may perform inter-frequency measurements (for example, associated with base stations or cells that use an operating frequency that is different than an operating frequency of the source base station 605) or intra-frequency measurements (for example, associated with an operating frequency that is the same as an operating frequency of the source base station 605). The source base station 605 may determine that a conditional handover configuration should be transmitted to the UE 120 based at least in part on one or more measurements indicated to the source base station 605 by the UE 120. In other words, the source base station 605 may determine whether a conditional handover should be configured based at least in part on measurement report information transmitted by the UE 120.

In a second operation 622, the source base station 605 may transmit, to the first candidate base station 610 and the second candidate base station 615, a handover request message. The handover request message may indicate that a candidate base station, or candidate cell, is to be configured (for example, at the UE 120) as part of the conditional handover configuration. For example, the handover request message may indicate a request for the candidate base station to provide cell configuration information associated with the candidate base station for the conditional handover configuration. In some aspects, the handover request message may indicate measurement report information transmitted by the UE 120 to the source base station 605. For example, the source base station 605 may indicate, to each candidate base station, measurement report information (such as one or more measurements performed by the UE 120) to enable the candidate base station(s) to make the cell configuration determinations. Although FIGS. 6A and 6B show two candidate base stations, the source base station 605 may transmit the handover request message to more candidate base stations or less candidate base stations.

In a third operation 624, the first candidate base station 610 may determine one or more cell configurations for the conditional handover. For example, the first candidate base station 610 may determine an MCG configuration or an SCG configuration for the conditional handover. The cell configuration may indicate one or more cells, associated with the first candidate base station 610, that are to be included in a cell group (for example, an MCG or an SCG) for the conditional handover. For example, the cell configuration may indicate a PCell or a PSCell associated with the first candidate base station 610. The cell configuration may be used by the UE 120 to establish a connection with the first candidate base station 610 if the conditional handover is triggered for the first candidate base station 610 (as explained in more detail elsewhere herein). The first candidate base station 610 may determine the cell configuration based at least in part on the measurement report information indicated via the handover request message.

For example, the first candidate base station 610 may determine a cell to serve as a PCell or a PSCell-based at least in part on measurements of one or more cells (performed by the UE 120) associated with the first candidate base station 610. For example, the first candidate base station 610 may select a PCell-based at least in part on a cell, from a set of cells associated with the first candidate base station 610, that is associated with a highest measurement value (for example, a highest RSRP or RSRQ). Similarly, the first candidate base station 610 may determine whether an SCG should be configured based at least in part on measurements of one or more cells (performed by the UE 120) associated with the first candidate base station 610. For example, the first candidate base station 610 may select a cell to serve as the PSCell for an SCG based at least in part on the measurements of one or more cells (performed by the UE 120) associated with the first candidate base station 610. Additionally, the first candidate base station 610 may determine whether any cells should be included in an SCG as SCells based at least in part on the measurements of one or more cells (performed by the UE 120) associated with the first candidate base station 610.

In some aspects, the first candidate base station 610 may determine a set of candidate cells that may be included in an MCG or SCG for the first candidate base station 610. For example, the first candidate base station 610 may select a set of candidate cells for an MCG configuration or an SCG configuration. This may enable the source base station 605 or the UE 120 to select one or more cells, from the set of candidate cells, to be included in the MCG or the SCG associated with the first candidate base station 610, as explained in more detail elsewhere herein (for example, at, or near, a time when the conditional handover is triggered). In some aspects, the first candidate base station 610 may determine or identify one or more thresholds or conditions for including a candidate cell, from the set of candidate cells, in an MCG or an SCG. In some aspects, the first candidate base station 610 may determine one or more PCell and PSCell pairs. A PCell and PSCell pair may include two cells, associated with the first candidate base station 610, where a first cell is to serve as the PCell and the second cell is to serve as the PSCell. This may provide flexibility to the source base station 605 or the UE 120 to select a PCell and PSCell pair, from the one or more PCell and PSCell pairs, for the conditional handover at, or near, a time when the conditional handover is triggered, as explained in more detail elsewhere herein.

In a fourth operation 626, the second candidate base station 615 may determine one or more cell configurations for the conditional handover. For example, the second candidate base station 615 may determine an MCG configuration or an SCG configuration for the conditional handover. The second candidate base station 615 may determine a set of candidate cells for an MCG configuration or an SCG configuration. The second candidate base station 615 may determine one or more PCell and PSCell pairs. The second candidate base station 615 may determine the one or more cell configurations for the conditional handover in a similar (or the same) manner as described in connection with the third operation 624 and the first candidate base station 610.

In a fifth operation 628, the first candidate base station 610 and the second candidate base station 615 may transmit, to the source base station 605, handover request acknowledge messages. For example, the first candidate base station 610 may transmit, and the source base station 605 may receive, a first handover request acknowledge message. The first handover request acknowledge message may indicate the one or more cell configurations (for example, an MCG configuration, an SCG configuration, a set of candidate cells, or one or more PCell and PSCell pairs) associated with the first candidate base station 610 for the conditional handover procedure. The second candidate base station 615 may transmit, and the source base station 605 may receive, a second handover request acknowledge message. The second handover request acknowledge message may indicate the one or more cell configurations (for example, an MCG configuration, an SCG configuration, a set of candidate cells, or one or more PCell and PSCell pairs) associated with the second candidate base station 615 for the conditional handover procedure.

In a sixth operation 630, the source base station 605 may transmit, and the UE 120 may receive, configuration information for the conditional handover procedure. In some aspects, the UE 120 may receive configuration information from another device (for example, from another base station 110 or another UE 120). In some aspects, the UE 120 may receive the configuration information via RRC signaling or medium access control (MAC) signaling (such as MAC control elements (MAC-CEs)). In some aspects, the configuration information may include an indication of one or more configuration parameters (for example, already known to the UE 120) for selection by the UE 120 or explicit configuration information for the UE 120 to use to configure the UE 120.

The configuration information may be transmitted via an RRC connection reconfiguration message. In some aspects, the configuration information may indicate cell configurations for candidate base stations associated with the conditional handover procedure. For example, the source base station 605 may transmit, to the UE 120, the cell configurations for candidate base stations that were transmitted to the source base station 605 by the candidate base stations (for example, as part of the fifth operation 628). For example, the configuration information may indicate configurations of candidate cell(s) or candidate base station(s) associated with the conditional handover procedure. In some aspects, the configuration information may indicate an SCG configuration for one or more (or all) of the candidate base stations associated with the conditional handover procedure. An SCG configuration associated with a candidate base station may be determined by the candidate base station based at least in part on measurement report information indicated via a handover request message (from the source base station 605) as described in more detail elsewhere herein (for example, in connection with the second operation 622, the third operation 624, or the fourth operation 626).

In some aspects, the configuration information may include one or more execution conditions associated with the conditional handover procedure. "Execution condition" may refer to one or more conditions that, when met or satisfied, trigger a handover procedure to a given candidate base station associated with the conditional handover procedure. The source base station 605 may determine the one or more execution conditions. An execution condition may be associated with a measurement of a signal transmitted by a candidate base station or a candidate cell. For example, if a measurement value (for example, an RSRP measurement value or an RSRQ measurement value) of the signal transmitted by the candidate base station or the candidate cell satisfies a threshold indicated by the execution condition, or is greater than a measurement value of a signal transmitted by the source base station 605 by a threshold amount that is indicated by the execution condition, then the execution condition may be met or satisfied.

As described above in connection with FIG. 5, a measurement type associated with the execution condition for a conditional handover procedure may be a cell-based measurement (for example, a Layer 3 cell-based measurement) that indicates a measurement value of a cell as a whole. In some aspects, the one or more execution conditions indicated by the source base station 605 may be associated with beam-based measurements. A beam-based measurement may indicate a measurement value of a given beam that is associated with a cell (for example, rather than for the cell as a whole). In some aspects, the one or more execution conditions indicated by the source base station 605 may be associated with Layer 1 beam-based measurements, Layer 3 beam-based measurements, or Layer 3 cell-based measurements, among other examples. As used herein, "Layer 1 measurement" may refer to a measurement that is obtained by applying Layer 1 filtering (for example, a measurement that is performed or reported at Layer 1). "Layer 1" may refer to a physical (PHY) layer of a wireless communication device. As used herein, "Layer 3 measurement" may refer to a measurement that is obtained by applying Layer 3 filtering (for example, a measurement that is performed or reported at Layer 3). "Layer 3" may refer to an RRC layer of a wireless communication device. Layer 1 filtering may remove an impact of noise associated with the measurement, whereas Layer 3 filtering may remove fast fading or reduce short term variations in the measurement results. For example, Layer 3 measurements may provide a longer term view of channel conditions, whereas Layer 1 measurements may provide shorter term view of channel conditions (for example, with less latency than a Layer 3 measurement). However, Layer 1 measurements may be associated with a higher level of variance (for example, because only Layer 1 filtering is applied and Layer 3 filtering is not applied). A beam-based measurement may also be referred to as a beam level measurement. Similarly, a cell-based measurement may also be referred to as a cell level measurement.

For example, the one or more execution conditions may refer to beam-based measurements (for example, Layer 1 beam-based measurements or Layer 3 beam-based measurements). The measurements may be performed, by the UE 120, using synchronization signal blocks (SSBs) or channel station information (CSI) reference signals (CSI-RSs). For example, the configuration information may indicate that the UE 120 is to measure SSBs or CSI-RSs transmitted by the source base station or candidate base stations to evaluate whether an execution condition has been satisfied or met. The configuration information may indicate that the measurements of the SSBs or CSI-RSs are to be beam-based (or beam level) measurements. For example, the one or more execution conditions associated with the conditional handover procedure may include a Layer 1 beam-based measurement execution condition, a Layer 3 beam-based measurement execution condition, or a Layer 3 cell-based measurement execution condition, among other examples.

In some aspects, the one or more execution conditions associated with the conditional handover procedure may include a first execution condition associated with a first beam quality measurement (for example, RSRQ), of a candidate base station, satisfying a first threshold or being greater than a second beam quality measurement of a serving beam associated with the source base station 605. For example, an execution condition may be associated with the UE 120 selecting a candidate base station that is associated with a best beam quality (for example, a highest RSRQ measurement). As another example, the one or more execution conditions associated with the conditional handover procedure may include a second execution condition associated with a quantity of beams, associated with one or more candidate base stations, having beam quality measurements that satisfy a second threshold or that are greater than the second beam quality measurement of the serving beam associated with the source base station 605. For example, an execution condition may be associated with a candidate base station (or multiple candidate base stations) being associated with at least N beams that have beam quality measurements (for example, RSRQ values) that satisfy the second threshold or that are greater than the second beam quality measurement of the serving beam associated with the source base station 605.

In some aspects, an execution condition may include multiple conditions. For example, an execution condition may indicate that the first execution condition, described above, and the second execution condition must be met or satisfied to trigger the conditional handover procedure. In some aspects, an execution condition may include a combination of Layer 1 beam-based measurement condition(s) and Layer 3 beam-based measurement condition(s). For example, an execution condition may include a first condition that is based at least in part on a Layer 1 beam-based measurement and a second condition that is based at least in part on a Layer 3 beam-based measurement. As another example, an execution condition may include a combination of beam-based measurement condition(s) and cell-based measurement condition(s). For example, an execution condition may include a first condition that is based at least in part on beam-based measurement (for example, a Layer 1 beam-based measurement or a Layer 3 beam-based measurement) and a second condition that is based at least in part on cell-based measurement.

In some aspects, an execution condition may be associated with a quantity of occurrences that the execution has been satisfied, or associated with an amount of time that the execution has been satisfied. For example, an execution condition may include a first execution condition associated with a quantity of occurrences that a second execution condition has been satisfied or associated with an amount of time that the second execution condition has been satisfied. In other words, an execution condition may be associated with M measurements satisfying a threshold or other condition. In some other aspects, an execution condition may be associated with measurements associated with a candidate base station satisfying a threshold (or other condition) for a threshold amount of time. This may account for variance or volatility in measurement results that may be present when Layer 1 beam-based measurements are used for conditional handover execution conditions.

In some aspects, an execution condition may be associated with a prediction based measurement. A prediction based measurement may include a measurement value that the UE 120 predicts based at least in part on previous measurement results, a geographic location of the UE 120, or a speed or acceleration of the UE 120, among other examples. For example, a prediction based measurement may enable the UE 120 to predict beam blockages or beam blockage durations (for example, that may occur in the future). In some aspects, beam-based communications may experience blockages (for example, due to an object located in a path of the beam), resulting in significantly reduced beam quality or beam signal strength. The UE 120 may be enabled to predict beam blockages or beam blockage durations and may use those predictions as part of the execution condition for the conditional handover. The UE 120 may predict measurement values using a signal model based prediction, a machine learning model based prediction, or a visual aided blocking prediction (for example, using a camera or other device of the UE 120 to detect objects that may cause blockages), among other examples. In some aspects, a candidate base station may be currently associated with poor beam signal quality or poor beam signal strength (for example, due to a beam blockage). However, the UE 120 may use a prediction based measurement to predict that a measurement value associated with the candidate base station will improve in the future (for example, because the blockage will be resolved) and that the improved measurement value (for example, the predicted measurement value) satisfies an execution condition. Therefore, the UE 120 may still trigger the conditional handover (as described in more detail elsewhere herein) using the predicted measurement value even though a current measurement value associated with the candidate base station does not satisfy the execution condition.

In some aspects, an execution condition may be a maximum permissible exposure (MPE) based execution condition. For example, when transmitting in the millimeter wave frequency band, a transmitter may use a higher antenna gain as compared to transmitting in the sub-6 gigahertz (GHz) frequency band. As a result, the effective isotropic radiated power (EIRP), which represents the radiated power in a particular direction (for example, the direction of the beam), may be higher for millimeter wave communications as compared to sub-6 GHz communications. To improve safety, some governing bodies have placed restrictions on the peak EIRP that can be directed toward the human body. These restrictions may be referred to as MPE limits, or MPE constraints, among other examples. In some aspects, an MPE limit may be due to a hand blocking scenario, where a hand of a user of the UE 120 blocks or obstructs communications to or from an antenna panel of the UE 120, or is otherwise positioned near the antenna panel. Additionally or alternatively, the MPE limit may be due to the position of another body part of the user, such as the user's face, head, ear, or leg, among other examples. When the UE 120 is subject to an MPE limit, a beam may be suitable as a downlink beam for use by the first wireless node to communicate with the second wireless node, but the beam may not be permitted for use as an uplink beam due to the MPE limit (or may be subjected to a decreased transmission power due to the MPE limit). For example, a downlink beam may be received by the UE 120 (for example, from a candidate base station) with a beam quality measurement or beam signal strength measurement that satisfies an execution condition. However, an uplink beam (of the UE 120) that is paired with the downlink beam (for example, that is associated with the same, or similar, spatial direction) may be subjected to a decreased transmission power due to the MPE limit. Therefore, if the UE 120 were to trigger the conditional handover with the candidate base station, then uplink communications may experience degraded performance because of the decreased transmission power due to the MPE limit. Therefore, if an uplink beam, paired with a downlink beam that satisfies an execution condition, is associated with a decreased transmission power due to the MPE limit, then UE 120 may not select the associated candidate base station or candidate cell. In other words, the UE 120 may consider both downlink channel conditions (for example, by measuring a signal received from a candidate base station) and uplink channel conditions (for example, by evaluating MPE conditions of uplink beams of the UE 120) as part of an execution condition for the conditional handover procedure. This may improve a likelihood that a triggered conditional handover procedure is successful or may improve uplink channel conditions associated with triggered the handover procedures.

In some aspects, the one or more execution conditions configured by the source base station 605 (for example, as part of the sixth operation 630) may be defined for PCells and for PSCells. For example, the one or more execution conditions may include one or more execution conditions associated with PCells of the candidate base stations associated with the conditional handover procedure. Additionally or alternatively, the one or more execution conditions may include one or more execution conditions associated with PSCells of the candidate base stations associated with the conditional handover procedure. Therefore, the UE 120 may consider measurements of both PCells and PSCells when evaluating whether to trigger a conditional handover procedure. This may improve a likelihood that an SCG associated with a candidate base station is able to be added as part of the conditional handover procedure, thereby improving a likelihood that the UE 120 is able to operate in a dual connectivity mode with the candidate base station.

For example, an execution condition configured by the source base station 605 may be associated with PCells of candidate base stations and at least one of SCGs of the candidate base stations (for example, a PCell+SCG execution condition) or PSCells of the one or more candidate base stations (for example, a PCell+PSCell execution condition). For example, an execution condition configured by the source base station 605 may include a first execution condition associated with PCells of the candidate base stations, a second execution condition associated with SCGs of the candidate base stations, or a third execution condition associated with PSCells of the candidate base stations, among other examples. In other words, the execution conditions for the conditional handover procedure may be based at least in part on measurements associated with PCells of candidate base stations in addition to measurements associated with PSCells of the candidate base stations or measurements associated with SCGs of the candidate base stations.

In some aspects, a triggering of the conditional handover procedure may be based at least in part on measurements associated with PCells of candidate base stations (and not measurements associated with PSCells of the candidate base stations or measurements associated with SCGs of the candidate base stations). However, the execution condition may indicate that the UE 120 is to configure an SCG or a PSCell (when triggering the conditional handover procedure) based at least in part on the measurements associated with PSCells of the candidate base stations or measurements associated with SCGs of the candidate base stations. In other words, a decision by the UE 120 as to whether a PSCell or SCG of a candidate base station (for which the conditional handover procedure has been triggered based at least in part on a measurement associated with a PCell of the candidate base station) is to be added as part of the conditional handover procedure may be based at least in part on a PSCell or SCG condition being satisfied. For example, if a measurement associated with the PSCell or the SCG of the candidate base station satisfies a threshold, then the UE may add (for example, may apply a configuration associated with) the PSCell or the SCG of the candidate base station as part of the conditional handover procedure. If the measurement associated with the PSCell or the SCG of the candidate base station does not satisfy the threshold, then the UE may not add (for example, may not apply a configuration associated with) the PSCell or the SCG of the candidate base station as part of the conditional handover procedure.

In some aspects, a triggering of the conditional handover procedure may be based at least in part on measurements associated with PCells of candidate base stations and measurements associated with PSCells of the candidate base stations or measurements associated with SCGs of the candidate base stations. In other words, the execution condition may indicate that the UE 120 is to execute the conditional handover only if both PCell execution condition(s) and PSCell/SCG execution condition(s) are met or satisfied. For example, the UE 120 may determine whether to trigger the conditional handover procedure based at least in part on one or more PCell execution conditions (that are based at least in part on measurements associated with PCells) and based at least in part on one or more PSCell/SCG execution conditions (that are based at least in part on measurements associated with PSCells/SCGs) being satisfied or met.

The UE 120 may configure the UE 120 for communicating with the source base station 605, the first candidate base station 610, and the second candidate base station 615. In some aspects, the UE 120 may configure the UE 120 based at least in part on the configuration information for the conditional handover procedure. In some aspects, the UE 120 may be configured to perform one or more operations described herein (for example, in connection with the conditional handover procedure). The UE 120 may configure the UE 120 for monitoring or evaluating one or more execution conditions that are indicated by the configuration information, as described above.

In a seventh operation 632, the UE 120 may evaluate one or more conditional handover execution conditions (for example, that are indicated by the configuration information or the conditional handover configuration transmitted by the source base station 605). For example, the UE 120 may determine whether measurements associated with candidate cells (that are indicated by the configuration information) satisfy or meet the one or more conditional handover execution conditions. In some aspects, the UE 120 may determine whether a measurement associated with a candidate cell satisfies a threshold indicated by an execution condition. The UE 120 may continually evaluate the one or more conditional handover execution conditions until the source base station 605 indicates that the conditional handover is to be no longer configured at the UE 120 (for example, via an RRC reconfiguration message).

In an eighth operation 634, the UE 120 may perform one or more measurements associated with the candidate base station(s) indicated by the configuration information. For example, the UE 120 may perform the one or more measurements based at least in part on a measurement configuration (that may be separate from the conditional handover configuration) transmitted by the source base station 605. The UE 120 may measure signals (for example, reference signals or other signals) transmitted by the first candidate base station 610, the second candidate base station 615, or other candidate base stations. For example, the first candidate base station 610 or the second candidate base station 615 may transmit, and the UE 120 may receive, one or more SSBs, or one or more CSI-RSs, among other examples. The UE 120 may measure the reference signal(s) (for example, the SSBs or CSI-RSs) transmitted by the candidate base station(s).

The measurements may be inter-frequency measurements or intra-frequency measurements. As described elsewhere herein, the measurements performed by the UE 120 may be beam-based measurements (for example, beam level measurements) or cell-based measurements (for example, cell level measurements). For example, the UE 120 may perform Layer 1 beam-based measurements, Layer 3 beam-based measurements, or Layer 3 cell-based measurements, among other examples. In some aspects, the UE 120 may perform measurements associated with PCells of the candidate base station(s). In some aspects, the UE 120 may perform measurements associated with PSCells of the candidate base station(s). In some aspects, UE 120 may perform measurements associated with SCGs of the candidate base station(s). The UE 120 may use the measurement results (for example, measurement values, such as beam quality measurement values, beam signal strength measurement values, RSRP values, or RSRQ values) to evaluate the one or more conditional handover execution conditions (as part of the seventh operation 632).

In some aspects, in a ninth operation 636, the UE 120 may transmit, and the source base station 605 may receive, a measurement report. The measurement report may indicate one or more measurements associated with the source base station 605 or one or more candidate base stations (such as the first candidate base station 610 or the second candidate base station 615). In some aspects, the measurement report may indicate a Layer 1 beam-based measurement, a Layer 3 beam-based measurement, or a Layer 3 cell-based measurement, among other examples. For example, the UE 120 may perform beam level or cell level measurements (for example, using reference signals, such as SSBs or CSI-RSs, transmitted by the source base station or the candidate base station(s)) and may report the measurements to the source base station 605. The UE 120 may transmit the measurement report in accordance with a reporting configuration. For example, as described elsewhere herein, the source base station 605 may configure the UE 120 to perform measurements and to transmit measurement reports (for example, periodically or based at least in part on detecting a reporting event) to the source base station 605 (for example, as part of an RRC configuration, such as a CSI measurement configuration (csi-MeasConfig) or a measurement configuration (measConfig)). For example, a measurement configuration may include a reporting configuration that indicates a reporting criterion, a reference signal type associated with the report, and a reporting format (for example, indicating a quantity of measurement values to be included in the measurement report), among other examples.

In some aspects, in a tenth operation 638, the source base station 605 may transmit, to one or more candidate base stations associated with the conditional handover procedure, the measurement report or an indication of one or more measurement values indicated by the measurement report. For example, the source base station 605 may transmit, and the first candidate base station 610 may receive, the measurement report or an indication of one or more measurement values indicated by the measurement report. Similarly, the source base station 605 may transmit, and the second candidate base station 615 may receive, the measurement report or an indication of one or more measurement values indicated by the measurement report. In other words, the source base station 605 may forward an indication of one or more measurements performed by the UE 120 to one or more candidate base stations associated with the conditional handover procedure (for example, after the conditional handover has been configured). Forwarding the indication of the one or more measurements performed by the UE 120 to the one or more candidate base stations may enable a candidate base station to update or reconfigure cell configurations associated with the candidate base station and the conditional handover procedure (for example, based at least in part on the one or more measurements performed by the UE 120), as explained in more detail elsewhere herein.

The source base station 605 may transmit, to the one or more candidate base stations, the measurement report or the indication of one or more measurement values indicated by the measurement report periodically or based at least in part on detecting a reporting event. For example, the source base station 605 may transmit measurement results (for example, transmitted by the UE 120 to the source base station 605) to the one or more candidate base stations associated with the conditional handover procedure based at least in part on a periodic schedule (for example, based at least in part on an expiration of a timer). Additionally or alternatively, the source base station 605 may transmit measurement results to the one or more candidate base stations associated with the conditional handover procedure based at least in part on detecting a reporting event. The reporting event may be based at least in part on measurement values indicated by the UE 120. For example, a reporting event may indicate a threshold, and if a measurement value indicated by the UE 120 satisfies the threshold, then the source base station 605 may transmit the measurement results to the one or more candidate base stations. As another example, a reporting event may be based at least in part on a variance or a change of measurement values indicated by the UE 120. For example, if a variance or a change of measurement values indicated by the UE 120 satisfies a threshold, then the source base station 605 may transmit the measurement results to the one or more candidate base stations. The source base station 605 may transmit the measurement results to the candidate base station(s) based at least in part on a change in channel quality experienced by the UE 120. A candidate base station (such as the first candidate base station 610 or the second candidate base station 615) may indicate a reporting event (for example, for reporting measurement results to the candidate base station) in the handover request acknowledge message (transmitted as part of the fifth operation 628) or in another message to the source base station 605. In some aspects, the source base station 605 may determine one or more reporting events. In some aspects, one or more reporting events may be defined, or otherwise fixed, by a wireless communication standard, such as the 3GPP.

In some aspects, in an eleventh operation 640, the first candidate base station 610 may determine one or more updated or modified cell configurations, associated with the first candidate base station 610, for the conditional handover procedure. The first candidate base station 610 may determine the one or more updated or modified cell configurations based at least in part on measurements performed by the UE 120 (such as in the eighth operation 634) and forwarded to the first candidate base station 610 by the source base station 605 (such as in the tenth operation 638). In some aspects, the first candidate base station 610 may determine an updated SCG configuration that is different than the SCG configuration indicated by the first candidate base station 610 in the handover request acknowledge message (transmitted as part of the fifth operation 628). For example, the first candidate base station 610 may select one or more cells, associated with the first candidate base station 610, to be included in the updated SCG configuration based at least in part on one or more measurements (for example, associated with the one or more cells or beams of the one or more cells) performed by the UE 120.

In some aspects, the first candidate base station 610 may determine whether an SCG should be configured as part of the conditional handover procedure based at least in part on the one or more measurements. For example, if the first candidate base station 610 indicated an SCG configuration in the handover request acknowledge message, the first candidate base station 610 may determine that the SCG configuration should be removed from the conditional handover configuration based at least in part on the one or more measurements (for example, if the one or more measurements for cells to be included in the SCG are less than a threshold). As another example, if the first candidate base station 610 did not indicate an SCG configuration in the handover request acknowledge message, the first candidate base station 610 may determine that the SCG configuration should be added to the conditional handover configuration based at least in part on the one or more measurements (for example, if the one or more measurements for cells to be included in the SCG are equal to or greater than a threshold). In some aspects, the first candidate base station 610 may select a PSCell for the SCG configuration, from one or more cells associated with the first candidate base station 610, based at least in part on the one or more measurements performed by the UE 120. In some aspects, the first candidate base station 610 may determine whether any SCells are to be included in the SCG configuration based at least in part on the one or more measurements performed by the UE 120 (for example, because SCells may be optional in an SCG and only a PSCell is needed).

The first candidate base station 610 may receive the indication of one or more measurements performed by the UE 120 and may evaluate the SCG configuration (or other cell configurations) associated with the first candidate base station 610 and the conditional handover procedure based at least in part on the one or more measurements performed by the UE 120. In some aspects, the first candidate base station 610 may determine that the SCG configuration (or other cell configurations) is to be updated or modified to an updated SCG configuration based at least in part on the one or more measurements performed by the UE 120, as described in more detail elsewhere herein. In some other aspects, the first candidate base station 610 may determine that no updated or modifications are needed for the SCG configuration (or other cell configurations) based at least in part on the one or more measurements performed by the UE 120. The second candidate base station 615 (or other candidate base stations) may evaluate and update cell configurations (MCG configurations or SCG configurations) for the conditional handover procedure in a similar manner as described herein. As a result, the candidate base stations are enabled to evaluate (or reevaluate) cell configurations (MCG configurations or SCG configurations) for the conditional handover procedure based at least in part on current (or more recent) measurements performed by the UE 120 (for example, based at least in part on measurements performed by the UE 120 and indicated to the candidate base stations after the candidate base stations determine initial cell configurations for the conditional handover procedure).

In some aspects, in a twelfth operation 642, the first candidate base station 610 may transmit, and the source base station 605 may receive, an indication of an updated cell configuration for the conditional handover procedure. The first candidate base station 610 may transmit, and the source base station 605 may receive, an indication of an updated SCG configuration associated with the first candidate base station 610. For example, if the first candidate base station 610 determines that an update or modification is needed for the SCG configuration associated with the first candidate base station 610 based at least in part on the measurement(s) performed by the UE 120, then the first candidate base station 610 may transmit a message to the source base station 605 indicating the updated SCG configuration.

As shown in FIG. 6B, in a thirteenth operation 644, the source base station 605 may determine an updated SCG configuration, for one or more candidate base stations, for the conditional handover procedure. For example, rather than the candidate base stations evaluating (or reevaluating) cell configurations (MCG configurations or SCG configurations) for the conditional handover procedure based at least in part on current (or more recent) measurements performed by the UE 120, the source base station 605 may evaluate (or reevaluate) the cell configurations (MCG configurations or SCG configurations) for the conditional handover procedure based at least in part on the measurements performed by the UE 120. In some aspects, the source base station 605 may evaluate (or reevaluate) the cell configurations for a candidate base station based at least in part on criteria or conditions indicated by the candidate base station. For example, the first candidate base station 610 may indicate (for example, in the handover request acknowledge message or in the fifth operation 628) one or more criteria or conditions for evaluating (or reevaluating) cell configurations associated with the first candidate base station 610.

For example, the source base station 605 may select one or more cells, from a set of candidate cells associated with an SCG configuration for a candidate base station, to be included in an updated SCG configuration based at least in part on the one or more measurements performed by the UE 120. In some aspects, the candidate base station may transmit, and the source base station 605 may receive, an indication of the set of candidate cells associated with the SCG configuration and one or more conditions or criteria associated with including a cell in the SCG configuration (for example, in the handover request acknowledge message or in the fifth operation 628). The source base station 605 may select one or more cells to be included in an updated SCG configuration for the candidate base station based at least in part on the one or more measurements (performed by the UE 120) and the one or more conditions (indicated by the candidate base station). Alternatively, the one or more conditions or criteria associated with including a cell in the SCG configuration may be determined by the source base station 605 or defined, or otherwise fixed, by a wireless communication standard.

For example, the source base station 605 may select, from the set of candidate cells associated with the SCG configuration and associated with the candidate base station, a PSCell for the updated SCG configuration (for example, the source base station 605 may change a PSCell for the SCG configuration associated with the candidate base station). In some aspects, the source base station 605 may determine whether to select any SCells, from the set of candidate cells, based at least in part on the one or more measurements (performed by the UE 120). The source base station 605 may evaluate (or reevaluate) the cell configurations (for example, the MCG or SCG configurations) for all candidate base stations associated with the conditional handover procedure in a similar manner as described above. This may reduce a latency associated with updating cell configurations for the conditional handover procedure because the source base station 605 does not need to wait for the candidate base stations to evaluate, update, and signal the updated cell configurations to the source base station 605. Moreover, the source base station 605 updating cell configurations (MCG or SCG configurations) for the conditional handover procedure may conserve radio resources because no signaling between the source base station 605 and the candidate base station(s) is needed to update the cell configurations.

In a fourteenth operation 646, the source base station 605 may transmit, and the UE 120 may receive, an indication of an updated cell configuration (for example, an updated SCG configuration) associated with a candidate base station for the conditional handover procedure. For example, the source base station 605 may transmit an RRC reconfiguration message that reconfigures the conditional handover configuration with the updated cell configuration. The UE 120 may reconfigure the UE 120 based at least in part on the updated cell configuration (for example, the updated SCG configuration) received from the source base station 605. The updated cell configuration may be determined or selected by the candidate base station (for example, in the eleventh operation 640) or by the source base station 605 (for example, in the thirteenth operation 644). For example, the candidate base station may update an SCG configuration (based at least in part on the measurement(s) performed by the UE 120) and may transmit, to the source base station 605, an indication of the updated SCG configuration. The source base station 605 may transmit (for example, forward) the updated SCG configuration to the UE 120.

Alternatively, the source base station 605 may update an SCG configuration (based at least in part on the measurement(s) performed by the UE 120) for a candidate base station (for example, in the thirteenth operation 644). The source base station 605 may transmit an indication of the updated SCG configuration to the UE 120. In some aspects, if the source base station 605 updates or modifies a cell configuration for a candidate base station, then the source base station 605 may transmit, to the candidate base station, an indication of the updated cell configuration. For example, the source base station 605 may transmit, and a candidate base station may receive, an indication of an updated SCG configuration associated with the candidate base station. In some aspects, the candidate base station may determine that a modification is to be made to the updated SCG configuration that is determined or selected by the source base station 605. The candidate base station may transmit, and the source base station 605 may receive, an indication of a modification to the updated SCG configuration. The source base station 605 may transmit (for example, forward), and the UE 120 may receive, an indication of the modification to the updated SCG configuration (for example, in an RRC reconfiguration message).

In a fifteenth operation 648, the UE 120 may detect that an execution condition associated with the conditional handover procedure is satisfied or met. For example, the UE 120 may detect that an execution condition (from the one or more execution conditions configured by the source base station 605 and described in more detail elsewhere herein) is satisfied or met. As described elsewhere herein, the execution condition may be an execution condition associated with beam-based measurement, an execution condition associated with a cell-based measurement, an execution condition associated with a Layer 1 beam-based measurement, an execution condition associated with a Layer 3 beam-based measurement, an execution condition associated with a PCell, an execution condition associated with a PSCell, an execution condition associated with an SCG, or an execution condition associated with an MPE condition or limit, among other examples. In some aspects, the UE 120 may determine that the execution condition is satisfied or met based at least in part on one or more measurements performed by the UE 120 (for example, associated with the source base station 605 or a candidate base station). In some aspects, the UE 120 may determine that the execution condition is satisfied or met based at least in part on one or more predicted measurements associated with a candidate base station.

In some aspects, in a sixteenth operation 650, the UE 120 may select one or more cells, from a set of candidate cells associated with an SCG configuration, to be included in an updated SCG configuration based at least in part on one or more measurements performed by the UE 120. For example, rather than a base station (for example, the source base station 605 or a candidate base station) evaluating or updated cell configurations for the conditional handover procedure, the UE 120 may select one or more cells to be included in a cell configuration based at least in part one or more measurements performed by the UE 120. For example, the configuration information for the conditional handover procedure (transmitted by the source base station 605 in the sixth operation 630) may indicate, for a candidate base station, the set of candidate cells associated with an SCG configuration. In some aspects, the configuration information for the conditional handover procedure may indicate one or more conditions or criteria for the UE 120 to use to evaluate whether a candidate cell, from the set of candidate cells, should be selected for, or included in, a cell configuration, such as an SCG configuration. The UE 120 may use the one or more conditions or criteria and recent measurements (for example, associated with the set of candidate cells) performed by the UE 120 to select the one or more cells, from the set of candidate cells, to be included in the updated SCG configuration for the conditional handover procedure. In some aspects, the UE 120 may select a PSCell or one or more SCells for an SCG for a candidate base station (for example, a candidate base station for which the conditional handover has been triggered) based at least in part on measurements performed by the UE 120.

For example, the UE 120 may select the one or more cells, from the set of candidate cells, to be included in the updated SCG configuration for the conditional handover procedure based at least in part on detecting that the execution condition has been met or satisfied. For example, the UE 120 may detect that the conditional handover has been triggered for a candidate base station. The UE 120 may select the one or more cells, from the set of candidate cells associated with the candidate base station, to be included in the updated SCG configuration for the conditional handover procedure. In some aspects, the UE 120 may evaluate beam level measurements, cell level measurements, or MPE conditions (for example, uplink conditions), among other examples, when selecting the one or more cells.

In some aspects, the configuration information for the conditional handover procedure (transmitted by the source base station 605 in the sixth operation 630) may indicate, for a candidate base station, a set of PCell and PSCell pairs. A "PCell and PSCell pair" may include a first cell that is to serve as the PCell for an MCG associated with a candidate base station and a second cell that is to serve as the PSCell for an SCG associated with the candidate base station. For example, a candidate base station may indicate different PCell and PSCell pairs that can be selected by the UE 120 when the conditional handover procedure is triggered or executed. For example, in some aspects, multiple PCell and PSCell pairs, for a candidate base station, may satisfy an execution condition (for example, may be associated with measurement values that satisfy a threshold). The UE 120 may select a PCell and PSCell pair, from the set of PCell and PSCell pairs (for example, that satisfy or meet the execution condition) based at least in part on one or more measurements performed by the UE 120. For example, the UE 120 may select a PCell and PSCell pair based at least in part on a measurement value of the PCell. In other words, the UE 120 may evaluate the set of PCell and PSCell pairs based at least in part on measurements associated with the PCells (and not the PSCells). For example, the UE 120 may measure a set of candidate PCells associated with the candidate base station to obtain a set of measurement values associated with a set of candidate PCells. The UE 120 may select the PCell and PSCell pair based at least in part on the PCell included in the PCell and PSCell pair being associated with a highest measurement value (for example, a highest signal quality measurement value or a highest signal strength measurement value) from the set of measurement values associated with the set of candidate PCells.

In some other aspects, the UE 120 may evaluate the set of PCell and PSCell pairs based at least in part on measurements associated with the PCells and the PSCells. For example, the UE 120 may measure a set of candidate PCells and a set of candidate PSCells associated with the candidate base station. The UE 120 may select the PCell and PSCell pair based at least in part on the PCell and the PSCell included in the PCell and PSCell pair being associated with a highest joint measurement from the PCell measurement values (a first set of measurement values) and the PSCell measurement values (a second set of measurement values). "Joint measurement" may refer to a measurement that takes both the PCell measurement and the PSCell measurement into account. For example, a joint measurement may be a highest measurement value from the PCell measurement value and the PSCell measurement value. In some aspects, the joint measurement may be an average of the PCell measurement value and the PSCell measurement value. In some aspects, the joint measurement may be some other combination of the PCell measurement value and the PSCell measurement value. In other words, the UE 120 may consider measurement values (for example, signal quality) of both the PCells and the PSCell when selecting a PCell and PSCell pair.

In some aspects, the UE 120 may select the PCell and PSCell pair based at least in part on a quantity of SCells that are associated with the PSCell (and the SCG). For example, the UE 120 may select a PCell and PSCell pair based at least in part on a quantity of the SCells associated with the PSCell that satisfy a threshold for being included in the SCG. In other words, if a PCell and PSCell pair has more SCells that can be included in the SCG, then the UE 120 may select the PCell and PSCell pair over another PCell and PSCell pair that has less SCells that can be included in the SCG. In some aspects, the UE 120 may select the PCell and PSCell pair based at least in part on a timing difference between the PCell and the PSCell included in the PCell and PSCell pair. For example, the UE 120 may select a PCell and PSCell pair that is associated with a smallest timing difference between the PCell and the PSCell included in the PCell and PSCell pair. Selecting a PCell and PSCell pair with a smaller timing difference may improve a synchronization between the PCell and the PSCell, thereby improving performance and reliability of communications.

In some aspects, the UE 120 may select a PCell, a PSCell, an SCG configuration, or a PCell and PSCell pair, among other examples, based at least in part on an MPE condition or limit experienced by the UE 120. For example, as described in more detail elsewhere herein, the UE 120 may evaluate measurements of a candidate base station or candidate cells based at least in part on downlink signals. However, the UE 120 may consider uplink conditions (for example, that may be affected by MPE conditions) when selecting a cell or cell configuration associated with the conditional handover procedure. For example, if an uplink beam, paired with a downlink beam (that is associated with a measurement value that has satisfied a threshold or condition associated with an execution condition as described herein) associated with a candidate cell (for example, a downlink beam that satisfies a measurement based execution condition), is associated with an MPE limit (that limits a transmission power using the uplink beam), then the UE 120 may refrain from selecting the candidate cell to be included in the conditional handover.

In some aspects, in a seventeenth operation 652, the UE 120 may transmit, and the source base station 605 or a candidate base station may receive, an indication of selected cells or an updated SCG configuration associated with the candidate base station. For example, when the UE 120 updates an SCG configuration or selects cells (for example, PCells, PSCells, or SCells) that are not explicitly configured in the configuration information, the UE 120 may inform the source base station 605 or the candidate base station (the candidate base station that is the target base station for the triggered conditional handover) of the decisions made by the UE 120 (for example, of the selected cells or the updated SCG configuration). For example, if the first candidate base station 610 is selected as the target base station (by the UE 120) for the conditional handover, then the UE 120 may transmit, and the first candidate base station 610 may receive, an indication of an updated SCG configuration, an indication of a selected PCell, an indication of a selected PSCell, an indication of a selected SCell, or an indication of a selected PCell and PSCell pair, among other examples. In some other aspects, the UE 120 may transmit, and the source base station 605 may receive, an indication of an updated SCG configuration, an indication of a selected PCell, an indication of a selected PSCell, an indication of a selected SCell, or an indication of a selected PCell and PSCell pair, among other examples. The source base station 605 may transmit (for example, forward), and the first candidate base station 610 may receive, the indication(s) provided by the UE 120 (for example, the cell selection(s) made by the UE 120). The UE 120 may transmit the indication(s) (to the source base station 605 or the target base station) via Layer 3 signaling, Layer 2 signaling, Layer 1 signaling, RRC signaling, MAC signaling (for example, using one or more MAC-CEs), or a message using a scheduling request (SR) resource (that is associated with the target base station), among other examples. This may enable the cell configurations for the conditional handover to be synchronized between the UE 120 and the target base station (the first candidate base station 610) when the UE 120 makes selections, updates, or modifications to the cell configurations based at least in part on measurements performed by the UE 120.

In an eighteenth operation 654, the UE 120 and the target base station (for example, the first candidate base station 610) may establish a connection. For example, the UE 120 may apply the cell configuration(s) associated with the target base station. The UE 120 may transmit a message, to the target base station, to initiate the conditional handover procedure (for example, based at least in part on detecting that an execution condition has been satisfied). For example, the UE 120 may initiate a random access channel (RACH) procedure with the target base station (for example, the first candidate base station 610) based at least in part on the updated SCG configuration or the selected PCell, PSCell, or SCell(s) (for example, that were updated or selected based at least in part on measurements performed by the UE 120 after the initial conditional handover configuration is transmitted, as explained in more detail elsewhere herein). For example, the UE 120 may transmit the message to initiate the conditional handover to a PCell or a PSCell that is selected by the UE 120 or that is indicated via an updated cell configuration, such as an updated SCG configuration.

In some aspects, the conditional handover procedure may be associated with an initial beam. The initial beam may be a beam used by the UE 120 or the target base station to establish a connection between the UE 120 and the target base station (for example, a beam used as part of a RACH procedure). In some aspects, the initial beam may be based at least in part on beam level measurements performed by the UE 120 (for example, Layer 1 beam-based measurements or Layer 3 beam-based measurements) associated with one or more cells (for example, a PCell or a PSCell) of the target base station. For example, the beam level measurements may be based at least in part on a reference signal, such as an SSB or a CSI-RS, transmitted by the one or more cells (for example, a PCell or a PSCell) of the target base station (for example, the first candidate base station 610). In the seventeenth operation 652, the UE 120 may transmit an indication of the initial beam (and other beam information, such as beam measurement values or TCI state information) to the source base station 605 or the target base station. In some aspects, in the seventeenth operation 652, the UE 120 may transmit an indication of an activation status of SCell(s) associated with the SCG (for example, if the UE 120 activates or selects an SCell to be included in the SCG associated with the target base station).

As a result, the UE 120 may be enabled to evaluate execution conditions for a conditional handover procedure that are based at least in part on beam level measurements performed by the UE 120. This may improve a likelihood that a triggered conditional handover procedure is successful in a wireless network that uses beamformed communications. In some aspects, cell configurations (for example, SCG configurations) may be updated after an initial configuration of the conditional handover procedure based at least in part on more recent measurements performed by the UE 120. Therefore, the cell configurations for the conditional handover procedure may be based at least in part on current measurement values obtained (or current channel conditions experienced) by the UE 120 (rather than being based at least in part on measurement values obtained, or channel conditions experienced by, the UE 120 at a time when the conditional handover is initially configured). In some aspects, the UE 120 may be enabled to evaluate execution conditions for a conditional handover procedure that are based at least in part on a combination of PCell-based conditions and PSCell or SCG conditions, thereby improving a likelihood that a connection with an SCG of a candidate base station can be established as part of a conditional handover procedure. Establishing a connection with an SCG may enable the UE to operate in a dual connectivity mode, thereby improving communication performance, efficiency, or throughput, among other examples.

Figure 7:
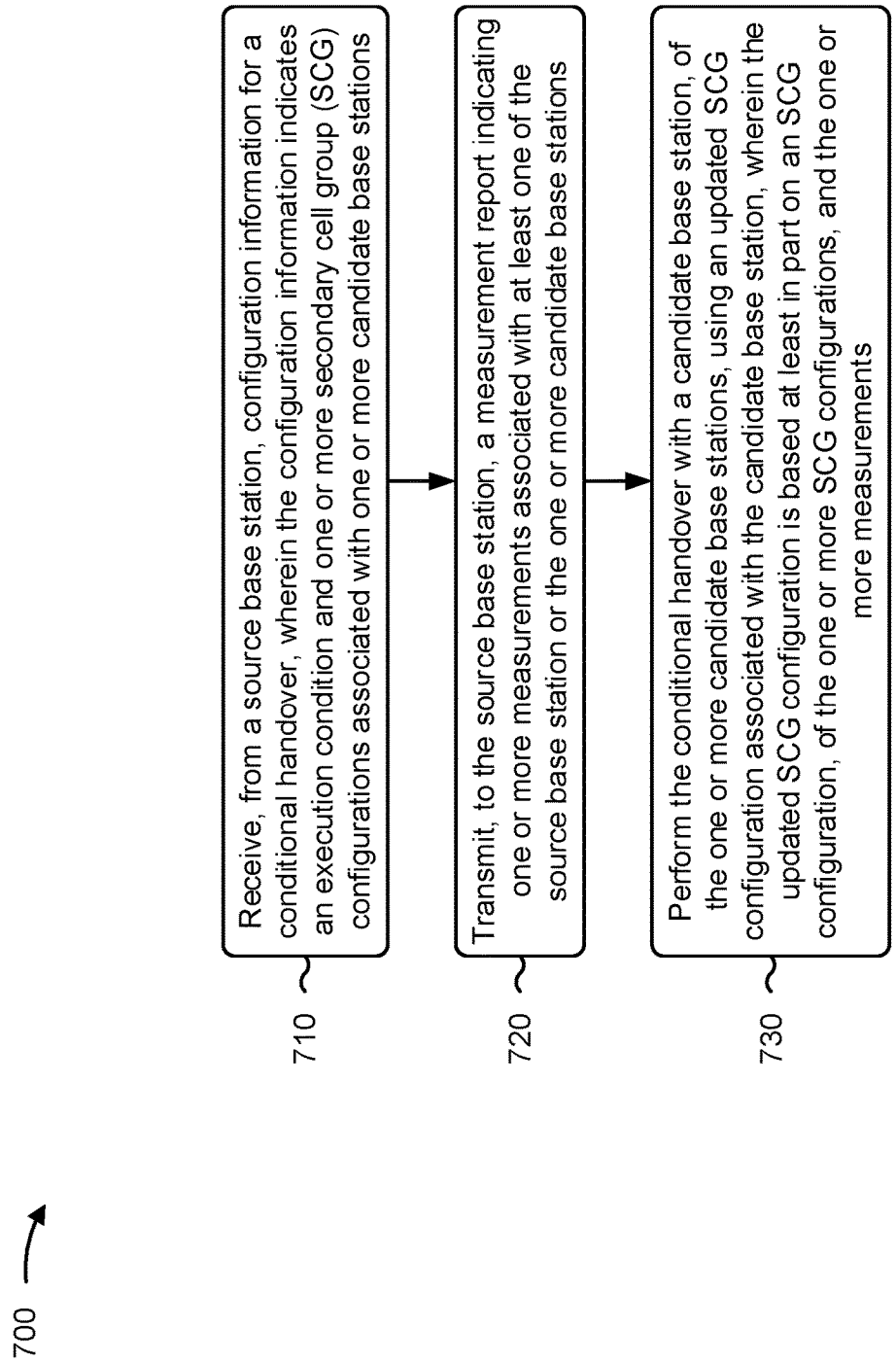
FIG. 7 is a flowchart illustrating an example process performed, for example, by a UE, associated with mobility enhancements for a conditional handover in accordance with the present disclosure.

FIG. 7 is a flowchart illustrating an example process 700 performed, for example, by a UE, associated with mobility enhancements for conditional handovers, in accordance with the present disclosure. Example process 700 is an example where the UE (for example, UE 120) performs operations associated with mobility enhancements for conditional handovers.

As shown in FIG. 7, in some aspects, process 700 may include receiving, from a source base station, configuration information for a conditional handover, wherein the configuration information indicates an execution condition and one or more SCG configurations associated with one or more candidate base stations (block 710). For example, the UE (such as by using communication manager 140 or reception component 1202, depicted in FIG. 12) may receive, from a source base station, configuration information for a conditional handover, wherein the configuration information indicates an execution condition and one or more SCG configurations associated with one or more candidate base stations, as described above.

As further shown in FIG. 7, in some aspects, process 700 may include transmitting, to the source base station, a measurement report indicating one or more measurements associated with at least one of the source base station or the one or more candidate base stations (block 720). For example, the UE (such as by using communication manager 140 or transmission component 1204, depicted in FIG. 12) may transmit, to the source base station, a measurement report indicating one or more measurements associated with at least one of the source base station or the one or more candidate base stations, as described above.

As further shown in FIG. 7, in some aspects, process 700 may include performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements (block 730). For example, the UE (such as by using communication manager 140, transmission component 1204, or reception component 1202, depicted in FIG. 12) may perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements, as described above.

Process 700 may include additional aspects, such as any single aspect or any combination of aspects described below or in connection with one or more other processes described elsewhere herein.

In a first additional aspect, the one or more measurements include at least one of a Layer 1 beam-based measurement, a Layer 3 beam-based measurement, or a Layer 3 cell-based measurement.

In a second additional aspect, alone or in combination with the first aspect, process 700 includes receiving, from the source base station, an indication of the updated SCG configuration based at least in part on transmitting the measurement report, wherein the SCG configuration is updated to the updated SCG configuration by the source base station or the candidate base station.

In a third additional aspect, alone or in combination with one or more of the first and second aspects, receiving the configuration information includes receiving an indication of the SCG configuration, wherein the SCG configuration indicates a set of candidate cells associated with the SCG configuration.

In a fourth additional aspect, alone or in combination with one or more of the first through third aspects, process 700 includes selecting one or more cells, from a set of candidate cells associated with the SCG configuration, to be included in the updated SCG configuration based at least in part on the one or more measurements, and transmitting, to at least one of the source base station or the candidate base station, an indication of the updated SCG configuration.

In a fifth additional aspect, alone or in combination with one or more of the first through fourth aspects, the measurement report is forwarded to the candidate base station by the source base station, and process 700 includes receiving, from the source base station, an indication of the updated SCG configuration via an RRC message, wherein the SCG configuration is updated to the updated SCG configuration by the candidate base station based at least in part on the one or more measurements.

In a sixth additional aspect, alone or in combination with one or more of the first through fifth aspects, process 700 includes receiving, from the source base station, an indication of the updated SCG configuration via an RRC message, wherein the SCG configuration is updated to the updated SCG configuration by the source base station based at least in part on the one or more measurements.

In a seventh additional aspect, alone or in combination with one or more of the first through sixth aspects, the execution condition includes at least one of a Layer 1 beam-based measurement execution condition, a Layer 3 beam-based measurement execution condition, a Layer 3 cell-based measurement execution condition, or an MPE based execution condition.

In an eighth additional aspect, alone or in combination with one or more of the first through seventh aspects, the execution condition includes at least one of a first execution condition associated with a first beam quality measurement, of the candidate base station, satisfying a first threshold or being greater than a second beam quality measurement of a serving beam associated with the source base station, or a second execution condition associated with a quantity of beams, associated with the one or more candidate base stations, having beam quality measurements that satisfy a second threshold or that are greater than the second beam quality measurement of the serving beam associated with the source base station.

In a ninth additional aspect, alone or in combination with one or more of the first through eighth aspects, the execution condition includes a first execution condition associated with a quantity of occurrences that a second execution condition has been satisfied or associated with an amount of time that the second execution condition has been satisfied.

In a tenth additional aspect, alone or in combination with one or more of the first through ninth aspects, the execution condition includes an MPE based execution condition associated with an MPE limit of an uplink beam that is associated with a downlink beam that satisfies a measurement based execution condition.

In an eleventh additional aspect, alone or in combination with one or more of the first through tenth aspects, the execution condition includes at least one of one or more execution conditions associated with PCells of the one or more candidate base stations, or one or more execution conditions associated with PSCells of the one or more candidate base stations.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
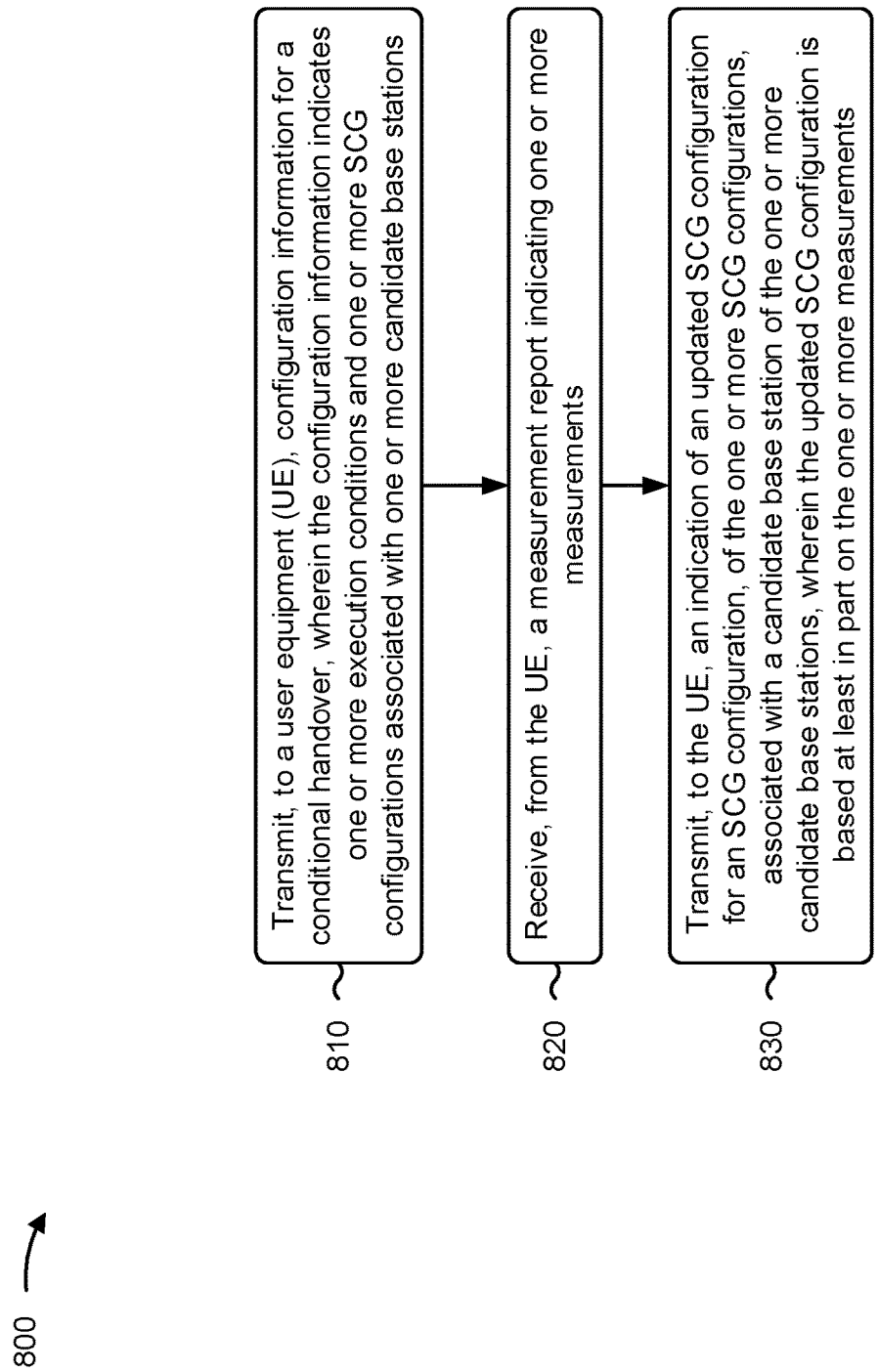
FIGS. 8 and 9 are flowcharts illustrating example processes performed, for example, by a base station, associated with mobility enhancements for a conditional handover, in accordance with the present disclosure.

FIG. 8 is a flowchart illustrating an example process 800 performed, for example, by a base station, associated with mobility enhancements for conditional handovers, in accordance with the present disclosure. Example process 800 is an example where the base station (for example, the base station 110 or the source base station 605) performs operations associated with mobility enhancements for conditional handovers.

As shown in FIG. 8, in some aspects, process 800 may include transmitting, to a UE, configuration information for a conditional handover, wherein the configuration information indicates one or more execution conditions and one or more SCG configurations associated with one or more candidate base stations (block 810). For example, the base station (such as by using communication manager 150 or transmission component 1304, depicted in FIG. 13) may transmit, to a UE, configuration information for a conditional handover, wherein the configuration information indicates one or more execution conditions and one or more SCG configurations associated with one or more candidate base stations, as described above.

As further shown in FIG. 8, in some aspects, process 800 may include receiving, from the UE, a measurement report indicating one or more measurements (block 820). For example, the base station (such as by using communication manager 150 or reception component 1302, depicted in FIG. 13) may receive, from the UE, a measurement report indicating one or more measurements, as described above.

As further shown in FIG. 8, in some aspects, process 800 may include transmitting, to the UE, an indication of an updated SCG configuration for an SCG configuration, of the one or more SCG configurations, associated with a candidate base station of the one or more candidate base stations, wherein the updated SCG configuration is based at least in part on the one or more measurements (block 830). For example, the base station (such as by using communication manager 150 or transmission component 1304, depicted in FIG. 13) may transmit, to the UE, an indication of an updated SCG configuration for an SCG configuration, of the one or more SCG configurations, associated with a candidate base station of the one or more candidate base stations, wherein the updated SCG configuration is based at least in part on the one or more measurements, as described above.

Process 800 may include additional aspects, such as any single aspect or any combination of aspects described below or in connection with one or more other processes described elsewhere herein.

In a first additional aspect, the one or more measurements include at least one of a Layer 1 beam-based measurement, a Layer 3 beam-based measurement, or a Layer 3 cell-based measurement.

In a second additional aspect, alone or in combination with the first aspect, process 800 includes receiving, from the candidate base station, an indication of the SCG configuration, wherein the SCG configuration indicates a set of candidate cells associated with the SCG configuration.

In a third additional aspect, alone or in combination with one or more of the first and second aspects, process 800 includes transmitting, to the UE, an indication of the updated SCG configuration via an RRC message, wherein the SCG configuration is updated to the updated SCG configuration by the candidate base station based at least in part on the one or more measurements.

In a fourth additional aspect, alone or in combination with one or more of the first through third aspects, process 800 includes transmitting, to the candidate base station, an indication of the measurement report, and receiving, from the candidate base station, an indication of the updated SCG configuration based at least in part on transmitting the indication of the measurement report.

In a fifth additional aspect, alone or in combination with one or more of the first through fourth aspects, transmitting the indication of the measurement report includes transmitting, to the candidate base station, the indication of the measurement report periodically or based at least in part on detecting a reporting event.

In a sixth additional aspect, alone or in combination with one or more of the first through fifth aspects, process 800 includes selecting one or more cells, from a set of candidate cells associated with the SCG configuration, to be included in the updated SCG configuration based at least in part on the one or more measurements, and transmitting, to the UE, an indication of the updated SCG configuration via an RRC message.

In a seventh additional aspect, alone or in combination with one or more of the first through sixth aspects, selecting the one or more cells to be included in the updated SCG configuration includes receiving, from the candidate base station, an indication of the set of candidate cells associated with the SCG configuration and one or more conditions associated with including a cell in the SCG configuration, and selecting the one or more cells to be included in the updated SCG configuration based at least in part on the one or more measurements and the one or more conditions.

In an eighth additional aspect, alone or in combination with one or more of the first through seventh aspects, process 800 includes transmitting, to the candidate base station, an indication of the updated SCG configuration.

In a ninth additional aspect, alone or in combination with one or more of the first through eighth aspects, process 800 includes receiving, from the candidate base station, an indication of a modification to the updated SCG configuration, and transmitting, to the UE, an indication of the modification to the updated SCG configuration.

In a tenth additional aspect, alone or in combination with one or more of the first through ninth aspects, the execution condition includes at least one of a Layer 1 beam-based measurement execution condition, a Layer 3 beam-based measurement execution condition, a Layer 3 cell-based measurement execution condition, or an MPE based execution condition.

In an eleventh additional aspect, alone or in combination with one or more of the first through tenth aspects, the execution condition includes at least one of a first execution condition associated with a first beam quality measurement, of the candidate base station, satisfying a first threshold or being greater than a second beam quality measurement of a serving beam associated with the base station, or a second execution condition associated with a quantity of beams, associated with the one or more candidate base stations, having beam quality measurements that satisfy a second threshold or that are greater than the second beam quality measurement of the serving beam associated with the base station.

In a twelfth additional aspect, alone or in combination with one or more of the first through eleventh aspects, the execution condition includes a first execution condition associated with a quantity of occurrences that second execution condition has been satisfied or associated with an amount of time that the second execution condition has been satisfied.

In a thirteenth additional aspect, alone or in combination with one or more of the first through twelfth aspects, the execution condition includes an MPE based execution condition associated with an MPE limit of an uplink beam that is associated with a downlink beam that satisfies a measurement based execution condition.

In a fourteenth additional aspect, alone or in combination with one or more of the first through thirteenth aspects, the execution condition includes at least one of one or more execution conditions associated with PCells of the one or more candidate base stations, or one or more execution conditions associated with PSCells of the one or more candidate base stations.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
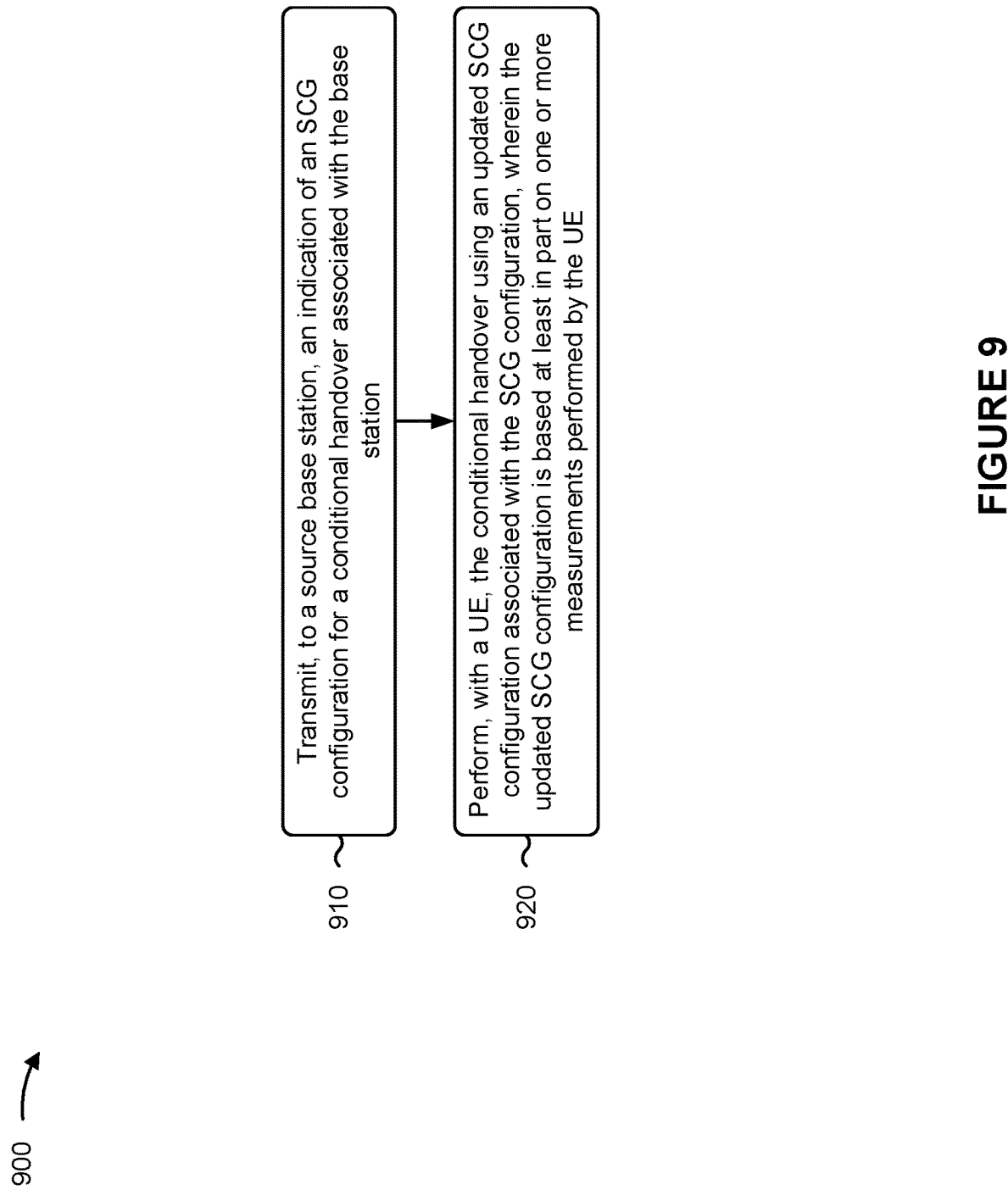

FIG. 9 is a flowchart illustrating an example process 900 performed, for example, by a base station, associated with mobility enhancements for conditional handovers, in accordance with the present disclosure. Example process 900 is an example where the base station (for example, the base station 110, the first candidate base station 610, or the second candidate base station 615) performs operations associated with mobility enhancements for conditional handovers.

As shown in FIG. 9, in some aspects, process 900 may include transmitting, to a source base station, an indication of an SCG configuration for a conditional handover associated with the base station (block 910). For example, the base station (such as by using communication manager 150 or transmission component 1404, depicted in FIG. 14) may transmit, to a source base station, an indication of an SCG configuration for a conditional handover associated with the base station, as described above.

As further shown in FIG. 9, in some aspects, process 900 may include performing, with a UE, the conditional handover using an updated SCG configuration associated with the SCG configuration, wherein the updated SCG configuration is based at least in part on one or more measurements performed by the UE (block 920). For example, the base station (such as by using communication manager 150 or transmission component 1404, or reception component 1402, depicted in FIG. 14) may perform, with a UE, the conditional handover using an updated SCG configuration associated with the SCG configuration, wherein the updated SCG configuration is based at least in part on one or more measurements performed by the UE, as described above.

Process 900 may include additional aspects, such as any single aspect or any combination of aspects described below or in connection with one or more other processes described elsewhere herein.

In a first additional aspect, process 900 includes receiving, from the source base station, an indication of a measurement report that indicates the one or more measurements.

In a second additional aspect, alone or in combination with the first aspect, process 900 includes receiving, from the UE or the source base station, an indication of the updated SCG configuration.

In a third additional aspect, alone or in combination with one or more of the first and second aspects, process 900 includes transmitting, to the source base station, an indication of the updated SCG configuration that is selected by the base station based at least in part on the one or more measurements, wherein the indication of the updated SCG configuration is to be forwarded to the UE by the source base station.

In a fourth additional aspect, alone or in combination with one or more of the first through third aspects, the one or more measurements include at least one of a Layer 1 beam-based measurement, a Layer 3 beam-based measurement, or a Layer 3 cell-based measurement.

In a fifth additional aspect, alone or in combination with one or more of the first through fourth aspects, the SCG configuration indicates a set of candidate cells associated with the SCG configuration.

In a sixth additional aspect, alone or in combination with one or more of the first through fifth aspects, process 900 includes selecting one or more cells, from a set of candidate cells associated with the SCG configuration, to be included in the updated SCG configuration based at least in part on the one or more measurements, and transmitting, to the source base station, an indication of the updated SCG configuration.

In a seventh additional aspect, alone or in combination with one or more of the first through sixth aspects, process 900 includes receiving, from the source base station, an indication of a measurement report that indicates the one or more measurements, and transmitting, to the source base station, an indication of the updated SCG configuration based at least in part on receiving the indication of the measurement report.

In an eighth additional aspect, alone or in combination with one or more of the first through seventh aspects, receiving the indication of the measurement report includes receiving, from the source base station, the indication of the measurement report periodically or based at least in part on a reporting event.

In a ninth additional aspect, alone or in combination with one or more of the first through eighth aspects, process 900 includes receiving, from the source base station, an indication of the updated SCG configuration. For example, the source base station may determine the updated SCG configuration associated with the base station and may transmit the updated SCG configuration to the base station.

In a tenth additional aspect, alone or in combination with one or more of the first through ninth aspects, process 900 includes transmitting, to the source base station, an indication of a modification to the updated SCG configuration, wherein the modification to the updated SCG configuration is to be forwarded to the UE by the source base station.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
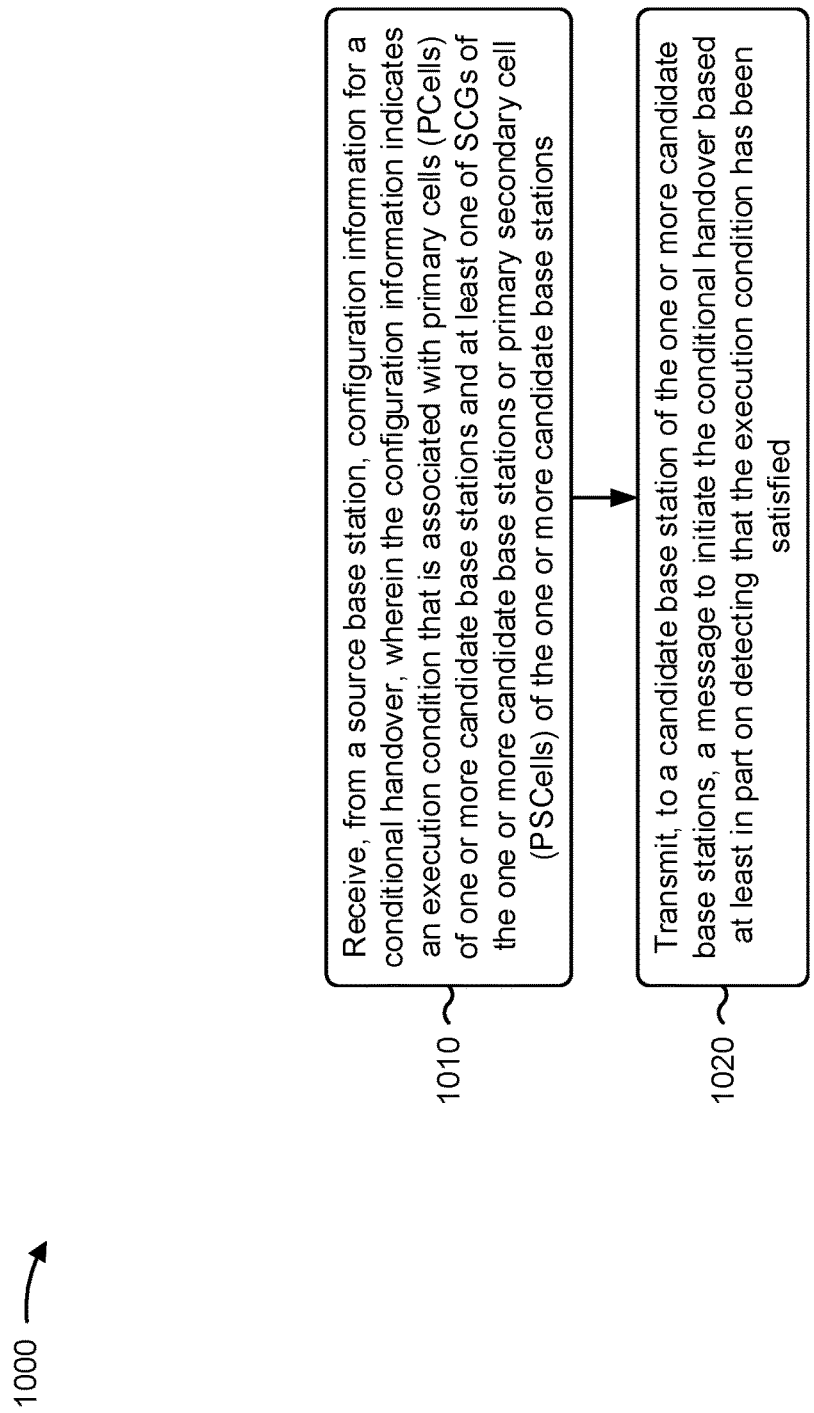
FIG. 10 is a flowchart illustrating an example process performed, for example, by a UE, associated with mobility enhancements for a conditional handover in accordance with the present disclosure.

FIG. 10 is a flowchart illustrating an example process 1000 performed, for example, by a UE, associated with mobility enhancements for conditional handovers, in accordance with the present disclosure. Example process 1000 is an example where the UE (for example, UE 120) performs operations associated with mobility enhancements for conditional handovers.

As shown in FIG. 10, in some aspects, process 1000 may include receiving, from a source base station, configuration information for a conditional handover, wherein the configuration information indicates an execution condition that is associated with PCells of one or more candidate base stations and at least one of SCGs of the one or more candidate base stations or PSCells of the one or more candidate base stations (block 1010). For example, the UE (such as by using communication manager 140 or reception component 1502, depicted in FIG. 15) may receive, from a source base station, configuration information for a conditional handover, wherein the configuration information indicates an execution condition that is associated with PCells of one or more candidate base stations and at least one of SCGs of the one or more candidate base stations or PSCells of the one or more candidate base stations, as described above.

As further shown in FIG. 10, in some aspects, process 1000 may include transmitting, to a candidate base station of the one or more candidate base stations, a message to initiate the conditional handover based at least in part on detecting that the execution condition has been satisfied (block 1020). For example, the UE (such as by using communication manager 140 or transmission component 1504, depicted in FIG. 15) may transmit, to a candidate base station of the one or more candidate base stations, a message to initiate the conditional handover based at least in part on detecting that the execution condition has been satisfied, as described above.

Process 1000 may include additional aspects, such as any single aspect or any combination of aspects described below or in connection with one or more other processes described elsewhere herein.

In a first additional aspect, the execution condition includes at least one of a first execution condition associated with PCells of the one or more candidate base stations, a second execution condition associated with SCGs of the one or more candidate base stations, or a third execution condition associated with PSCells of the one or more candidate base stations.

In a second additional aspect, alone or in combination with the first aspect, the execution condition includes a first execution condition associated with PCells of the one or more candidate base stations and a second execution condition associated with SCGs or PSCells of the one or more candidate base stations, and transmitting the message to initiate the conditional handover includes transmitting the message to initiate the conditional handover based at least in part on detecting that a measurement of a PCell associated with the candidate base station satisfies the first execution condition, wherein the message indicates that an SCG associated with the candidate base station is to be added as part of the conditional handover based at least in part on a measurement of an SCG or a PSCell associated with the candidate base station satisfies the second execution condition.

In a third additional aspect, alone or in combination with one or more of the first and second aspects, the execution condition includes a first execution condition associated with PCells of the one or more candidate base stations and a second execution condition associated with SCGs or PSCells of the one or more candidate base stations, wherein transmitting the message to initiate the conditional handover includes transmitting the message to initiate the conditional handover based at least in part on detecting that a measurement of a PCell associated with the candidate base station satisfies the first execution condition and based at least in part on detecting that a measurement of an SCG or a PSCell associated with the candidate base station satisfies the second execution condition.

In a fourth additional aspect, alone or in combination with one or more of the first through third aspects, receiving the configuration information includes receiving an indication, for the candidate base station, of an SCG configuration that indicates a set of candidate PCell and PSCell pairs, and the message to initiate the conditional handover indicates a candidate PCell and PSCell pair, from the set of candidate PCell and PSCell pairs, that is based at least in part on a measurement of at least one of a PCell included in the PCell and PSCell pair or a PSCell included in the PCell and PSCell pair.

In a fifth additional aspect, alone or in combination with one or more of the first through fourth aspects, process 1000 includes measuring a set of PCells associated with the candidate base station to obtain a set of measurement values associated with the set of PCells, and the message to initiate the conditional handover indicates the candidate PCell and PSCell pair based at least in part on the PCell included in the PCell and PSCell pair being associated with a highest measurement value from the set of measurement values.

In a sixth additional aspect, alone or in combination with one or more of the first through fifth aspects, process 1000 includes measuring a set of PCells associated with the candidate base station to obtain a first set of measurement values associated with the set of PCells, and measuring a set of PSCells associated with the candidate base station to obtain a second set of measurement values associated with the set of PSCells, wherein the message to initiate the conditional handover indicates the candidate PCell and PSCell pair based at least in part on the PCell and the PSCell included in the PCell and PSCell pair being associated with a highest joint measurement from the first set of measurement values and the second set of measurement values.

In a seventh additional aspect, alone or in combination with one or more of the first through sixth aspects, receiving the configuration information includes receiving an indication, for the candidate base station, of an SCG configuration that indicates a set of candidate PCell and PSCell pairs, and the message to initiate the conditional handover indicates a candidate PCell and PSCell pair, from the set of candidate PCell and PSCell pairs, that is based at least in part on a timing difference between a PCell and a PSCell included in the candidate PCell and PSCell pair.

In an eighth additional aspect, alone or in combination with one or more of the first through seventh aspects, receiving the configuration information includes receiving an indication of a set of candidate cells associated with the candidate base station, and the message to initiate the conditional handover indicates a candidate cell, from the set of candidate cells, that is based at least in part on an MPE condition associated with an MPE limit of an uplink beam of the candidate cell that is associated with a downlink beam of the candidate cell that satisfies a measurement based execution condition.

In a ninth additional aspect, alone or in combination with one or more of the first through eighth aspects, process 1000 includes selecting one or more secondary cells associated with the candidate base station to be associated with the conditional handover based at least in part on one or more execution conditions, and transmitting an indication of the one or more secondary cells.

In a tenth additional aspect, alone or in combination with one or more of the first through ninth aspects, transmitting the indication of the one or more secondary cells includes transmitting, to the candidate base station, the indication of the one or more secondary cells via at least one of layer 3 signaling, RRC signaling, MAC-CE signaling, or a message using an SR resource.

In an eleventh additional aspect, alone or in combination with one or more of the first through tenth aspects, transmitting the indication of the one or more secondary cells includes transmitting, to the candidate base station, the indication of the one or more secondary cells, wherein the indication of the one or more secondary cells is to be forwarded to the candidate base station by the source base station.

In a twelfth additional aspect, alone or in combination with one or more of the first through eleventh aspects, process 1000 includes performing the conditional handover with the candidate base station, and communicating, with the candidate base station, using an initial beam based at least in part on performing the conditional handover, wherein the initial beam is based at least in part on one or more beam-based measurements of at least one of a PCell or a PSCell associated with the candidate base station.

In a thirteenth additional aspect, alone or in combination with one or more of the first through twelfth aspects, the one or more beam-based measurements include at least one of a Layer 3 beam-based measurement or a Layer 1 beam-based measurement.

In a fourteenth additional aspect, alone or in combination with one or more of the first through thirteenth aspects, process 1000 includes measuring one or more beams associated with one or more cells of the candidate base station to obtain a set of beam measurement values, and transmitting, to the candidate base station, information associated with one or more cells associated with the conditional handover, wherein the information associated with the one or more cells includes one or more beam measurement values from the set of beam measurement values.

In a fifteenth additional aspect, alone or in combination with one or more of the first through fourteenth aspects, process 1000 includes transmitting, to the candidate base station, an indication of an activation status for one or more SCells associated with an SCG of the candidate base station.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
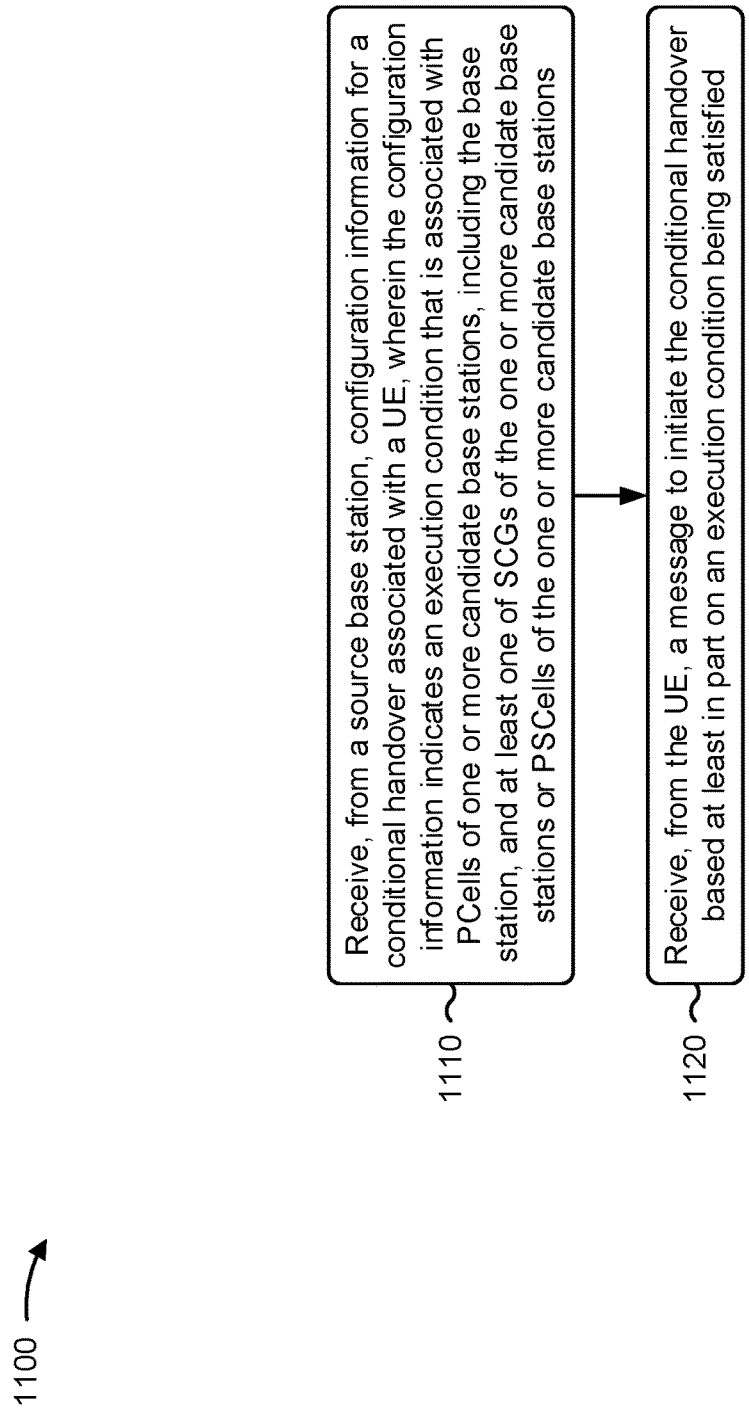
FIG. 11 is a flowchart illustrating an example process performed, for example, by a base station, associated with mobility enhancements for a conditional handover, in accordance with the present disclosure

FIG. 11 is a flowchart illustrating an example process 1100 performed, for example, by a base station, mobility enhancements for conditional handovers, in accordance with the present disclosure. Example process 1100 is an example where the base station (for example, the base station 110, the first candidate base station 610, or the second candidate base station 615) performs operations associated with mobility enhancements for conditional handovers.

As shown in FIG. 11, in some aspects, process 1100 may include receiving, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations (block 1110). For example, the base station (such as by using communication manager 150 or reception component 1602, depicted in FIG. 16) may receive, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations, as described above.

As further shown in FIG. 11, in some aspects, process 1100 may include receiving, from the UE, a message to initiate the conditional handover based at least in part on an execution condition being satisfied (block 1120). For example, the base station (such as by using communication manager 150 or reception component 1602, depicted in FIG. 16) may receive, from the UE, a message to initiate the conditional handover based at least in part on an execution condition being satisfied, as described above.

Process 1100 may include additional aspects, such as any single aspect or any combination of aspects described below or in connection with one or more other processes described elsewhere herein.

In a first additional aspect, the execution condition includes at least one of a first execution condition associated with PCells of the one or more candidate base stations, a second execution condition associated with SCGs of the one or more candidate base stations, or a third execution condition associated with PSCells of the one or more candidate base stations.

In a second additional aspect, alone or in combination with the first aspect, the execution condition includes a first execution condition associated with PCells of the one or more candidate base stations and a second execution condition associated with SCGs or PSCells of the one or more candidate base stations, wherein receiving the message to initiate the conditional handover includes receiving the message to initiate the conditional handover based at least in part on a measurement of a PCell associated with the base station satisfying the first execution condition, wherein the message indicates that an SCG associated with the base station is to be added as part of the conditional handover based at least in part on a measurement of an SCG or a PSCell associated with the candidate base station satisfies the second execution condition.

In a third additional aspect, alone or in combination with one or more of the first and second aspects, the execution condition includes a first execution condition associated with PCells of the one or more candidate base stations and a second execution condition associated with SCGs or PSCells of the one or more candidate base stations, wherein receiving the message to initiate the conditional handover includes receiving the message to initiate the conditional handover based at least in part on a measurement of a PCell associated with the base station satisfying the first execution condition and based at least in part on a measurement of an SCG or a PSCell associated with the base station satisfying the second execution condition.

In a fourth additional aspect, alone or in combination with one or more of the first through third aspects, process 1100 includes transmitting, to the source base station or the UE, an indication of an SCG configuration that indicates a set of candidate PCell and PSCell pairs, and the message to initiate the conditional handover indicates a candidate PCell and PSCell pair, from the set of candidate PCell and PSCell pairs, that is based at least in part on a measurement of at least one of a PCell included in the PCell and PSCell pair or a PSCell included in the PCell and PSCell pair.

In a fifth additional aspect, alone or in combination with one or more of the first through fourth aspects, the message to initiate the conditional handover indicates the candidate PCell and PSCell pair based at least in part on the PCell included in the PCell and PSCell pair being associated with a highest measurement value from a set of measurement values obtained by the UE.

In a sixth additional aspect, alone or in combination with one or more of the first through fifth aspects, process 1100 includes transmitting, to the source base station or the UE, an indication of an SCG configuration that indicates a set of candidate PCell and PSCell pairs, and the message to initiate the conditional handover indicates a candidate PCell and PSCell pair, from the set of candidate PCell and PSCell pairs, that is based at least in part on a timing difference between a PCell and a PSCell included in the candidate PCell and PSCell pair.

In a seventh additional aspect, alone or in combination with one or more of the first through sixth aspects, process 1100 includes transmitting, to the source base station or the UE, an indication of a set of candidate cells associated with the candidate base station, and the message to initiate the conditional handover indicates a candidate cell, from the set of candidate cells, that is based at least in part on an MPE condition associated with an MPE limit of an uplink beam of the candidate cell that is associated with a downlink beam of the candidate cell that satisfies a measurement based execution condition.

In an eighth additional aspect, alone or in combination with one or more of the first through seventh aspects, process 1100 includes receiving, from the UE or the source base station, an indication of the one or more secondary cells associated with the base station to be associated with the conditional handover.

In a ninth additional aspect, alone or in combination with one or more of the first through eighth aspects, receiving the indication of the one or more secondary cells includes receiving, from the UE, the indication of the one or more secondary cells via at least one of layer 3 signaling, RRC signaling, MAC-CE signaling, or a message using an SR resource.

In a tenth additional aspect, alone or in combination with one or more of the first through ninth aspects, process 1100 includes performing the conditional handover with the UE, and communicating, with the UE, using an initial beam based at least in part on performing the conditional handover, wherein the initial beam is based at least in part on one or more beam-based measurements of at least one of a PCell or a PSCell associated with the base station.

In an eleventh additional aspect, alone or in combination with one or more of the first through tenth aspects, the one or more beam-based measurements include at least one of a Layer 3 beam-based measurement or a Layer 1 beam-based measurement.

In a twelfth additional aspect, alone or in combination with one or more of the first through eleventh aspects, process 1100 includes receiving, from the UE, information associated with one or more cells associated with the conditional handover, wherein the information associated with the one or more cells includes one or more beam measurement values from a set of beam measurement values obtained by the UE.

In a thirteenth additional aspect, alone or in combination with one or more of the first through twelfth aspects, process 1100 includes receiving, from the UE, an indication of an activation status for one or more SCells associated with an SCG of the base station.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
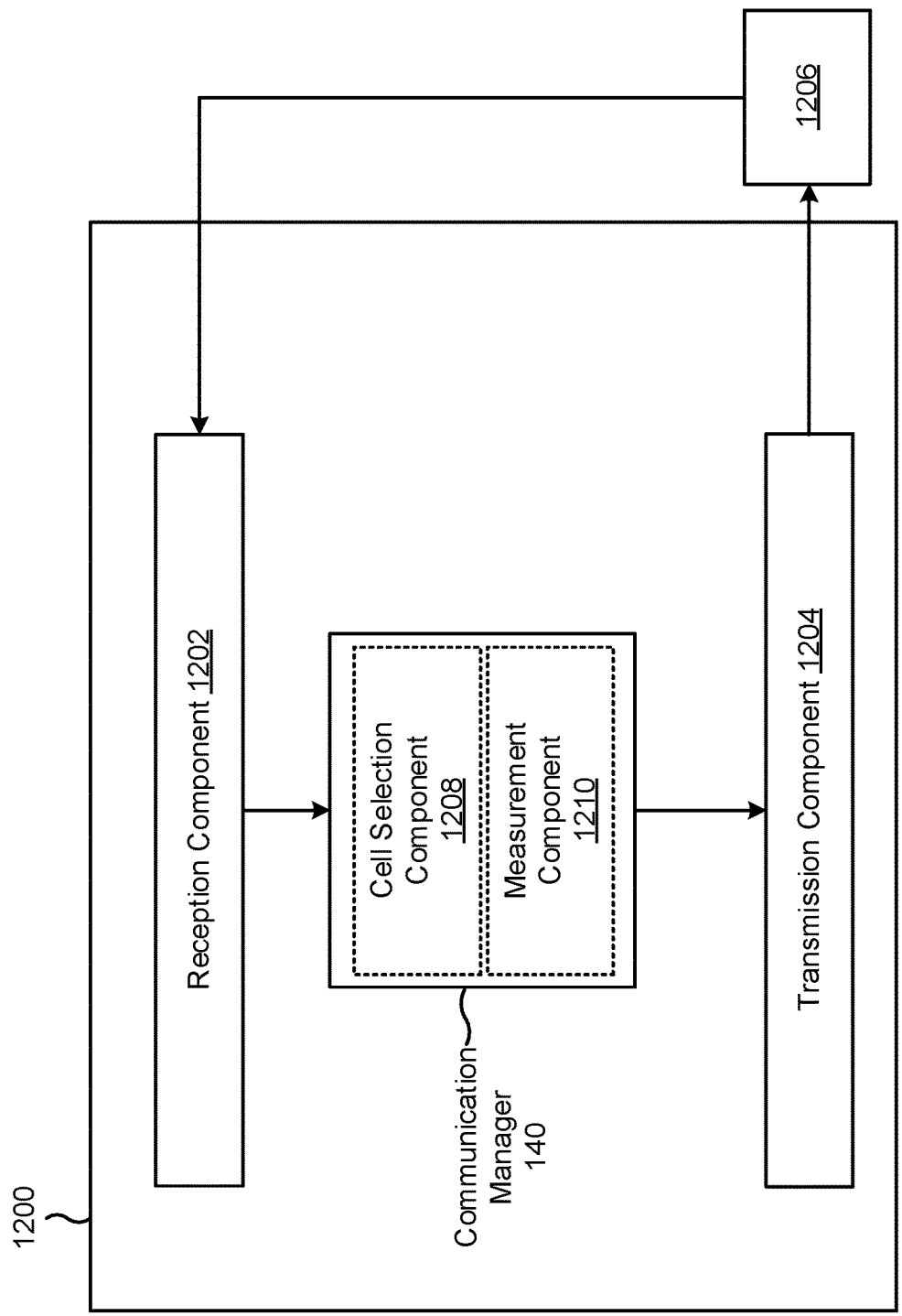
FIGS. 12-16 are diagrams of example apparatuses for wireless communication in accordance with the present disclosure.

FIG. 12 is a diagram of an example apparatus 1200 for wireless communication in accordance with the present disclosure. The apparatus 1200 may be a UE, or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 6A and 6B. Additionally or alternatively, the apparatus 1200 may be configured to perform one or more processes described herein, such as process 700 of FIG. 7, or a combination thereof. In some aspects, the apparatus 1200 may include one or more components of the UE described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The communication manager 140 may receive or may cause the reception component 1202 to receive, from a source base station, configuration information for a conditional handover, wherein the configuration information indicates an execution condition and one or more SCG configurations associated with one or more candidate base stations. The communication manager 140 may transmit or may cause the transmission component 1204 to transmit, to the source base station, a measurement report indicating one or more measurements associated with at least one of the source base station or the one or more candidate base stations. The communication manager 140 may perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a cell selection component 1208, a measurement component 1210, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive, from a source base station, configuration information for a conditional handover, wherein the configuration information indicates an execution condition and one or more SCG configurations associated with one or more candidate base stations. The transmission component 1204 may transmit, to the source base station, a measurement report indicating one or more measurements associated with at least one of the source base station or the one or more candidate base stations. The reception component 1202 or the transmission component 1204 may perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

The reception component 1202 may receive, from the source base station, an indication of the updated SCG configuration based at least in part on transmitting the measurement report, wherein the SCG configuration is updated to the updated SCG configuration by the source base station or the candidate base station.

The cell selection component 1208 may select one or more cells, from a set of candidate cells associated with the SCG configuration, to be included in the updated SCG configuration based at least in part on the one or more measurements.

The transmission component 1204 may transmit, to at least one of the source base station or the candidate base station, an indication of the updated SCG configuration.

The reception component 1202 may receive, from the source base station, an indication of the updated SCG configuration via an RRC message, wherein the SCG configuration is updated to the updated SCG configuration by the source base station based at least in part on the one or more measurements.

The measurement component 1210 may measure a reference signal transmitted by the one or more candidate base stations. The measurement component 1210 may measure a Layer 1 beam level measurement or a Layer 3 beam level measurement.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
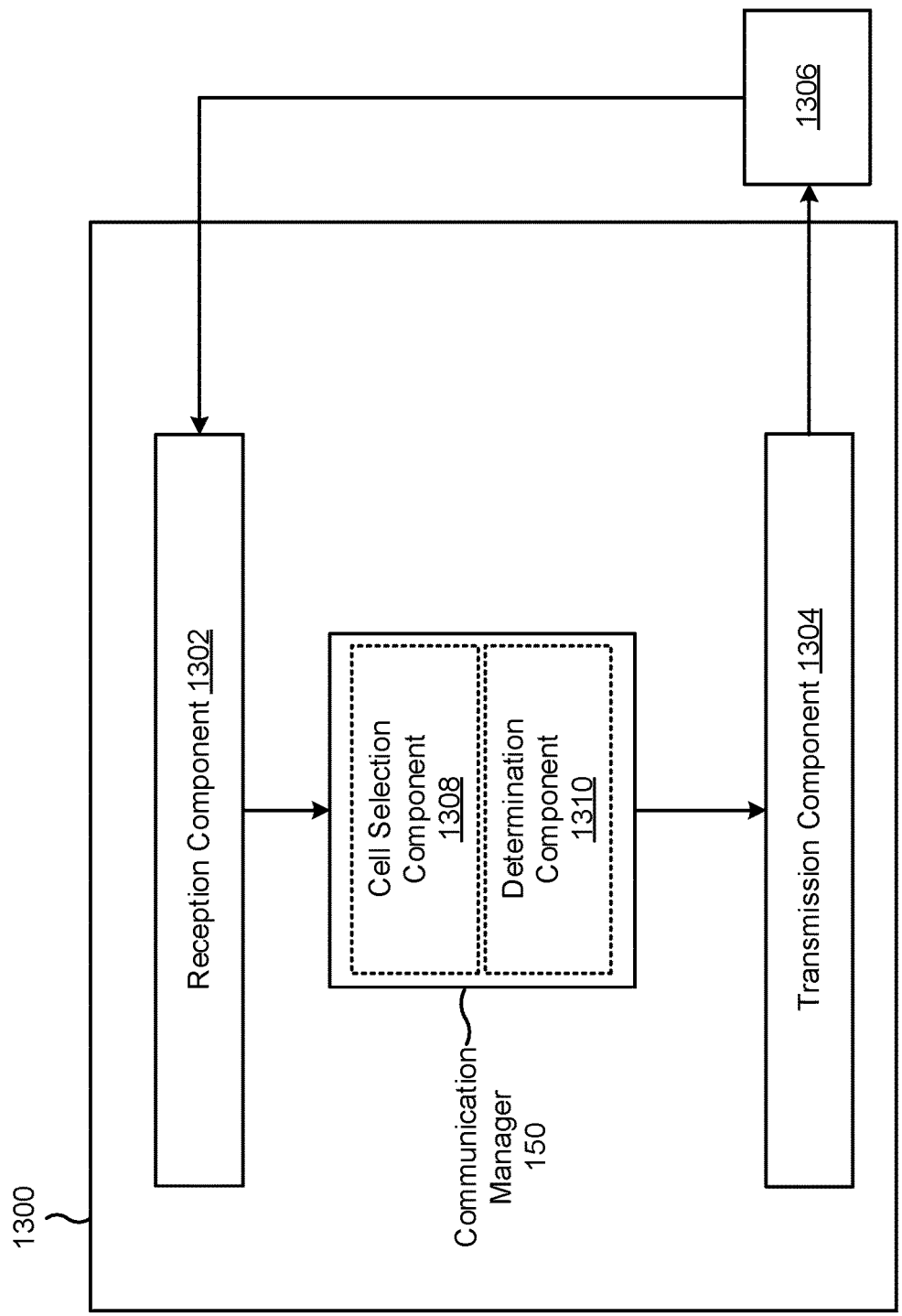

FIG. 13 is a diagram of an example apparatus 1300 for wireless communication in accordance with the present disclosure. The apparatus 1300 may be a base station, or a base station may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 6A and 6B. Additionally or alternatively, the apparatus 1300 may be configured to perform one or more processes described herein, such as process 800 of FIG. 8, or a combination thereof. In some aspects, the apparatus 1300 may include one or more components of the base station described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The communication manager 150 may transmit or may cause the transmission component 1304 to transmit, to a UE, configuration information for a conditional handover, wherein the configuration information indicates one or more execution conditions and one or more SCG configurations associated with one or more candidate base stations. The communication manager 150 may receive or may cause the reception component 1302 to receive, from the UE, a measurement report indicating one or more measurements. The communication manager 150 may transmit or may cause the transmission component 1304 to transmit, to the UE, an indication of an updated SCG configuration for an SCG configuration, of the one or more SCG configurations, associated with a candidate base station of the one or more candidate base stations, wherein the updated SCG configuration is based at least in part on the one or more measurements. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a cell selection component 1308, a determination component 1310, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1304 may transmit, to a UE, configuration information for a conditional handover, wherein the configuration information indicates one or more execution conditions and one or more SCG configurations associated with one or more candidate base stations. The reception component 1302 may receive, from the UE, a measurement report indicating one or more measurements. The transmission component 1304 may transmit, to the UE, an indication of an updated SCG configuration for an SCG configuration, of the one or more SCG configurations, associated with a candidate base station of the one or more candidate base stations, wherein the updated SCG configuration is based at least in part on the one or more measurements.

The reception component 1302 may receive, from the candidate base station, an indication of the SCG configuration, wherein the SCG configuration indicates a set of candidate cells associated with the SCG configuration.

The transmission component 1304 may transmit, to the UE, an indication of the updated SCG configuration via an RRC message, wherein the SCG configuration is updated to the updated SCG configuration by the candidate base station based at least in part on the one or more measurements.

The transmission component 1304 may transmit, to the candidate base station, an indication of the measurement report.

The reception component 1302 may receive, from the candidate base station, an indication of the updated SCG configuration based at least in part on transmitting the indication of the measurement report.

The cell selection component 1308 may select one or more cells, from a set of candidate cells associated with the SCG configuration, to be included in the updated SCG configuration based at least in part on the one or more measurements.

The transmission component 1304 may transmit, to the UE, an indication of the updated SCG configuration via an RRC message.

The transmission component 1304 may transmit, to the candidate base station, an indication of the updated SCG configuration.

The reception component 1302 may receive, from the candidate base station, an indication of a modification to the updated SCG configuration.

The transmission component 1304 may transmit, to the UE, an indication of the modification to the updated SCG configuration.

The determination component 1310 may determine the one or more execution conditions.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
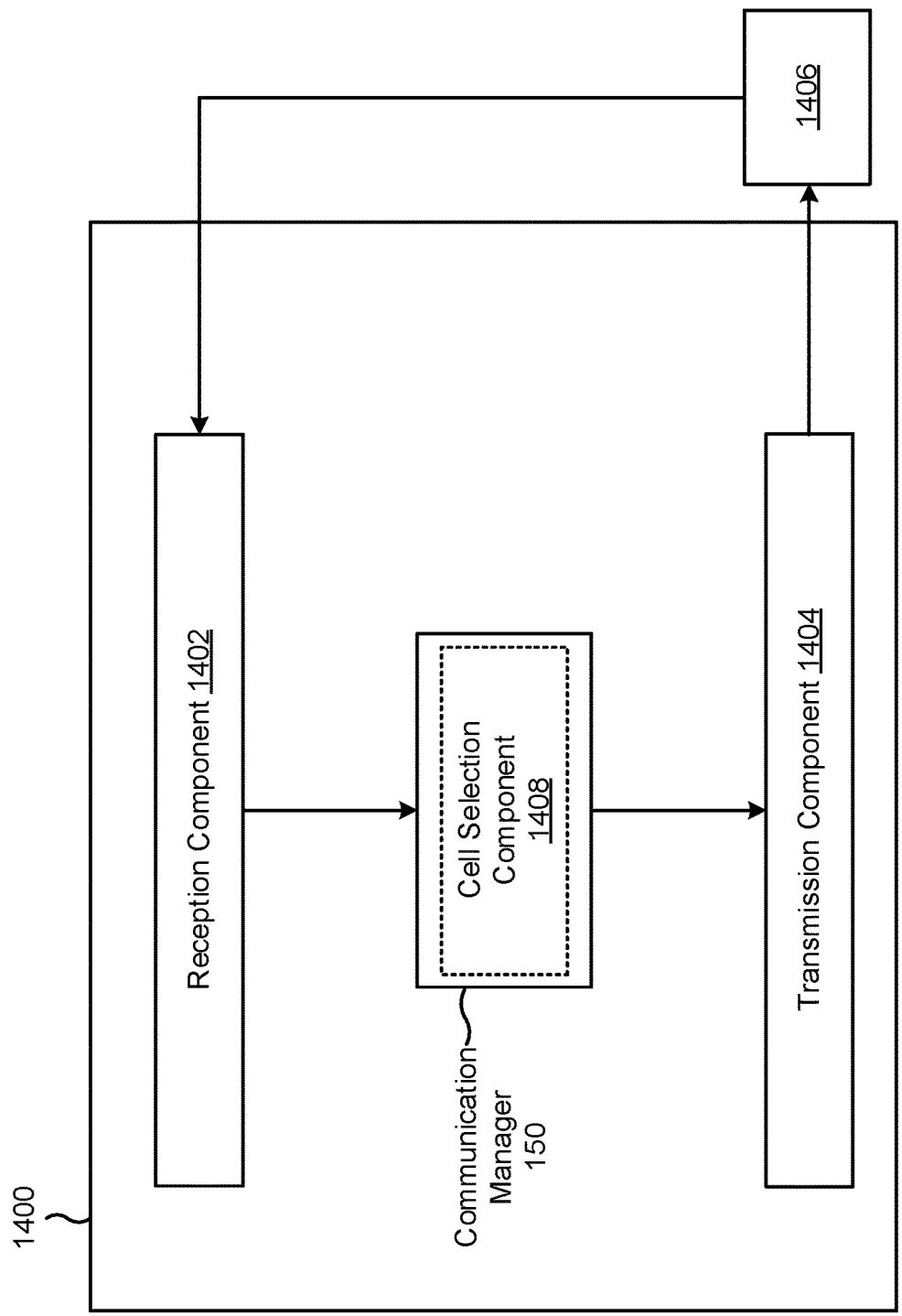

FIG. 14 is a diagram of an example apparatus 1400 for wireless communication in accordance with the present disclosure. The apparatus 1400 may be a base station, or a base station may include the apparatus 1400. In some aspects, the apparatus 1400 includes a reception component 1402, a transmission component 1404, and a communication manager 150, which may be in communication with one another (for example, via one or more buses). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 6A and 6B. Additionally or alternatively, the apparatus 1400 may be configured to perform one or more processes described herein, such as process 900 of FIG. 9, or a combination thereof. In some aspects, the apparatus 1400 may include one or more components of the base station described above in connection with FIG. 2.

The reception component 1402 may receive communications, such as reference signals, control information, data communications, or a combination thereof, from the apparatus 1406. The reception component 1402 may provide received communications to one or more other components of the apparatus 1400, such as the communication manager 150. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, the communication manager 150 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The communication manager 150 may transmit or may cause the transmission component 1404 to transmit, to a source base station, an indication of a SCG configuration for a conditional handover associated with the base station. The communication manager 150 may perform, with a UE, the conditional handover using an updated SCG configuration associated with the SCG configuration, wherein the updated SCG configuration is based at least in part on one or more measurements performed by the UE. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a cell selection component 1408, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1404 may transmit, to a source base station, an indication of an SCG configuration for a conditional handover associated with the base station. The transmission component 1404 or the reception component 1402 may perform, with a UE, the conditional handover using an updated SCG configuration associated with the SCG configuration, wherein the updated SCG configuration is based at least in part on one or more measurements performed by the UE.

The reception component 1402 may receive, from the source base station, an indication of a measurement report that indicates the one or more measurements.

The reception component 1402 may receive, from the UE or the source base station, an indication of the updated SCG configuration.

The transmission component 1404 may transmit, to the source base station, an indication of the updated SCG configuration that is selected by the base station based at least in part on the one or more measurements, wherein the indication of the updated SCG configuration is to be forwarded to the UE by the source base station.

The cell selection component 1408 may select one or more cells, from a set of candidate cells associated with the SCG configuration, to be included in the updated SCG configuration based at least in part on the one or more measurements.

The transmission component 1404 may transmit, to the source base station, an indication of the updated SCG configuration.

The reception component 1402 may receive, from the source base station, an indication of a measurement report that indicates the one or more measurements.

The transmission component 1404 may transmit, to the source base station, an indication of the updated SCG configuration based at least in part on receiving the indication of the measurement report.

The reception component 1402 may receive, from the source base station, an indication of the updated SCG configuration.

The transmission component 1404 may transmit, to the source base station, an indication of a modification to the updated SCG configuration, wherein the modification to the updated SCG configuration is to be forwarded to the UE by the source base station.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
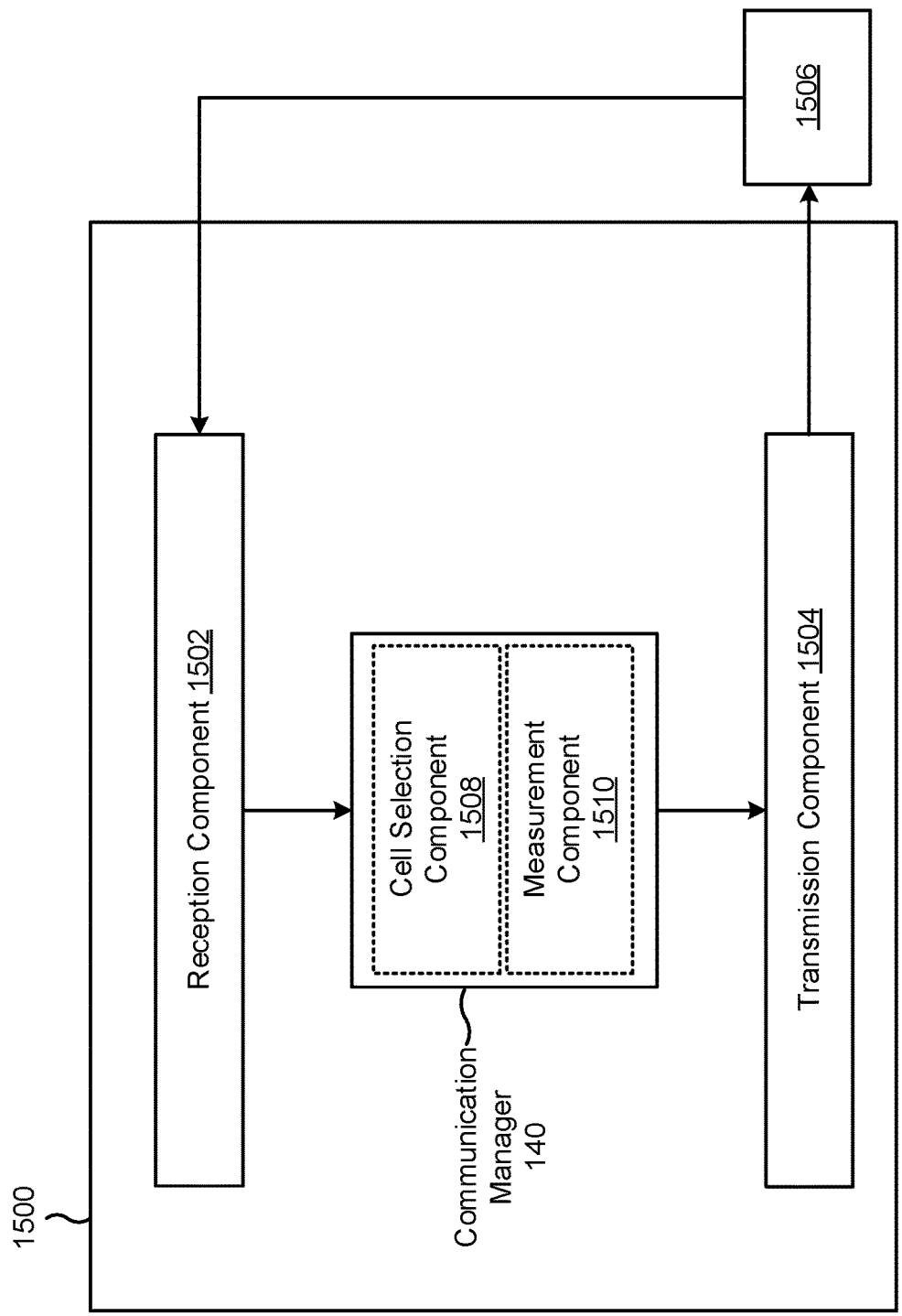

FIG. 15 is a diagram of an example apparatus 1500 for wireless communication in accordance with the present disclosure. The apparatus 1500 may be a UE, or a UE may include the apparatus 1500. In some aspects, the apparatus 1500 includes a reception component 1502, a transmission component 1504, and a communication manager 140, which may be in communication with one another (for example, via one or more buses). As shown, the apparatus 1500 may communicate with another apparatus 1506 (such as a UE, a base station, or another wireless communication device) using the reception component 1502 and the transmission component 1504.

In some aspects, the apparatus 1500 may be configured to perform one or more operations described herein in connection with FIGS. 6A and 6B. Additionally or alternatively, the apparatus 1500 may be configured to perform one or more processes described herein, such as process 1000 of FIG. 10, or a combination thereof. In some aspects, the apparatus 1500 may include one or more components of the UE described above in connection with FIG. 2.

The reception component 1502 may receive communications, such as reference signals, control information, data communications, or a combination thereof, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The communication manager 140 may receive or may cause the reception component 1502 to receive, from a source base station, configuration information for a conditional handover, wherein the configuration information indicates an execution condition that is associated with PCells of one or more candidate base stations and at least one of SCGs of the one or more candidate base stations or PSCells of the one or more candidate base stations. The communication manager 140 may transmit or may cause the transmission component 1504 to transmit, to a candidate base station of the one or more candidate base stations, a message to initiate the conditional handover based at least in part on detecting that the execution condition has been satisfied. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a cell selection component 1508, a measurement component 1510, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive, from a source base station, configuration information for a conditional handover, wherein the configuration information indicates an execution condition that is associated with primary cells (PCells) of one or more candidate base stations and at least one of secondary cell groups (SCGs) of the one or more candidate base stations or primary secondary cell (PSCells)

of the one or more candidate base stations. The transmission component 1504 may transmit, to a candidate base station of the one or more candidate base stations, a message to initiate the conditional handover based at least in part on detecting that the execution condition has been satisfied.

The measurement component 1510 may measure a set of PCells associated with the candidate base station to obtain a set of measurement values associated with the set of PCells wherein the message to initiate the conditional handover indicates the candidate PCell and PSCell pair based at least in part on the PCell included in the PCell and PSCell pair being associated with a highest measurement value from the set of measurement values.

The measurement component 1510 may measure a set of PCells associated with the candidate base station to obtain a first set of measurement values associated with the set of PCells and measuring a set of PSCells associated with the candidate base station to obtain a second set of measurement values associated with the set of PSCells, wherein the message to initiate the conditional handover indicates the candidate PCell and PSCell pair based at least in part on the PCell and the PSCell included in the PCell and PSCell pair being associated with a highest joint measurement from the first set of measurement values and the second set of measurement values.

The cell selection component 1508 may select one or more secondary cells associated with the candidate base station to be associated with the conditional handover based at least in part on one or more execution conditions.

The transmission component 1504 may transmit an indication of the one or more secondary cells.

The transmission component 1504 or the reception component 1502 may perform the conditional handover with the candidate base station.

The transmission component 1504 or the reception component 1502 may communicate, with the candidate base station, using an initial beam based at least in part on performing the conditional handover, wherein the initial beam is based at least in part on one or more beam-based measurements of at least one of a PCell or a PSCell associated with the candidate base station.

The measurement component 1510 may measure one or more beams associated with one or more cells of the candidate base station to obtain a set of beam measurement values.

The transmission component 1504 may transmit, to the candidate base station, information associated with one or more cells associated with the conditional handover, wherein the information associated with the one or more cells includes one or more beam measurement values from the set of beam measurement values.

The transmission component 1504 may transmit, to the candidate base station, an indication of an activation status for one or more SCells associated with an SCG of the candidate base station.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
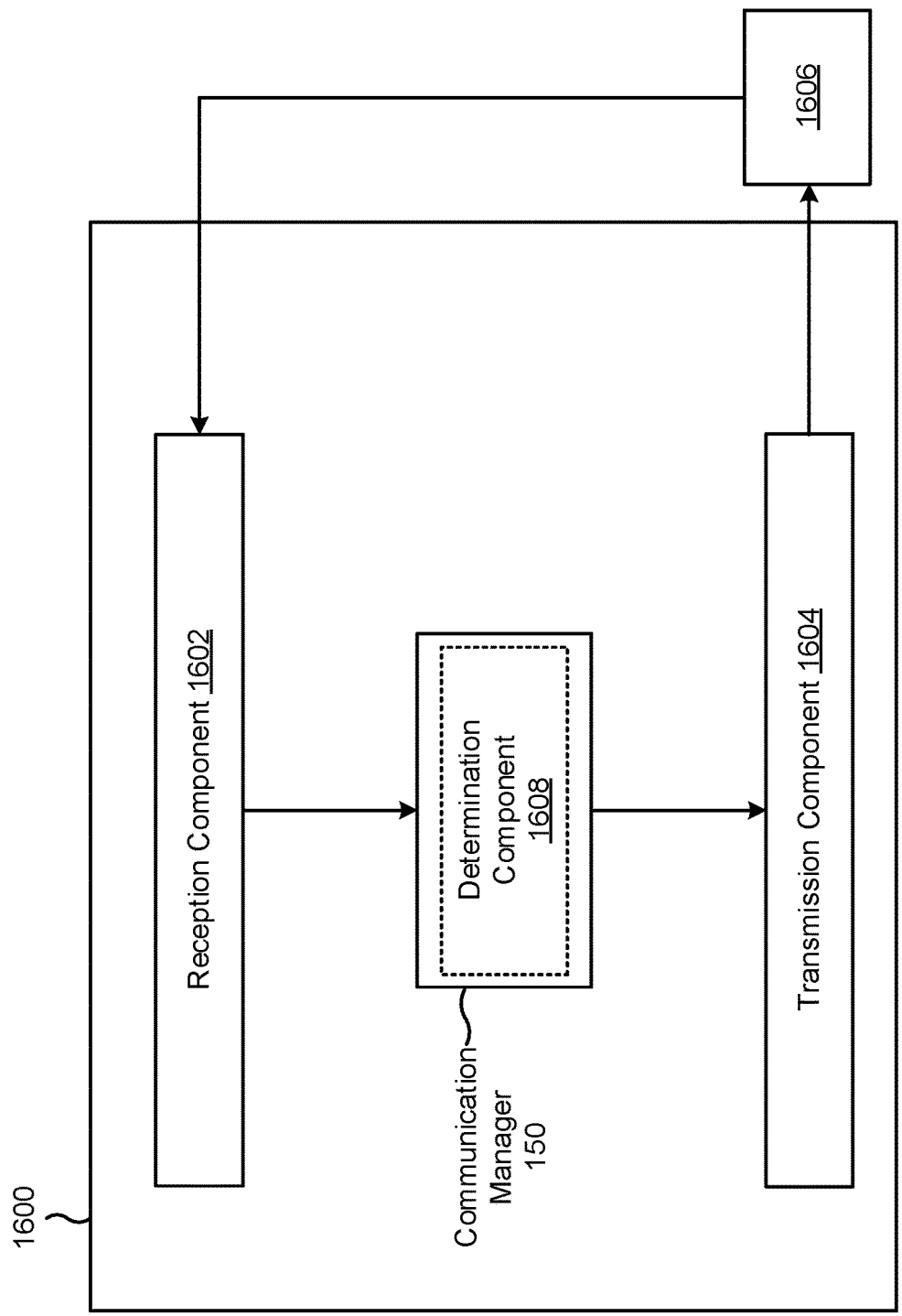

FIG. 16 is a diagram of an example apparatus 1600 for wireless communication in accordance with the present disclosure. The apparatus 1600 may be a base station, or a base station may include the apparatus 1600. In some aspects, the apparatus 1600 includes a reception component 1602, a transmission component 1604, and a communication manager 150, which may be in communication with one another (for example, via one or more buses). As shown, the apparatus 1600 may communicate with another apparatus 1606 (such as a UE, a base station, or another wireless communication device) using the reception component 1602 and the transmission component 1604.

In some aspects, the apparatus 1600 may be configured to perform one or more operations described herein in connection with FIGS. 6A and 6B. Additionally or alternatively, the apparatus 1600 may be configured to perform one or more processes described herein, such as process 1100 of FIG. 11, or a combination thereof. In some aspects, the apparatus 1600 may include one or more components of the base station described above in connection with FIG. 2.

The reception component 1602 may receive communications, such as reference signals, control information, data communications, or a combination thereof, from the apparatus 1606. The reception component 1602 may provide received communications to one or more other components of the apparatus 1600, such as the communication manager 150. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, the communication manager 150 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The communication manager 150 may receive or may cause the reception component 1602 to receive, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The communication manager 150 may receive or may cause the reception component 1602 to receive, from the UE, a message to initiate the conditional handover based at least in part on an execution condition being satisfied. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a determination component 1608, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive, from a source base station, configuration information for a conditional handover associated with a UE, wherein the configuration information indicates an execution condition that is associated with PCells of one or more candidate base stations, including the base station, and at least one of SCGs of the one or more candidate base stations or PSCells of the one or more candidate base stations. The reception component 1602 may receive, from the UE, a message to initiate the conditional handover based at least in part on an execution condition being satisfied.

The transmission component 1604 may transmit, to the source base station or the UE, an indication of an SCG configuration that indicates a set of candidate PCell and PSCell pairs, wherein the message to initiate the conditional handover indicates a candidate PCell and PSCell pair, from the set of candidate PCell and PSCell pairs, that is based at least in part on a measurement of at least one of a PCell included in the PCell and PSCell pair or a PSCell included in the PCell and PSCell pair.

The transmission component 1604 may transmit, to the source base station or the UE, an indication of an SCG configuration that indicates a set of candidate PCell and PSCell pairs, wherein the message to initiate the conditional handover indicates a candidate PCell and PSCell pair, from the set of candidate PCell and PSCell pairs, that is based at least in part on a timing difference between a PCell and a PSCell included in the candidate PCell and PSCell pair.

The transmission component 1604 may transmit, to the source base station or the UE, an indication of a set of candidate cells associated with the candidate base station wherein the message to initiate the conditional handover indicates a candidate cell, from the set of candidate cells, that is based at least in part on a maximum permissible exposure (MPE) condition associated with an MPE limit of an uplink beam of the candidate cell that is associated with a downlink beam of the candidate cell that satisfies a measurement based execution condition.

The reception component 1602 may receive, from the UE or the source base station, an indication of the one or more secondary cells associated with the base station to be associated with the conditional handover.

The reception component 1602 or the transmission component 1604 may perform the conditional handover with the UE.

The reception component 1602 or the transmission component 1604 may communicate, with the UE, using an initial beam based at least in part on performing the conditional handover, wherein the initial beam is based at least in part on one or more beam-based measurements of at least one of a PCell or a PSCell associated with the base station.

The reception component 1602 may receive, from the UE, information associated with one or more cells associated with the conditional handover, wherein the information associated with the one or more cells includes one or more beam measurement values from a set of beam measurement values obtained by the UE.

The reception component 1602 may receive, from the UE, an indication of an activation status for one or more SCells associated with an SCG of the apparatus 1600.

The determination component 1608 may determine an SCG configuration for an SCG of the apparatus 1600. The determination component 1608 may determine, or the reception component 1602 may receive an indication of, an updated SCG configuration for the SCG, where the updated SCG is based at least in part on one or more measurements performed by the UE.

The quantity and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, from a source base station, configuration information for a conditional handover, wherein the configuration information indicates an execution condition and one or more secondary cell group (SCG) configurations associated with one or more candidate base stations; transmitting, to the source base station, a measurement report indicating one or more measurements associated with at least one of the source base station or the one or more candidate base stations; and performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

Aspect 2: The method of Aspect 1, wherein the one or more measurements include at least one of: a Layer 1 beam-based measurement, a Layer 3 beam-based measurement, or a Layer 3 cell-based measurement.

Aspect 3: The method of any of Aspects 1-2, further comprising receiving, from the source base station, an indication of the updated SCG configuration based at least in part on transmitting the measurement report, wherein the SCG configuration is updated to the updated SCG configuration by the source base station or the candidate base station.

Aspect 4: The method of any of Aspects 1-3, wherein receiving the configuration information comprises receiving an indication of the SCG configuration, wherein the SCG configuration indicates a set of candidate cells associated with the SCG configuration.

Aspect 5: The method of any of Aspects 1-2, further comprising: selecting one or more cells, from a set of candidate cells associated with the SCG configuration, to be included in the updated SCG configuration based at least in part on the one or more measurements; and transmitting, to at least one of the source base station or the candidate base station, an indication of the updated SCG configuration.

Aspect 6: The method of any of Aspects 1-5, wherein the measurement report is forwarded to the candidate base station by the source base station, the method further comprising receiving, from the source base station, an indication of the updated SCG configuration via a radio resource control (RRC) message, wherein the SCG configuration is updated to the updated SCG configuration by the candidate base station based at least in part on the one or more measurements.

Aspect 7: The method of any of Aspects 1-6, further comprising receiving, from the source base station, an indication of the updated SCG configuration via a radio resource control (RRC) message, wherein the SCG configuration is updated to the updated SCG configuration by the source base station based at least in part on the one or more measurements.

Aspect 8: The method of any of Aspects 1-7, wherein the execution condition includes at least one of: a Layer 1 beam-based measurement execution condition, a Layer 3 beam-based measurement execution condition, a Layer 3 cell-based measurement execution condition, or a maximum permissible exposure (MPE) based execution condition.

Aspect 9: The method of any of Aspects 1-8, wherein the execution condition includes at least one of: a first execution condition associated with a first beam quality measurement, of the candidate base station, satisfying a first threshold or being greater than a second beam quality measurement of a serving beam associated with the source base station; or a second execution condition associated with a quantity of beams, associated with the one or more candidate base stations, having beam quality measurements that satisfy a second threshold or that are greater than the second beam quality measurement of the serving beam associated with the source base station.

Aspect 10: The method of any of Aspects 1-9, wherein the execution condition includes a first execution condition associated with a quantity of occurrences that a second execution condition has been satisfied or associated with an amount of time that the second execution condition has been satisfied.

Aspect 11: The method of any of Aspects 1-10, wherein the execution condition includes a maximum permissible exposure (MPE) based execution condition associated with an MPE limit of an uplink beam that is associated with a downlink beam that satisfies a measurement based execution condition.

Aspect 12: The method of any of Aspects 1-11, wherein the execution condition includes at least one of: one or more execution conditions associated with primary cells (PCells) of the one or more candidate base stations, or one or more execution conditions associated with primary secondary cells (PSCells) of the one or more candidate base stations.

Aspect 13: A method of wireless communication performed by a base station, comprising: transmitting, to a user equipment (UE), configuration information for a conditional handover, wherein the configuration information indicates one or more execution conditions and one or more secondary cell group (SCG) configurations associated with one or more candidate base stations; receiving, from the UE, a measurement report indicating one or more measurements; and transmitting, to the UE, an indication of an updated SCG configuration for an SCG configuration, of the one or more SCG configurations, associated with a candidate base station of the one or more candidate base stations, wherein the updated SCG configuration is based at least in part on the one or more measurements.

Aspect 14: The method of Aspect 13, wherein the one or more measurements include at least one of: a Layer 1 beam-based measurement, a Layer 3 beam-based measurement, or a Layer 3 cell-based measurement.

Aspect 15: The method of any of Aspects 13-14, further comprising receiving, from the candidate base station, an indication of the SCG configuration, wherein the SCG configuration indicates a set of candidate cells associated with the SCG configuration.

Aspect 16: The method of any of Aspects 13-15, further comprising transmitting, to the UE, an indication of the updated SCG configuration via a radio resource control (RRC) message, wherein the SCG configuration is updated to the updated SCG configuration by the candidate base station based at least in part on the one or more measurements.

Aspect 17: The method of Aspect 16, further comprising: transmitting, to the candidate base station, an indication of the measurement report; and receiving, from the candidate base station, an indication of the updated SCG configuration based at least in part on transmitting the indication of the measurement report.

Aspect 18: The method of Aspect 17, wherein transmitting the indication of the measurement report comprises transmitting, to the candidate base station, the indication of the measurement report periodically or based at least in part on detecting a reporting event.

Aspect 19: The method of any of Aspects 13-18, further comprising: selecting one or more cells, from a set of candidate cells associated with the SCG configuration, to be included in the updated SCG configuration based at least in part on the one or more measurements; and transmitting, to the UE, an indication of the updated SCG configuration via a radio resource control (RRC) message.

Aspect 20: The method of Aspect 19, wherein selecting the one or more cells to be included in the updated SCG configuration comprises: receiving, from the candidate base station, an indication of the set of candidate cells associated with the SCG configuration and one or more conditions associated with including a cell in the SCG configuration; and selecting the one or more cells to be included in the updated SCG configuration based at least in part on the one or more measurements and the one or more conditions.

Aspect 21: The method of any of Aspects 19-20, further comprising transmitting, to the candidate base station, an indication of the updated SCG configuration.

Aspect 22: The method of Aspect 21, further comprising: receiving, from the candidate base station, an indication of a modification to the updated SCG configuration; and transmitting, to the UE, an indication of the modification to the updated SCG configuration.

Aspect 23: The method of any of Aspects 13-22, wherein the execution condition includes at least one of: a Layer 1 beam-based measurement execution condition, a Layer 3 beam-based measurement execution condition, a Layer 3 cell-based measurement execution condition, or a maximum permissible exposure (MPE) based execution condition.

Aspect 24: The method of any of Aspects 13-23, wherein the execution condition includes at least one of: a first execution condition associated with a first beam quality measurement, of the candidate base station, satisfying a first threshold or being greater than a second beam quality measurement of a serving beam associated with the base station; or a second execution condition associated with a quantity of beams, associated with the one or more candidate base stations, having beam quality measurements that satisfy a second threshold or that are greater than the second beam quality measurement of the serving beam associated with the base station.

Aspect 25: The method of any of Aspects 13-24, wherein the execution condition includes a first execution condition associated with a quantity of occurrences that second execution condition has been satisfied or associated with an amount of time that the second execution condition has been satisfied.

Aspect 26: The method of any of Aspects 13-25, wherein the execution condition includes a maximum permissible exposure (MPE) based execution condition associated with an MPE limit of an uplink beam that is associated with a downlink beam that satisfies a measurement based execution condition.

Aspect 27: The method of any of Aspects 13-26, wherein the execution condition includes at least one of: one or more execution conditions associated with primary cells (PCells) of the one or more candidate base stations, or one or more execution conditions associated with primary secondary cells (PSCells) of the one or more candidate base stations.

Aspect 28: A method of wireless communication performed by a base station, comprising: transmitting, to a source base station, an indication of a secondary cell group (SCG) configuration for a conditional handover associated with the base station; and performing, with a user equipment (UE), the conditional handover using an updated SCG configuration associated with the SCG configuration, wherein the updated SCG configuration is based at least in part on one or more measurements performed by the UE.

Aspect 29: The method of Aspect 28, further comprising: receiving, from the source base station, an indication of a measurement report that indicates the one or more measurements.

Aspect 30: The method of any of Aspects 28-29, further comprising: receiving, from the UE or the source base station, an indication of the updated SCG configuration.

Aspect 31: The method of any of Aspects 28-30, further comprising: transmitting, to the source base station, an indication of the updated SCG configuration that is selected by the base station based at least in part on the one or more measurements, wherein the indication of the updated SCG configuration is to be forwarded to the UE by the source base station.

Aspect 32: The method of any of Aspects 28-31, wherein the one or more measurements include at least one of: a Layer 1 beam-based measurement, a Layer 3 beam-based measurement, or a Layer 3 cell-based measurement.

Aspect 33: The method of any of Aspects 28-32, wherein the SCG configuration indicates a set of candidate cells associated with the SCG configuration.

Aspect 34: The method of any of Aspects 28-33, further comprising: selecting one or more cells, from a set of candidate cells associated with the SCG configuration, to be included in the updated SCG configuration based at least in part on the one or more measurements; and transmitting, to the source base station, an indication of the updated SCG configuration.

Aspect 35: The method of Aspect 34, further comprising: receiving, from the source base station, an indication of a measurement report that indicates the one or more measurements; and transmitting, to the source base station, an indication of the updated SCG configuration based at least in part on receiving the indication of the measurement report.

Aspect 36: The method of Aspect 35, wherein receiving the indication of the measurement report comprises receiving, from the source base station, the indication of the measurement report periodically or based at least in part on a reporting event.

Aspect 37: The method of any of Aspects 28-36, further comprising receiving, from the source base station, an indication of the updated SCG configuration.

Aspect 38: The method of Aspect 37, further comprising: transmitting, to the source base station, an indication of a modification to the updated SCG configuration, wherein the modification to the updated SCG configuration is to be forwarded to the UE by the source base station.

Aspect 39: A method of wireless communication performed by a user equipment (UE), comprising: receiving, from a source base station, configuration information for a conditional handover, wherein the configuration information indicates an execution condition that is associated with primary cells (PCells) of one or more candidate base stations and at least one of secondary cell groups (SCGs) of the one or more candidate base stations or primary secondary cell (PSCells) of the one or more candidate base stations; and transmitting, to a candidate base station of the one or more candidate base stations, a message to initiate the conditional handover based at least in part on detecting that the execution condition has been satisfied.

Aspect 40: The method of Aspect 39, wherein the execution condition includes at least one of: a first execution condition associated with PCells of the one or more candidate base stations, a second execution condition associated with SCGs of the one or more candidate base stations, or a third execution condition associated with PSCells of the one or more candidate base stations.

Aspect 41: The method of any of Aspects 39-40, wherein the execution condition includes a first execution condition associated with PCells of the one or more candidate base stations and a second execution condition associated with SCGs or PSCells of the one or more candidate base stations, wherein transmitting the message to initiate the conditional handover comprises: transmitting the message to initiate the conditional handover based at least in part on detecting that a measurement of a PCell associated with the candidate base station satisfies the first execution condition, wherein the message indicates that an SCG associated with the candidate base station is to be added as part of the conditional handover based at least in part on a measurement of an SCG or a PSCell associated with the candidate base station satisfies the second execution condition.

Aspect 42: The method of any of Aspects 39-41, wherein the execution condition includes a first execution condition associated with PCells of the one or more candidate base stations and a second execution condition associated with SCGs or PSCells of the one or more candidate base stations, wherein transmitting the message to initiate the conditional handover comprises: transmitting the message to initiate the conditional handover based at least in part on detecting that a measurement of a PCell associated with the candidate base station satisfies the first execution condition and based at least in part on detecting that a measurement of an SCG or a PSCell associated with the candidate base station satisfies the second execution condition.

Aspect 43: The method of any of Aspects 39-42, wherein receiving the configuration information comprises receiving an indication, for the candidate base station, of an SCG configuration that indicates a set of candidate PCell and PSCell pairs; and wherein the message to initiate the conditional handover indicates a candidate PCell and PSCell pair, from the set of candidate PCell and PSCell pairs, that is based at least in part on a measurement of at least one of a PCell included in the PCell and PSCell pair or a PSCell included in the PCell and PSCell pair.

Aspect 44: The method of Aspect 43, further comprising measuring a set of PCells associated with the candidate base station to obtain a set of measurement values associated with the set of PCells; and wherein the message to initiate the conditional handover indicates the candidate PCell and PSCell pair based at least in part on the PCell included in the PCell and PSCell pair being associated with a highest measurement value from the set of measurement values.

Aspect 45: The method of any of Aspects 43-44, further comprising measuring a set of PCells associated with the candidate base station to obtain a first set of measurement values associated with the set of PCells; and measuring a set of PSCells associated with the candidate base station to obtain a second set of measurement values associated with the set of PSCells, wherein the message to initiate the conditional handover indicates the candidate PCell and PSCell pair based at least in part on the PCell and the PSCell included in the PCell and PSCell pair being associated with a highest joint measurement from the first set of measurement values and the second set of measurement values.

Aspect 46: The method of any of Aspects 39-45, wherein receiving the configuration information comprises receiving an indication, for the candidate base station, of an SCG configuration that indicates a set of candidate PCell and PSCell pairs; and wherein the message to initiate the conditional handover indicates a candidate PCell and PSCell pair, from the set of candidate PCell and PSCell pairs, that is based at least in part on a timing difference between a PCell and a PSCell included in the candidate PCell and PSCell pair.

Aspect 47: The method of any of Aspects 39-46, wherein receiving the configuration information comprises receiving an indication of a set of candidate cells associated with the candidate base station; and wherein the message to initiate the conditional handover indicates a candidate cell, from the set of candidate cells, that is based at least in part on a maximum permissible exposure (MPE) condition associated with an MPE limit of an uplink beam of the candidate cell that is associated with a downlink beam of the candidate cell that satisfies a measurement based execution condition.

Aspect 48: The method of any of Aspects 39-47, further comprising: selecting one or more secondary cells associated with the candidate base station to be associated with the conditional handover based at least in part on one or more execution conditions; and transmitting an indication of the one or more secondary cells.

Aspect 49: The method of Aspect 48, wherein transmitting the indication of the one or more secondary cells comprises transmitting, to the candidate base station, the indication of the one or more secondary cells via at least one of: layer 3 signaling, radio resource control (RRC) signaling, medium access control (MAC) control element (MAC-CE) signaling, or a message using a scheduling request (SR) resource.

Aspect 50: The method of any of Aspects 48-49, wherein transmitting the indication of the one or more secondary cells comprises transmitting, to the candidate base station, the indication of the one or more secondary cells, wherein the indication of the one or more secondary cells is to be forwarded to the candidate base station by the source base station.

Aspect 51: The method of any of Aspects 39-50, further comprising: performing the conditional handover with the candidate base station; and communicating, with the candidate base station, using an initial beam based at least in part on performing the conditional handover, wherein the initial beam is based at least in part on one or more beam-based measurements of at least one of a PCell or a PSCell associated with the candidate base station.

Aspect 52: The method of Aspect 51, wherein the one or more beam-based measurements include at least one of a Layer 3 beam-based measurement or a Layer 1 beam-based measurement.

Aspect 53: The method of any of Aspects 39-52, further comprising: measuring one or more beams associated with one or more cells of the candidate base station to obtain a set of beam measurement values; and transmitting, to the candidate base station, information associated with one or more cells associated with the conditional handover, wherein the information associated with the one or more cells includes one or more beam measurement values from the set of beam measurement values.

Aspect 54: The method of any of Aspects 39-53, further comprising: transmitting, to the candidate base station, an indication of an activation status for one or more secondary cells (SCells) associated with an SCG of the candidate base station.

Aspect 55: A method of wireless communication performed by a base station, comprising: receiving, from a source base station, configuration information for a conditional handover associated with a user equipment (UE), wherein the configuration information indicates an execution condition that is associated with primary cells (PCells) of one or more candidate base stations, including the base station, and at least one of secondary cell groups (SCGs) of the one or more candidate base stations or primary secondary cell (PSCells) of the one or more candidate base stations; and receiving, from the UE, a message to initiate the conditional handover based at least in part on an execution condition being satisfied.

Aspect 56: The method of Aspect 55, wherein the execution condition includes at least one of: a first execution condition associated with PCells of the one or more candidate base stations, a second execution condition associated with SCGs of the one or more candidate base stations, or a third execution condition associated with PSCells of the one or more candidate base stations.

Aspect 57: The method of any of Aspects 55-56, wherein the execution condition includes a first execution condition associated with PCells of the one or more candidate base stations and a second execution condition associated with SCGs or PSCells of the one or more candidate base stations, wherein receiving the message to initiate the conditional handover comprises: receiving the message to initiate the conditional handover based at least in part on a measurement of a PCell associated with the base station satisfying the first execution condition, wherein the message indicates that an SCG associated with the base station is to be added as part of the conditional handover based at least in part on a measurement of an SCG or a PSCell associated with the candidate base station satisfies the second execution condition.

Aspect 58: The method of any of Aspects 55-57, wherein the execution condition includes a first execution condition associated with PCells of the one or more candidate base stations and a second execution condition associated with SCGs or PSCells of the one or more candidate base stations, wherein receiving the message to initiate the conditional handover comprises: receiving the message to initiate the conditional handover based at least in part on a measurement of a PCell associated with the base station satisfying the first execution condition and based at least in part on a measurement of an SCG or a PSCell associated with the base station satisfying the second execution condition.

Aspect 59: The method of any of Aspects 55-58, further comprising transmitting, to the source base station or the UE, an indication of an SCG configuration that indicates a set of candidate PCell and PSCell pairs; and wherein the message to initiate the conditional handover indicates a candidate PCell and PSCell pair, from the set of candidate PCell and PSCell pairs, that is based at least in part on a measurement of at least one of a PCell included in the PCell and PSCell pair or a PSCell included in the PCell and PSCell pair.

Aspect 60: The method of Aspect 59, wherein the message to initiate the conditional handover indicates the candidate PCell and PSCell pair based at least in part on the PCell included in the PCell and PSCell pair being associated with a highest measurement value from a set of measurement values obtained by the UE.

Aspect 61: The method of any of Aspects 55-60, further comprising transmitting, to the source base station or the UE, an indication of an SCG configuration that indicates a set of candidate PCell and PSCell pairs; and wherein the message to initiate the conditional handover indicates a candidate PCell and PSCell pair, from the set of candidate PCell and PSCell pairs, that is based at least in part on a timing difference between a PCell and a PSCell included in the candidate PCell and PSCell pair.

Aspect 62: The method of any of Aspects 55-61, further comprising transmitting, to the source base station or the UE, an indication of a set of candidate cells associated with the candidate base station; and wherein the message to initiate the conditional handover indicates a candidate cell, from the set of candidate cells, that is based at least in part on a maximum permissible exposure (MPE) condition associated with an MPE limit of an uplink beam of the candidate cell that is associated with a downlink beam of the candidate cell that satisfies a measurement based execution condition.

Aspect 63: The method of any of Aspects 55-62, further comprising receiving, from the UE or the source base station, an indication of the one or more secondary cells associated with the base station to be associated with the conditional handover.

Aspect 64: The method of Aspect 63, wherein receiving the indication of the one or more secondary cells comprises receiving, from the UE, the indication of the one or more secondary cells via at least one of: layer 3 signaling, radio resource control (RRC) signaling, medium access control (MAC) control element (MAC-CE) signaling, or a message using a scheduling request (SR) resource.

Aspect 65: The method of any of Aspects 55-64, further comprising: performing the conditional handover with the UE; and communicating, with the UE, using an initial beam based at least in part on performing the conditional handover, wherein the initial beam is based at least in part on one or more beam-based measurements of at least one of a PCell or a PSCell associated with the base station.

Aspect 66: The method of Aspect 65, wherein the one or more beam-based measurements include at least one of a Layer 3 beam-based measurement or a Layer 1 beam-based measurement.

Aspect 67: The method of any of Aspects 55-66, further comprising receiving, from the UE, information associated with one or more cells associated with the conditional handover, wherein the information associated with the one or more cells includes one or more beam measurement values from a set of beam measurement values obtained by the UE.

Aspect 68: The method of any of Aspects 55-67, further comprising receiving, from the UE, an indication of an activation status for one or more secondary cells (SCells) associated with an SCG of the base station.

Aspect 69: An apparatus for wireless communication at a device, comprising a processor; memory coupled with the processor; and instructions stored in the memory and executable by the processor to cause the apparatus to perform the method of one or more of Aspects 1-13 and 39-54.

Aspect 70: A device for wireless communication, comprising a memory and one or more processors coupled to the memory, the one or more processors configured to perform the method of one or more of Aspects 1-13 and 39-54.

Aspect 71: An apparatus for wireless communication, comprising at least one means for performing the method of one or more of Aspects 1-13 and 39-54.

Aspect 72: A non-transitory computer-readable medium storing code for wireless communication, the code comprising instructions executable by a processor to perform the method of one or more of Aspects 1-13 and 39-54.

Aspect 73: A non-transitory computer-readable medium storing a set of instructions for wireless communication, the set of instructions comprising one or more instructions that, when executed by one or more processors of a device, cause the device to perform the method of one or more of Aspects 1-13 and 39-54.

Aspect 74: An apparatus for wireless communication at a device, comprising a processor; memory coupled with the processor; and instructions stored in the memory and executable by the processor to cause the apparatus to perform the method of one or more of Aspects 13-27, 28-38, and 55-68.

Aspect 75: A device for wireless communication, comprising a memory and one or more processors coupled to the memory, the one or more processors configured to perform the method of one or more of Aspects 13-27, 28-38, and 55-68.

Aspect 76: An apparatus for wireless communication, comprising at least one means for performing the method of one or more of Aspects 13-27, 28-38, and 55-68.

Aspect 77: A non-transitory computer-readable medium storing code for wireless communication, the code comprising instructions executable by a processor to perform the method of one or more of Aspects 13-27, 28-38, and 55-68.

Aspect 78: A non-transitory computer-readable medium storing a set of instructions for wireless communication, the set of instructions comprising one or more instructions that, when executed by one or more processors of a device, cause the device to perform the method of one or more of Aspects 13-27, 28-38, and 55-68.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one processor; and
   at least one memory communicatively coupled with the at least one processor and storing processor-readable code that, when executed by the at least one processor, is configured to cause the UE to:
   receive, from a source base station, configuration information for a conditional handover, wherein the configuration information indicates an execution condition and one or more secondary cell group (SCG) configurations associated with one or more candidate base stations;
   transmit, to the source base station, a measurement report indicating one or more measurements associated with at least one of the source base station or the one or more candidate base stations; and
   perform the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

2. The UE of claim 1, wherein the one or more measurements include at least one of:
   a Layer 1 beam-based measurement,
   a Layer 3 beam-based measurement, or
   a Layer 3 cell-based measurement.

3. The UE of claim 1, wherein the at least one memory further stores processor-readable code configured to cause the UE to receive, from the source base station, an indication of the updated SCG configuration based at least in part on transmitting the measurement report, wherein the SCG configuration is updated to the updated SCG configuration by the source base station or the candidate base station.

4. The UE of claim 1, wherein the at least one memory further stores processor-readable code configured to cause the UE to:
   select one or more cells, from a set of candidate cells associated with the SCG configuration, to be included in the updated SCG configuration based at least in part on the one or more measurements; and
   transmit, to at least one of the source base station or the candidate base station, an indication of the updated SCG configuration.

5. The UE of claim 1, wherein the measurement report is forwarded to the candidate base station by the source base station, and wherein the at least one memory further stores processor-readable code configured to cause the UE to receive, from the source base station, an indication of the updated SCG configuration via a radio resource control (RRC) message, wherein the SCG configuration is updated to the updated SCG configuration by the candidate base station based at least in part on the one or more measurements.

6. The UE of claim 1, wherein the at least one memory further stores processor-readable code configured to cause the UE to receive, from the source base station, an indication of the updated SCG configuration via a radio resource control (RRC) message, wherein the SCG configuration is updated to the updated SCG configuration by the source base station based at least in part on the one or more measurements.

7. The UE of claim 1, wherein the execution condition includes at least one of:
   a Layer 1 beam-based measurement execution condition,
   a Layer 3 beam-based measurement execution condition,
   a Layer 3 cell-based measurement execution condition, or
   a maximum permissible exposure (MPE) based execution condition.

8. The UE of claim 1, wherein the execution condition includes at least one of:
   one or more execution conditions associated with primary cells (PCells) of the one or more candidate base stations, or
   one or more execution conditions associated with primary secondary cells (PSCells) of the one or more candidate base stations.

9. A user equipment (UE) for wireless communication, comprising:
   at least one processor; and
   at least one memory communicatively coupled with the at least one processor and storing processor-readable code that, when executed by the at least one processor, is configured to cause the UE to:
      receive, from a source base station, configuration information for a conditional handover, the configuration information indicating:
         an execution condition that is associated with primary cells (PCells) of one or more candidate base stations and at least one of secondary cell groups (SCGs) of the one or more candidate base stations or primary secondary cells (PSCells) of the one or more candidate base stations, and
         a set of candidate PCell and PSCell pairs for a candidate base station of the one or more candidate base stations; and
      transmit, to the candidate base station, a message to initiate the conditional handover based at least in part on the execution condition having been satisfied, the message to initiate the conditional handover indicating a candidate PCell and PSCell pair, from the set of candidate PCell and PSCell pairs, that is based at least in part on a measurement of at least one of a PCell included in the PCell and PSCell pair or a PSCell included in the PCell and PSCell pair.

10. The UE of claim 9, wherein the execution condition includes at least one of:
    a first execution condition associated with PCells of the one or more candidate base stations,
    a second execution condition associated with SCGs of the one or more candidate base stations, or
    a third execution condition associated with PSCells of the one or more candidate base stations.

11. The UE of claim 9, wherein the execution condition includes a first execution condition associated with PCells of the one or more candidate base stations and a second execution condition associated with SCGs or PSCells of the one or more candidate base stations, and wherein, to cause the UE to transmit the message to initiate the conditional handover, the processor-readable code, when executed by the at least one processor, is configured to cause the UE to:
    transmit the message to initiate the conditional handover based at least in part on detecting that a measurement of a PCell associated with the candidate base station satisfies the first execution condition, wherein the message indicates that an SCG associated with the candidate base station is to be added as part of the conditional handover based at least in part on a measurement of an SCG or a PSCell associated with the candidate base station satisfies the second execution condition.

12. The UE of claim 9, wherein the execution condition includes a first execution condition associated with PCells of the one or more candidate base stations and a second execution condition associated with SCGs or PSCells of the one or more candidate base stations, and wherein, to cause the UE to transmit the message to initiate the conditional handover, the processor-readable code, when executed by the at least one processor, is configured to cause the UE to:
    transmit the message to initiate the conditional handover based at least in part on detecting that a measurement of a PCell associated with the candidate base station satisfies the first execution condition and based at least in part on detecting that a measurement of an SCG or a PSCell associated with the candidate base station satisfies the second execution condition.

13. The UE of claim 9, wherein the at least one memory further stores processor-readable code configured to cause the UE to:
    select one or more secondary cells associated with the candidate base station to be associated with the conditional handover based at least in part on one or more execution conditions; and
    transmit an indication of the one or more secondary cells.

14. The UE of claim 9, wherein the at least one memory further stores processor-readable code configured to cause the UE to:
    perform the conditional handover with the candidate base station; and
    communicate, with the candidate base station, using an initial beam based at least in part on performing the conditional handover, wherein the initial beam is based at least in part on one or more beam-based measurements of at least one of a PCell or a PSCell associated with the candidate base station.

15. A method of wireless communication performed by a user equipment (UE), comprising:
    receiving, from a source base station, configuration information for a conditional handover, wherein the configuration information indicates an execution condition and one or more secondary cell group (SCG) configurations associated with one or more candidate base stations;
    transmitting, to the source base station, a measurement report indicating one or more measurements associated with at least one of the source base station or the one or more candidate base stations; and
    performing the conditional handover with a candidate base station, of the one or more candidate base stations, using an updated SCG configuration associated with the candidate base station, wherein the updated SCG configuration is based at least in part on an SCG configuration, of the one or more SCG configurations, and the one or more measurements.

16. The method of claim 15, wherein the one or more measurements include at least one of:
    a Layer 1 beam-based measurement,
    a Layer 3 beam-based measurement, or
    a Layer 3 cell-based measurement.

17. The method of claim 15, further comprising receiving, from the source base station, an indication of the updated SCG configuration based at least in part on transmitting the measurement report, wherein the SCG configuration is updated to the updated SCG configuration by the source base station or the candidate base station.

18. The method of claim 15, further comprising:
selecting one or more cells, from a set of candidate cells associated with the SCG configuration, to be included in the updated SCG configuration based at least in part on the one or more measurements; and
transmitting, to at least one of the source base station or the candidate base station, an indication of the updated SCG configuration.

19. The method of claim 15, wherein the measurement report is forwarded to the candidate base station by the source base station, the method further comprising receiving, from the source base station, an indication of the updated SCG configuration via a radio resource control (RRC) message, wherein the SCG configuration is updated to the updated SCG configuration by the candidate base station based at least in part on the one or more measurements.

20. The method of claim 15, further comprising receiving, from the source base station, an indication of the updated SCG configuration via a radio resource control (RRC) message, wherein the SCG configuration is updated to the updated SCG configuration by the source base station based at least in part on the one or more measurements.

21. The method of claim 15, wherein the execution condition includes at least one of:
a Layer 1 beam-based measurement execution condition,
a Layer 3 beam-based measurement execution condition,
a Layer 3 cell-based measurement execution condition, or
a maximum permissible exposure (MPE) based execution condition.

22. The method of claim 15, wherein the execution condition includes at least one of:
one or more execution conditions associated with primary cells (PCells) of the one or more candidate base stations, or
one or more execution conditions associated with primary secondary cells (PSCells) of the one or more candidate base stations.

23. A method of wireless communication performed by a user equipment (UE), comprising:
receiving, from a source base station, configuration information for a conditional handover, the configuration information indicating:
an execution condition that is associated with primary cells (PCells) of one or more candidate base stations and at least one of secondary cell groups (SCGs) of the one or more candidate base stations or primary secondary cell (PSCells) of the one or more candidate base stations, and
a set of candidate PCell and PSCell pairs for a candidate base station of the one or more candidate base stations; and
transmitting, to the candidate base station, a message to initiate the conditional handover based at least in part on detecting that the execution condition has been satisfied, the message to initiate the conditional handover indicating a candidate PCell and PSCell pair, from the set of candidate PCell and PSCell pairs, that is based at least in part on a measurement of at least one of a PCell included in the PCell and PSCell pair or a PSCell included in the PCell and PSCell pair.

24. The method of claim 23, wherein the execution condition includes at least one of:
a first execution condition associated with PCells of the one or more candidate base stations,
a second execution condition associated with SCGs of the one or more candidate base stations, or
a third execution condition associated with PSCells of the one or more candidate base stations.

25. The method of claim 23, wherein the execution condition includes a first execution condition associated with PCells of the one or more candidate base stations and a second execution condition associated with SCGs or PSCells of the one or more candidate base stations, wherein transmitting the message to initiate the conditional handover comprises:
transmitting the message to initiate the conditional handover based at least in part on detecting that a measurement of a PCell associated with the candidate base station satisfies the first execution condition, wherein the message indicates that an SCG associated with the candidate base station is to be added as part of the conditional handover based at least in part on a measurement of an SCG or a PSCell associated with the candidate base station satisfies the second execution condition.

26. The method of claim 23, wherein the execution condition includes a first execution condition associated with PCells of the one or more candidate base stations and a second execution condition associated with SCGs or PSCells of the one or more candidate base stations, wherein transmitting the message to initiate the conditional handover comprises:
transmitting the message to initiate the conditional handover based at least in part on detecting that a measurement of a PCell associated with the candidate base station satisfies the first execution condition and based at least in part on detecting that a measurement of an SCG or a PSCell associated with the candidate base station satisfies the second execution condition.

27. The method of claim 23, further comprising:
selecting one or more secondary cells associated with the candidate base station to be associated with the conditional handover based at least in part on one or more execution conditions; and
transmitting an indication of the one or more secondary cells.

28. The method of claim 23, further comprising:
performing the conditional handover with the candidate base station; and
communicating, with the candidate base station, using an initial beam based at least in part on performing the conditional handover, wherein the initial beam is based at least in part on one or more beam-based measurements of at least one of a PCell or a PSCell associated with the candidate base station.

* * * * *